(12) United States Patent
Misaka

(10) Patent No.: US 7,184,221 B2
(45) Date of Patent: Feb. 27, 2007

(54) ZOOM LENS SYSTEM AND CAMERA INCORPORATING THE SAME

(75) Inventor: Makoto Misaka, Saitama (JP)

(73) Assignee: Canon Kabushiki Kaisha, Tokyo (JP)

(*) Notice: Subject to any disclaimer, the term of this patent is extended or adjusted under 35 U.S.C. 154(b) by 508 days.

(21) Appl. No.: 10/737,150

(22) Filed: Dec. 15, 2003

(65) Prior Publication Data

US 2004/0125462 A1 Jul. 1, 2004

(30) Foreign Application Priority Data

Dec. 16, 2002 (JP) .............................. 2002-364153

(51) Int. Cl.
*G02B 15/14* (2006.01)
*G02B 9/62* (2006.01)

(52) U.S. Cl. ..................... 359/682; 359/684; 359/761

(58) Field of Classification Search ............... 359/682, 359/684, 756, 761, 676, 689
See application file for complete search history.

(56) References Cited

U.S. PATENT DOCUMENTS

| | | | |
|---|---|---|---|
| 5,000,530 A | 3/1991 | Takahashi | |
| 5,189,557 A | 2/1993 | Endo | |
| 5,229,886 A | 7/1993 | Tanaka | |
| 5,241,421 A | 8/1993 | Endo et al. | |
| 5,276,553 A | 1/1994 | Tatsuno | |
| 5,710,669 A | 1/1998 | Endo | |
| 7,009,776 B2 * | 3/2006 | Wada | ................. 359/649 |

FOREIGN PATENT DOCUMENTS

| | | |
|---|---|---|
| JP | 2-201310 | 8/1990 |
| JP | 2-296208 | 12/1990 |
| JP | 3-225307 | 10/1991 |
| JP | 3-225310 | 10/1991 |
| JP | 4-29109 | 1/1992 |
| JP | 4-29110 | 1/1992 |
| JP | 4-186211 | 7/1992 |
| JP | 4-186212 | 7/1992 |
| JP | 4-264412 | 9/1992 |
| JP | 5-173071 | 7/1993 |
| JP | 7-261084 | 10/1995 |
| JP | 2587218 | 12/1996 |

* cited by examiner

*Primary Examiner*—Timothy Thompson
*Assistant Examiner*—William Choi
(74) *Attorney, Agent, or Firm*—Morgan & Finnegan, L.L.P.

(57) ABSTRACT

A zoom lens system, with a new structure that exhibits high optical performance over the entirety of a zoom range and the entirety of a focusing range, is disclosed. This zoom lens system comprises, in order from an object side to an image side: a front lens group which includes a plurality of lens units that move during zooming; a lens unit with negative optical power which moves during zooming and moves towards the object side during focusing from an infinity object to a close-distance object; and a lens unit with positive optical power which does not move for zooming.

8 Claims, 33 Drawing Sheets

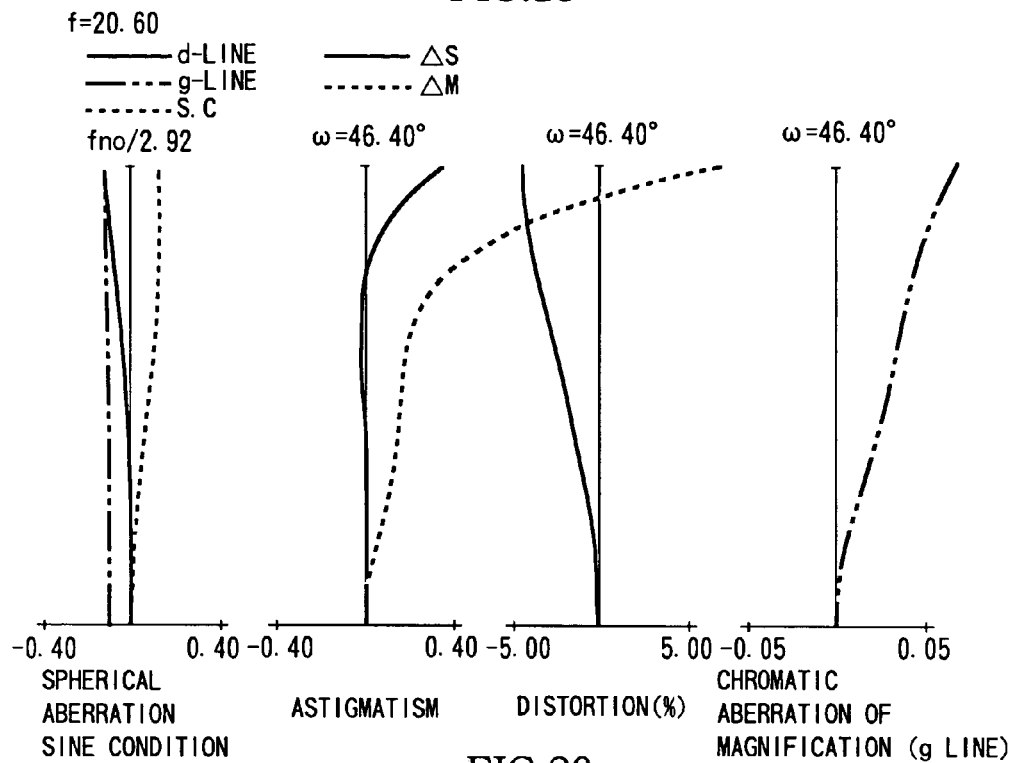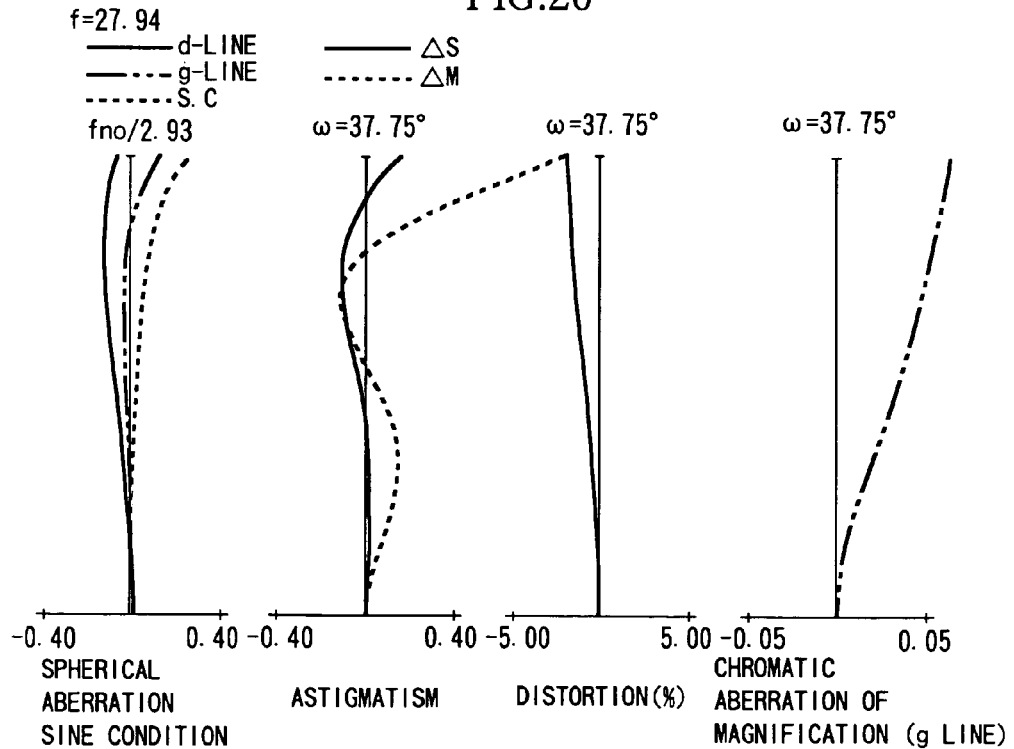

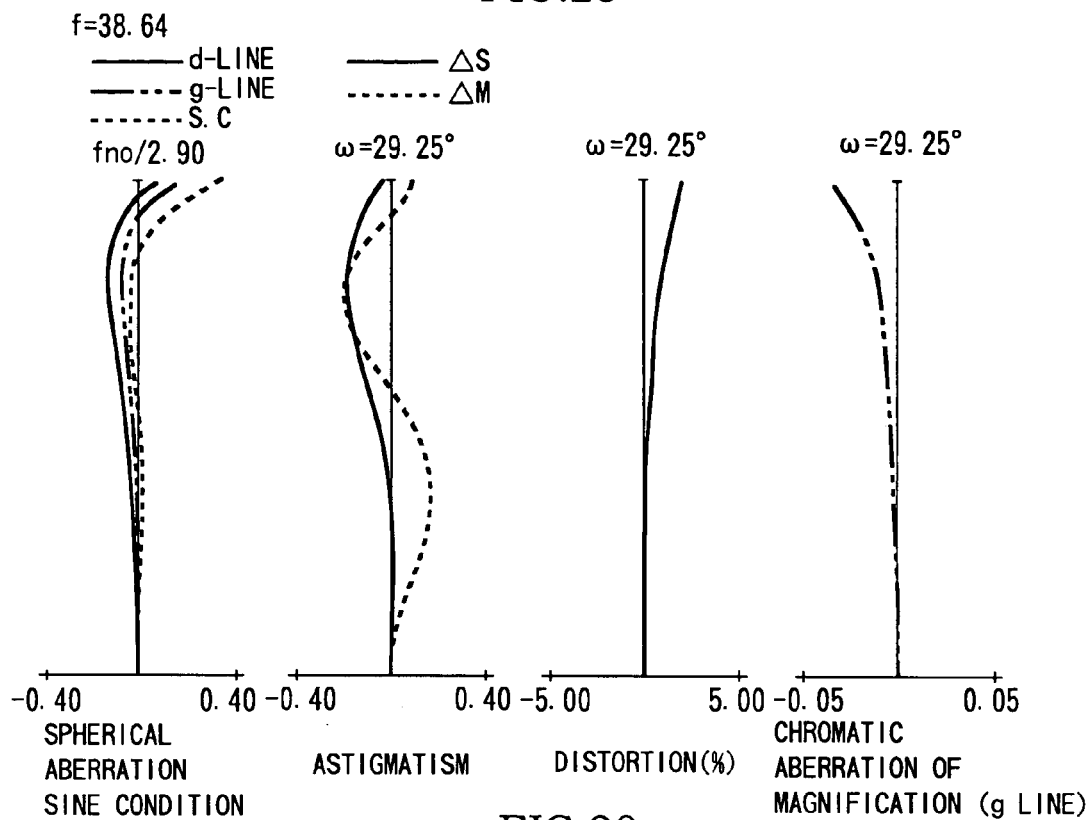
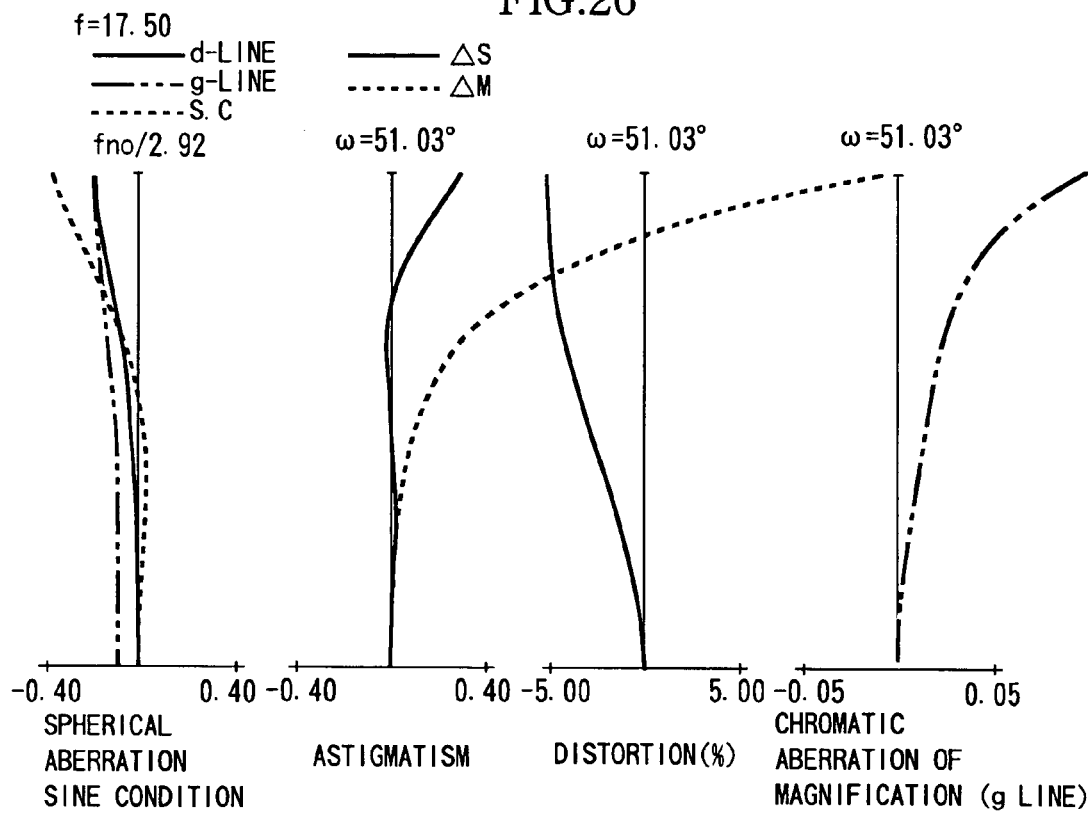

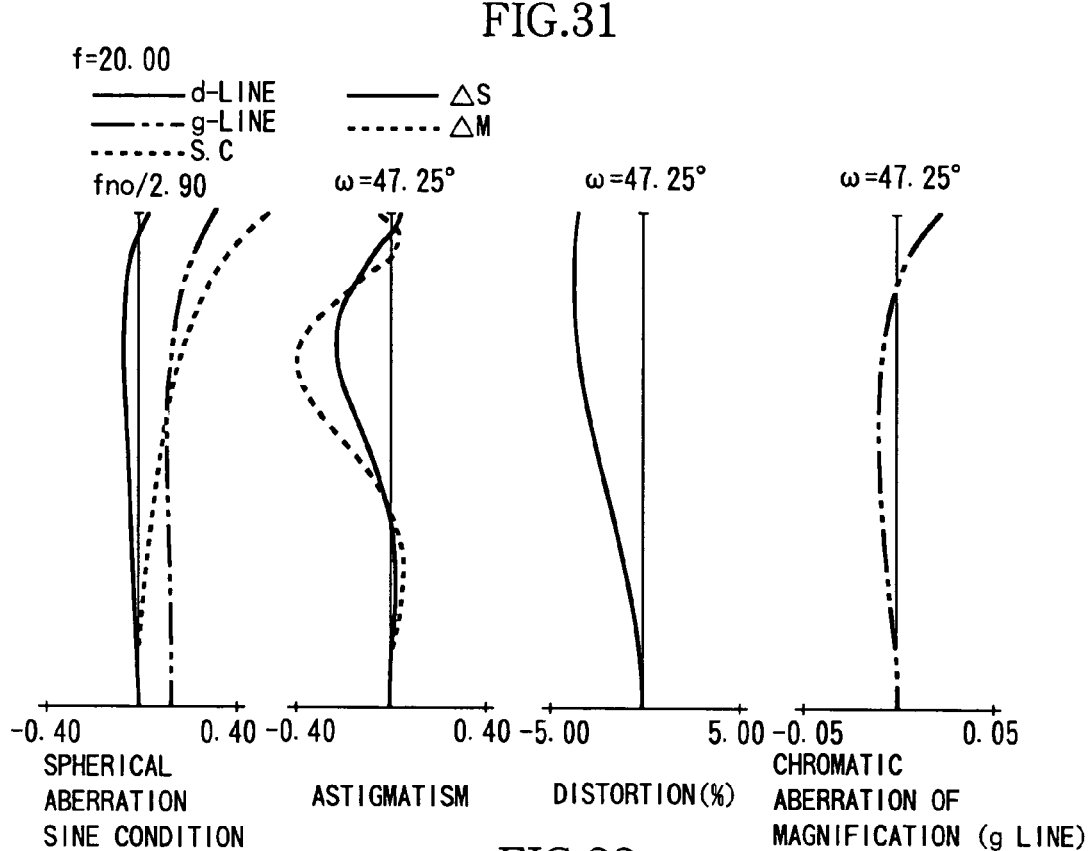
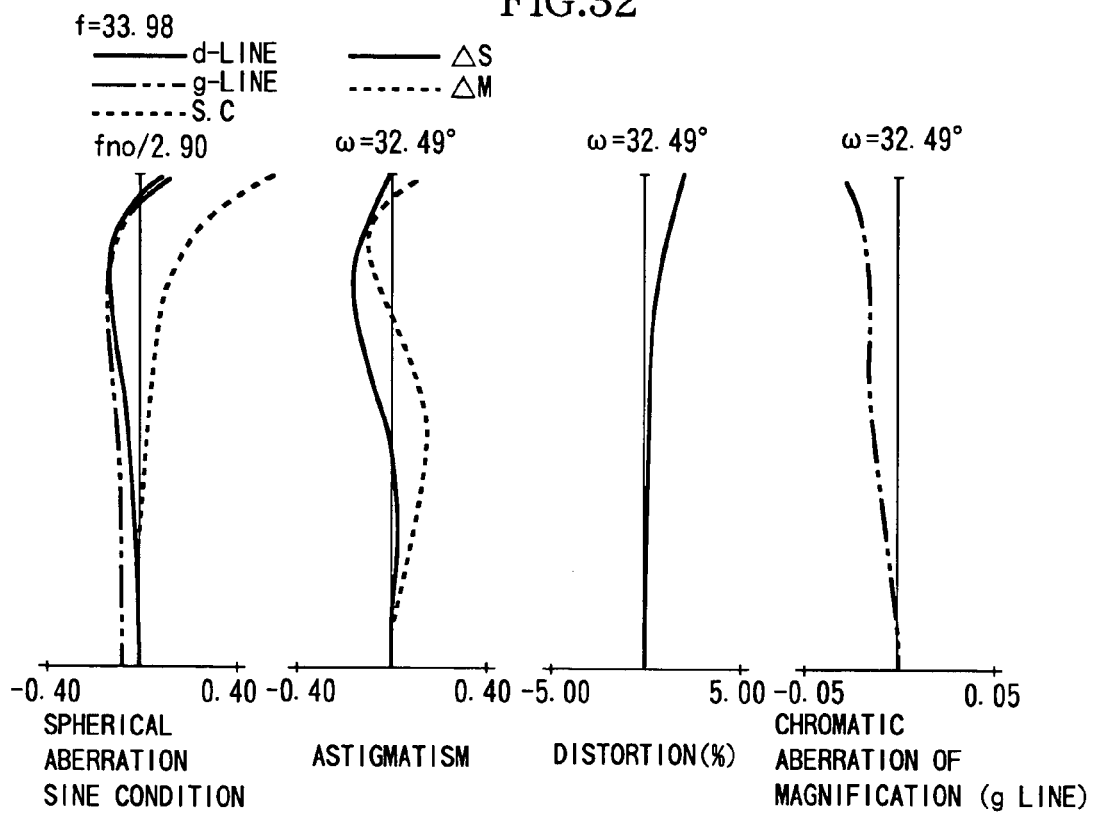

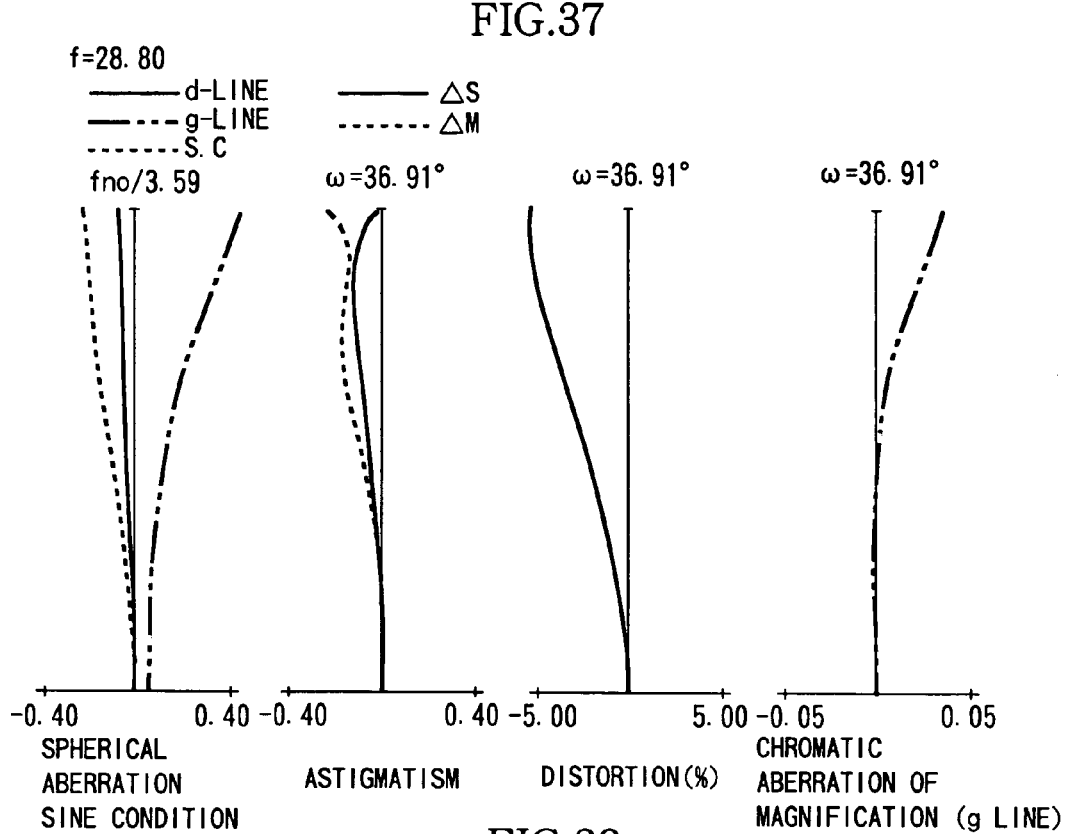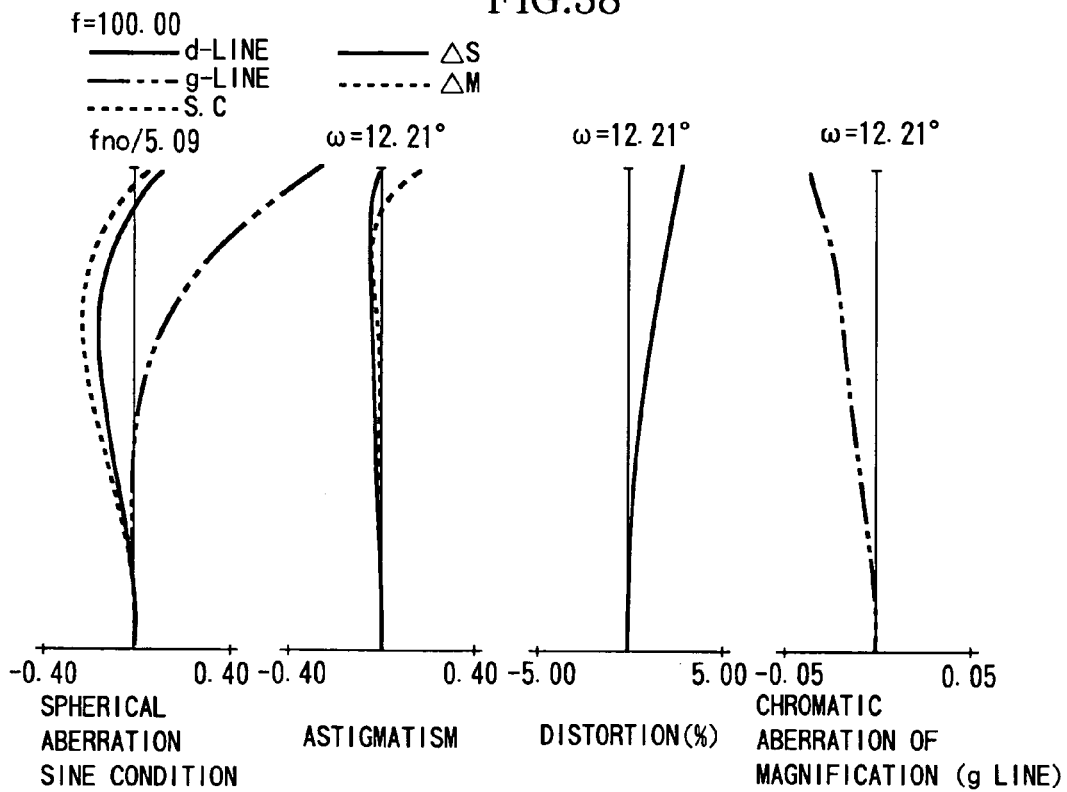

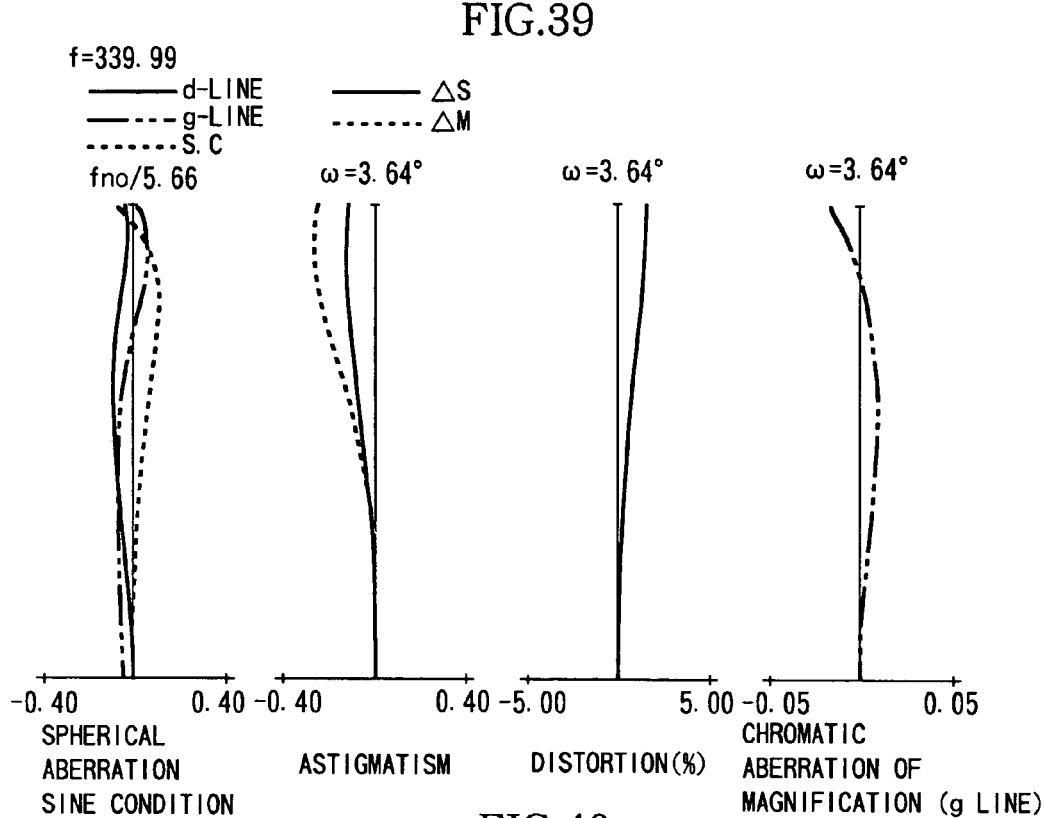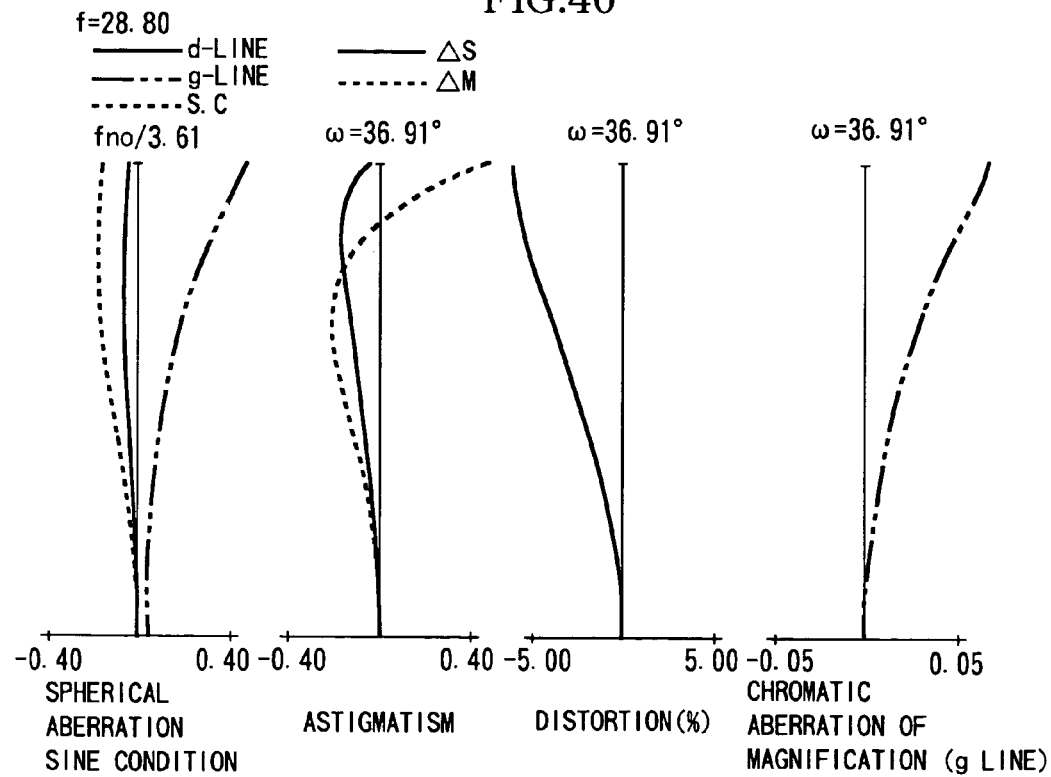

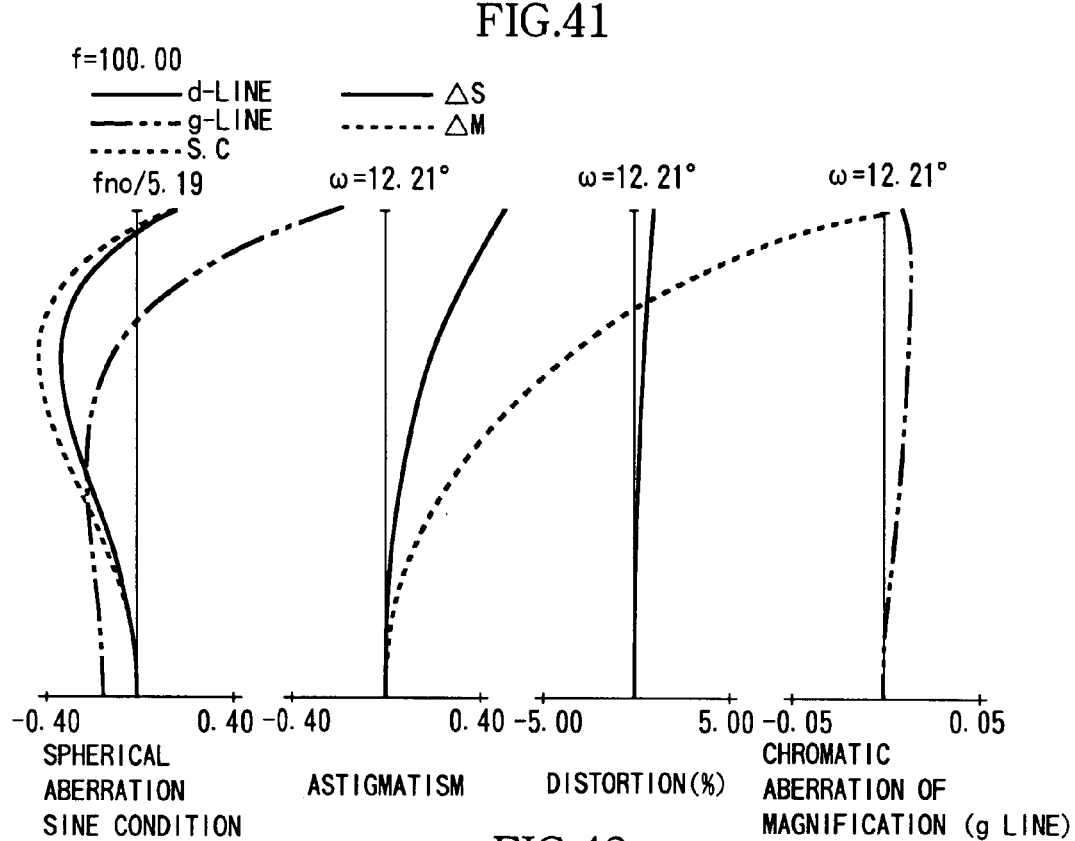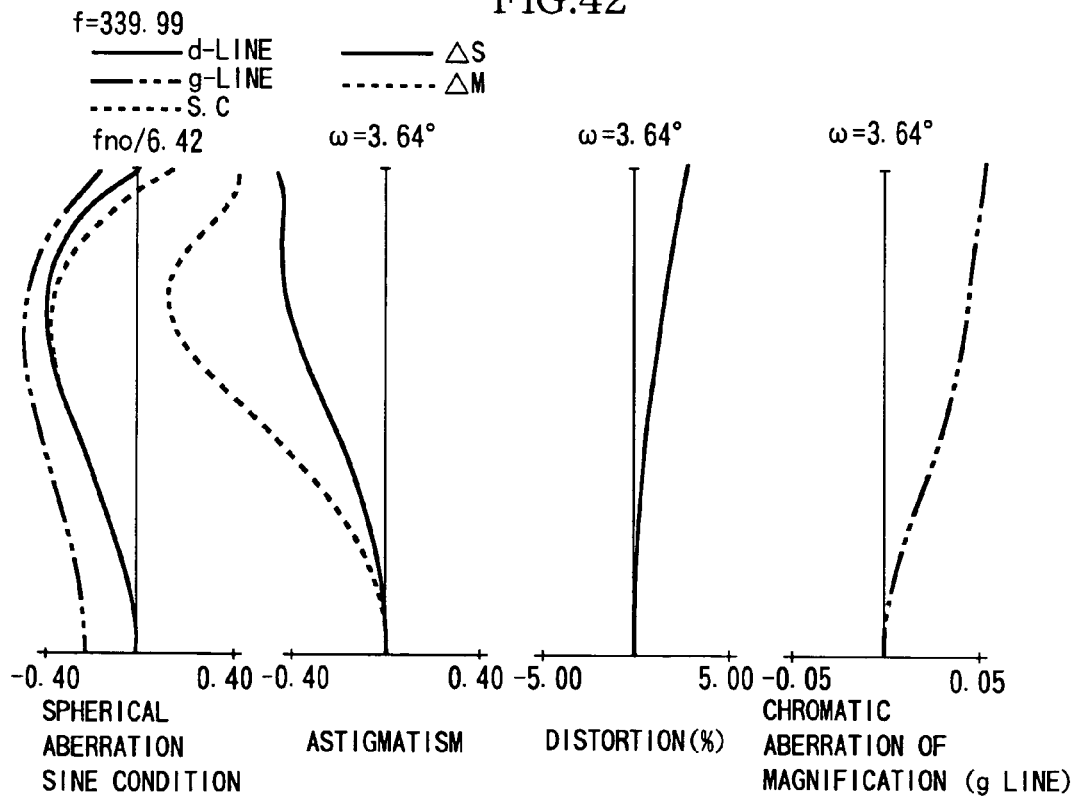

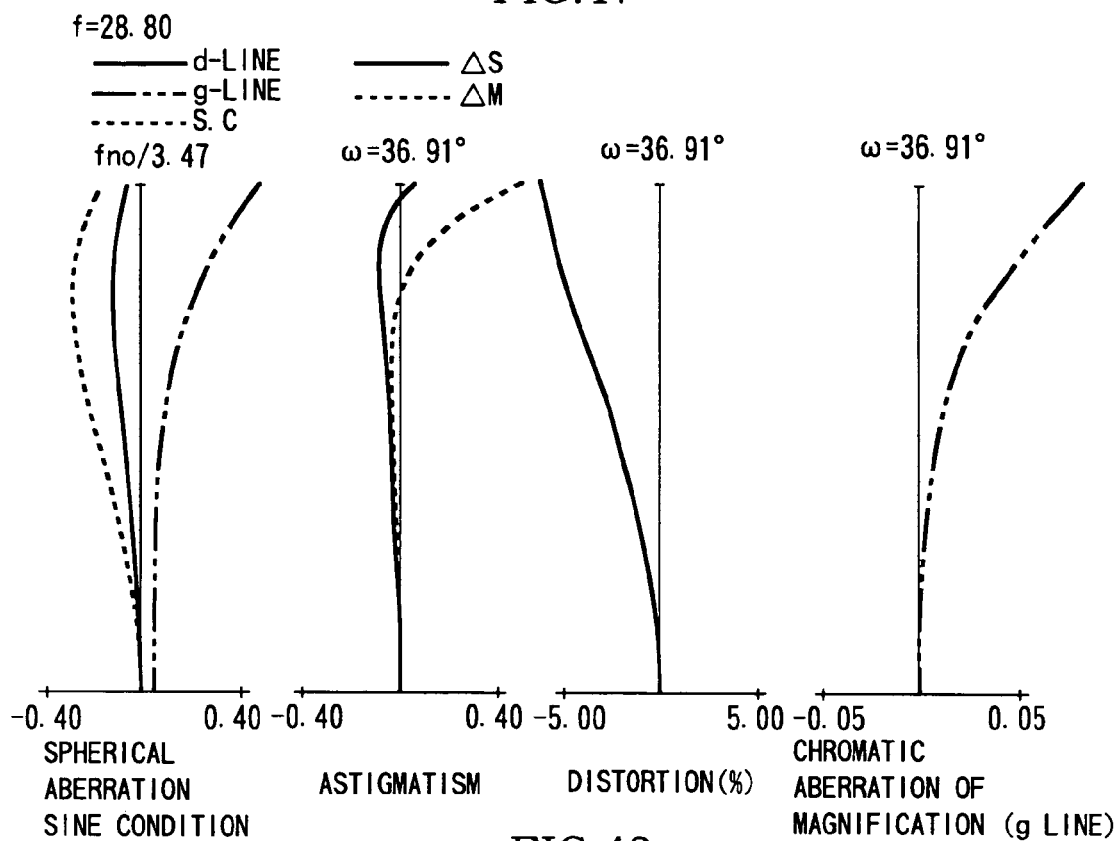
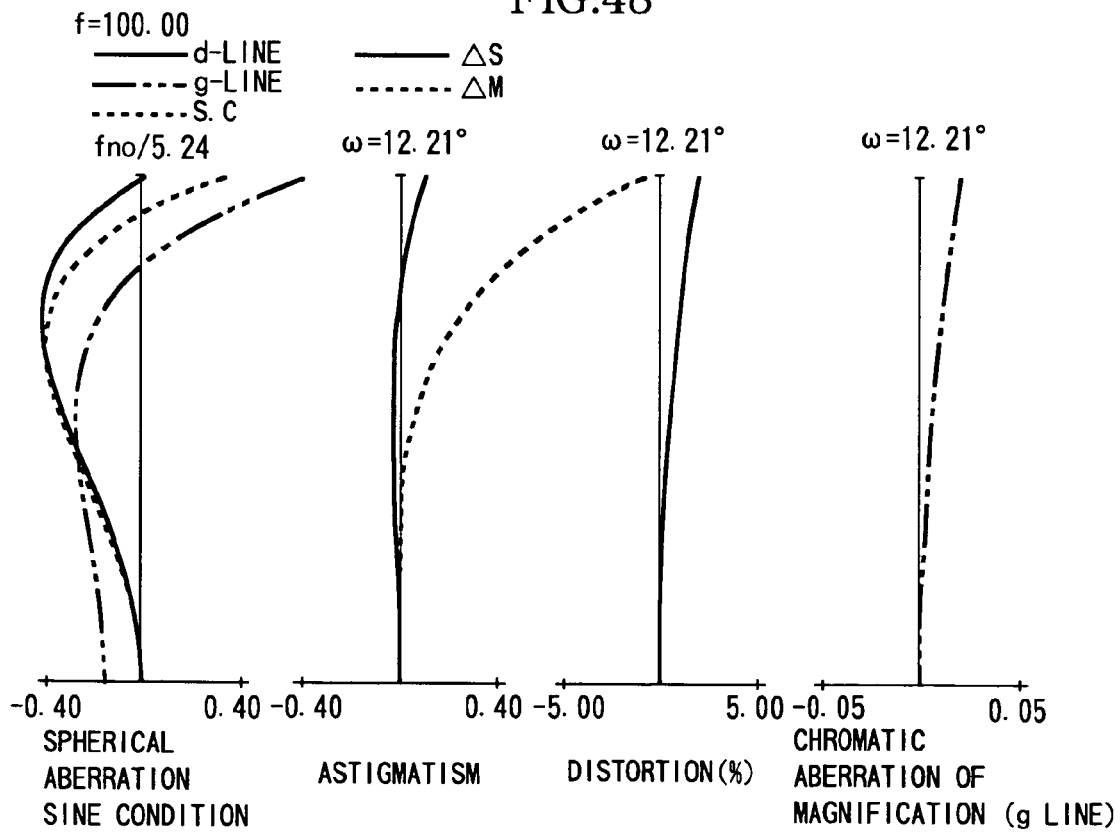

ZOOM LENS SYSTEM AND CAMERA INCORPORATING THE SAME

BACKGROUND OF THE INVENTION

1. Field of the Invention

This invention relates to a zoom lens system that is favorable for a single-lens reflex camera, digital still camera, video camera, film camera, etc., and exhibits good optical performance even while covering a wide-angle range and being of large aperture diameter.

2. Description of the Related Art

As a prior-art image taking lens for a single-lens reflex camera, there is known a zoom lens, in which lens units with negative, positive, negative, and positive refractive powers are disposed in that order from an object side to an image side (Japanese Laid-open Patent Application "1" to "6").

Since this zoom type lens has a lens unit with negative refractive power positioned at the front and is a so-called negative lead type lens, it is suited for realizing a wider view angle at the wide-angle end. Meanwhile in regard to the telephoto end, since the first lens unit and the second lens unit form a front component with positive refractive power as a whole and the third lens unit and the fourth lens unit form a rear component with negative refractive power as a whole, the optical system can be arranged as a telephoto type lens system as a whole.

Meanwhile there is also known an optical system, wherein a lens unit with positive refractive power is added to the zoom type lens, constituted of the abovementioned four lens units, to further improve the optical performance (Japanese Laid-open Patent Application "7").

There is also known an optical system in which a lens unit with negative refractive power is added (Japanese Patent Publication "8").

Also as focusing methods of a zoom lens, there are known the so-called front focus method, wherein the first lens unit at the most object side is moved, and the so-called inner focus or rear focus method, wherein lens units from the second lens unit and rearwards are moved.

Generally with an inner focus or rear focus type zoom lens, since the effective ray diameter of the first lens unit can be made small in comparison to a front focus type zoom lens, the advantage that the overall lens system can be made compact is provided. Also, since comparatively compact and lightweight lens units are moved to perform focusing, the characteristic of facilitating rapid focusing, especially in autofocus cameras, which have become the mainstream recently, is provided.

As such a zoom lens employing an inner focus or rear focus method, the present applicant has proposed in a so-called positive lead type zoom lens, having, in order from the object side to the image side, a first lens unit with positive refractive power, a second lens unit with negative refractive power, and a rear lens group with positive refractive power as a whole, and with which zooming is performed by varying the air spacing of the respective lens units, a zoom lens wherein a focusing lens unit with negative refractive power is disposed as a part of the rear lens group and this focusing lens unit is moved to the image side to perform focusing from an infinity object to a close-distance object (Japanese Laid-open Patent Application "9" to "12").
[Japanese Laid-open Patent Application and Japanese Patent Publication]
"1": Japanese Laid-open Patent Application No.H2(1990)-201310 (corresponding to U.S. Pat. No. 5,000,550)
"2": Japanese Laid-open Patent Application No.H2(1990)-296208 (corresponding to U.S. Pat. No. 5,000,550)
"3": Japanese Laid-open Patent Application No.H4(1992)-29109
"4": Japanese Laid-open Patent Application No.H4(1992)-29110
"5": Japanese Laid-open Patent Application No.H7(1995)-261084 (corresponding to U.S. Pat. No. 5,710,669)
"6": Japanese Laid-open Patent Application No.H5(1993)-173071 (corresponding to U.S. Pat. No. 5,276,553)
"7": Japanese Laid-open Patent Application No.H4(1992)-264412 (corresponding to U.S. Pat. No. 5,229,886)
"8": Japanese Patent Publication No. 2587218
"9": Japanese Laid-open Patent Application No.H3(1991)-225307 (corresponding to U.S. Pat. No. 5,241,421)
"10": Japanese Laid-open Patent Application No.H3(1991)-225310 (corresponding to U.S. Pat. No. 5,241,421)
"11": Japanese Laid-open Patent Application No.H4(1992)-186211 (corresponding to U.S. Pat. No. 5,189,557)
"12": Japanese Laid-open Patent Application No.H4(1992)-186212 (corresponding to U.S. Pat. No. 5,189,557)

A zoom lens, in which lens units with negative, positive, negative, and positive refractive powers are disposed in that order from the object side to the image side, and a zoom lens, which is an application of the abovementioned zoom lens and in which lens units with negative, positive, negative, and positive refractive powers as well as a rear lens group are disposed, are favorable as zoom lenses of wide view angle. However, when an attempt is made to set the focal length and F number at the telephoto side to desirable values and shorten the focal length at the wide-angle side while maintaining the optical performance, the overall lens system generally becomes large. This thus makes the prior-art zoom lenses unable to meet the demands made on zoom lenses for recent optical equipment, which are being made significantly compact.

Meanwhile as another issue of wide-angle zoom lenses, it is difficult to perform focusing to a close-distance object while maintaining good optical performance.

For example, with the generally employed method of focusing from an infinity object to a close-distance object by moving the first lens unit with negative refractive power towards the object side, the front lens diameter becomes large as the optical system is made wider in view angle. Though various focusing methods have been proposed to resolve this problem, all of these have the problem, though differing in degree, that the overall lens system becomes large.

For example, if the close-distance image taking distance is to be made short, the space for movement of the focusing lens unit had to be made large and this caused to the drive system to become large, the overall optical system to become large, and the image performance for close-distance image taking to degrade due to the aberration variations accompanying the focusing process.

Though an inner focus type arrangement has the abovementioned characteristics, when the realization of a wider view angle is attempted, the variations of the various aberrations that accompany focusing become significant and it becomes extremely difficult to maintain good optical performance.

SUMMARY OF THE INVENTION

An object of the present invention is to provide a zoom lens, with which a wide view angle is realized and yet with which the various aberration variations that accompany zooming and focusing are reduced and high optical performance is provided over the entire zooming range and the entire focusing range.

In order to achieve the above object, a zoom lens system of one aspect of the present invention comprises, in order from an object side to an image side, a front lens group which includes a plurality of lens units that moves during zooming; a lens unit with negative optical power which moves during zooming and moves towards the image side during focusing from an infinity object to a close-distance object; and a lens unit with positive optical power, which does not move for zooming.

BRIEF DESCRIPTION OF THE DRAWINGS

FIG. 19 is aberration diagrams of the zoom lens system of Embodiment 3 when set at the wide-angle end and focused on an object at 500 mm (from the image plane).

FIG. 20 is aberration diagrams of the zoom lens system of Embodiment 3 when set at the intermediate zoom position and focused on an object at 500 mm (from the image plane).

FIG. 25 is aberration diagrams of the zoom lens system of Embodiment 4 when set at the telephoto end and focused on an infinity object.

FIG. 26 is aberration diagrams of the zoom lens system of Embodiment 4 when set at the wide-angle end and focused on an object at 500 mm (from the image plane).

FIG. 31 is aberration diagrams of the zoom lens system of Embodiment 5 when set at an intermediate zoom position and focused on an infinity object.

FIG. 32 is aberration diagrams of the zoom lens system of Embodiment 5 when set at the telephoto end and focused on an infinity object.

FIG. 37 is aberration diagrams of the zoom lens system of Embodiment 6 when set at the wide-angle end and focused on an infinity object.

FIG. 38 is aberration diagrams of the zoom lens system of Embodiment 6 when set at an intermediate zoom position and focused on an infinity object.

FIG. 39 is aberration diagrams of the zoom lens system of Embodiment 6 when set at the telephoto end and focused on an infinity object.

FIG. 40 is aberration diagrams of the zoom lens system of Embodiment 6 when set at the wide-angle end and focused on an object at 500 mm (from the image plane).

FIG. 41 is aberration diagrams of the zoom lens system of Embodiment 6 when set at the intermediate zoom position and focused on an object at 500 mm (from the image plane).

FIG. 42 is aberration diagrams of the zoom lens system of Embodiment 6 when set at the telephoto end and focused on an object at 500 mm (from the image plane).

FIG. 47 is aberration diagrams of the zoom lens system of Embodiment 7 when set at the wide-angle end and focused on an object at 500 mm (from the image plane).

FIG. 48 is aberration diagrams of the zoom lens system of Embodiment 7 when set at the intermediate zoom position and focused on an object at 500 mm (from the image plane).

DETAILED DESCRIPTION OF THE PREFERRED EMBODIMENTS

Embodiments of a zoom lens system and a camera using the zoom lens system shall now be described using the drawings.

Figure 1:
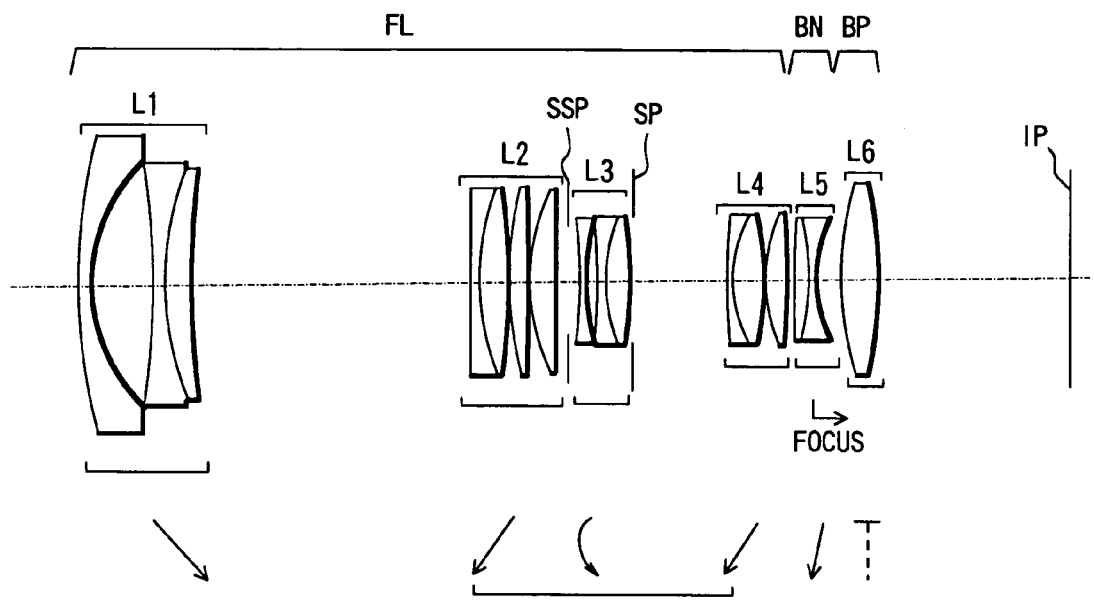
FIG. 1 is a sectional view of a zoom lens system of Embodiment 1.
Figure 2:
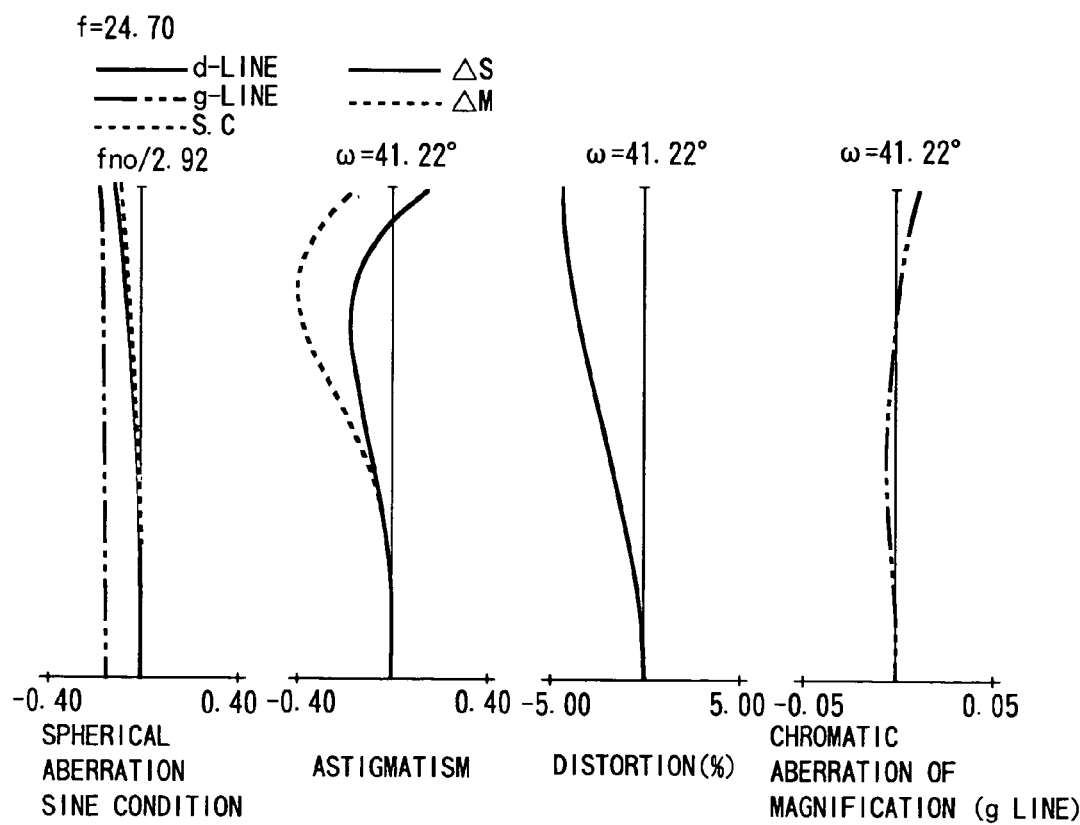
FIG. 2 is aberration diagrams of the zoom lens system of Embodiment 1 when set at the wide-angle end and focused on an infinity object.
Figure 3:
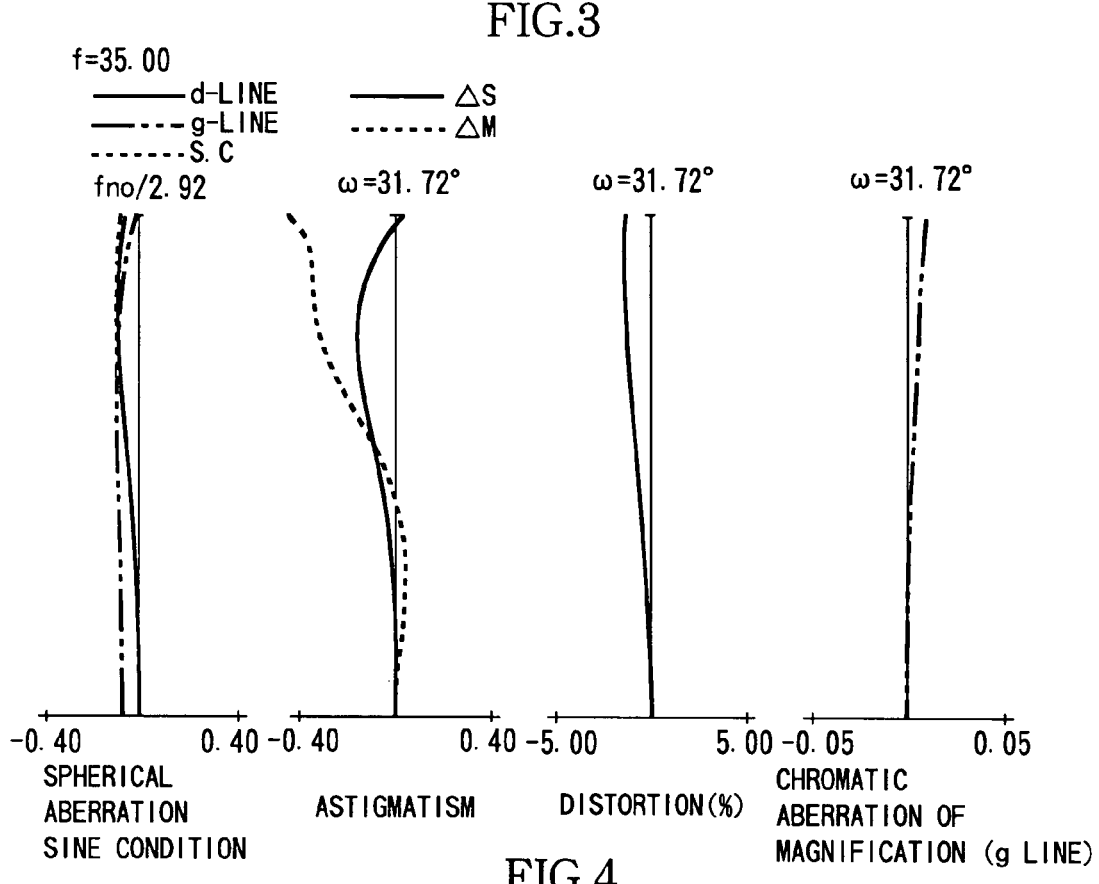
FIG. 3 is aberration diagrams of the zoom lens system of Embodiment 1 when set at an intermediate zoom position and focused on an infinity object.
Figure 4:
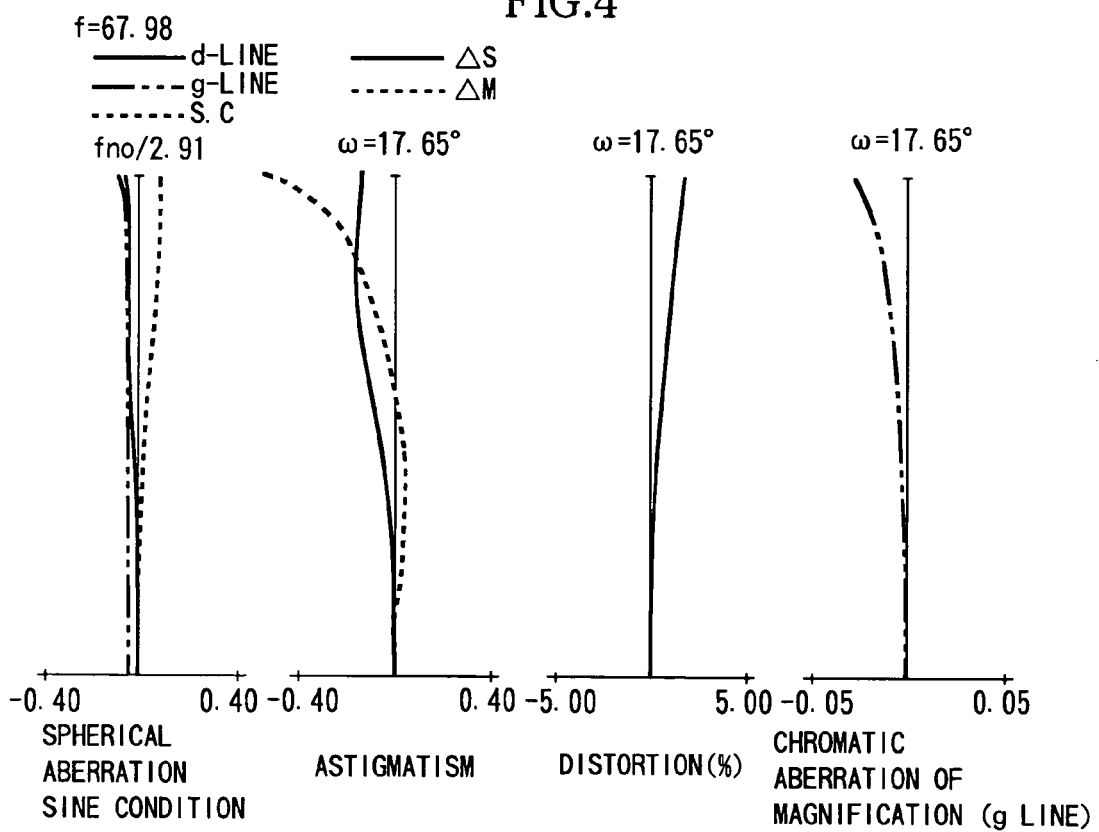
FIG. 4 is aberration diagrams of the zoom lens system of Embodiment 1 when set at the telephoto end and focused on an infinity object.
Figure 5:
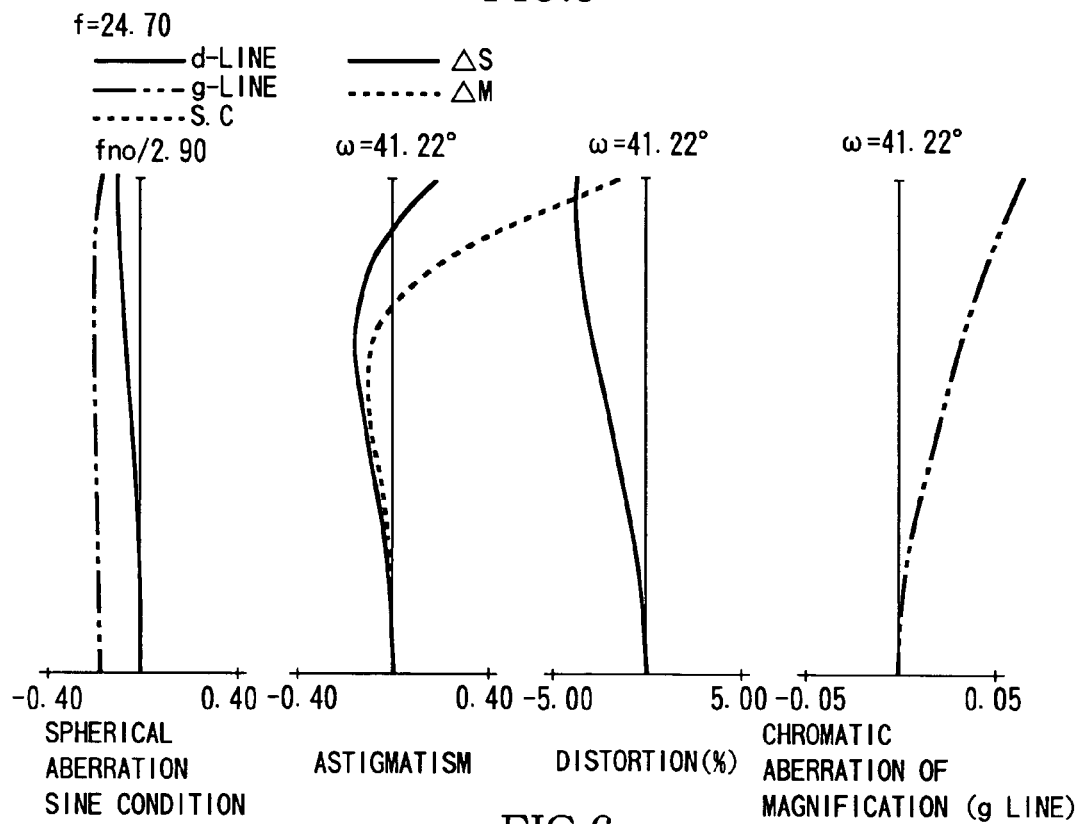
FIG. 5 is aberration diagrams of the zoom lens system of Embodiment 1 when set at the wide-angle end and focused on an object at 500 mm (from the image plane).
Figure 6:
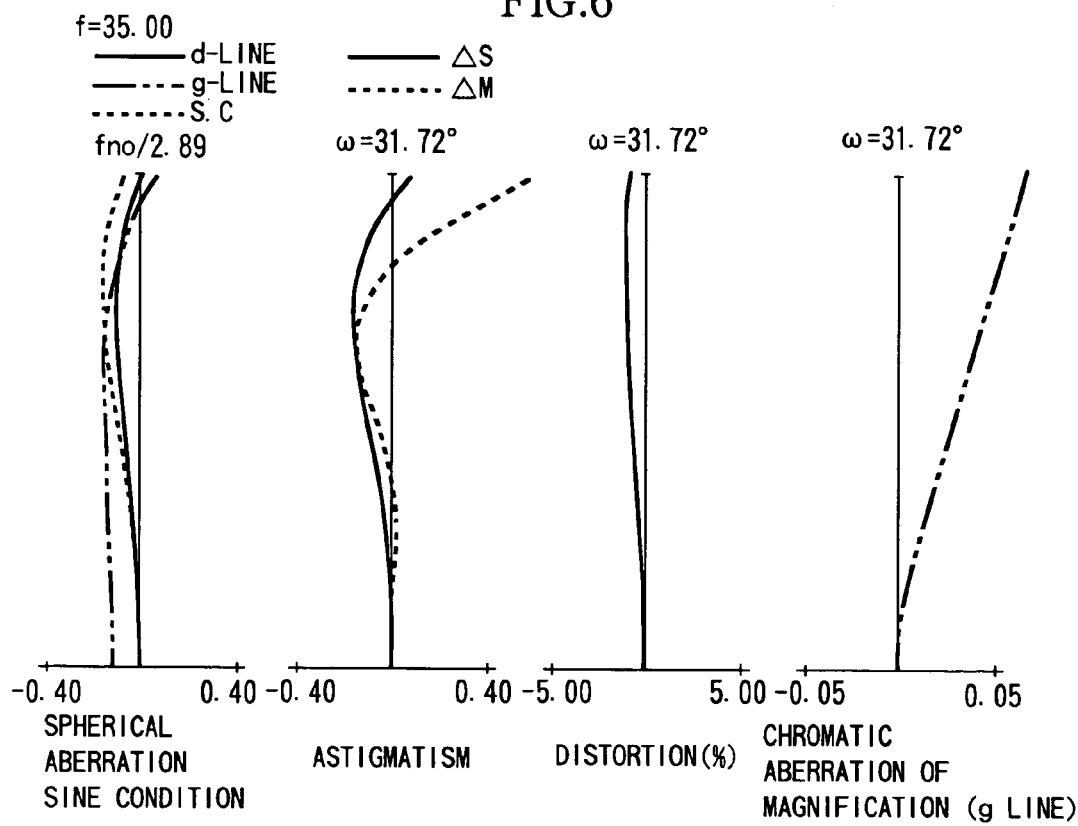
FIG. 6 is aberration diagrams of the zoom lens system of Embodiment 1 when set at the intermediate zoom position and focused on an object at 500 mm (from the image plane).
Figure 7:
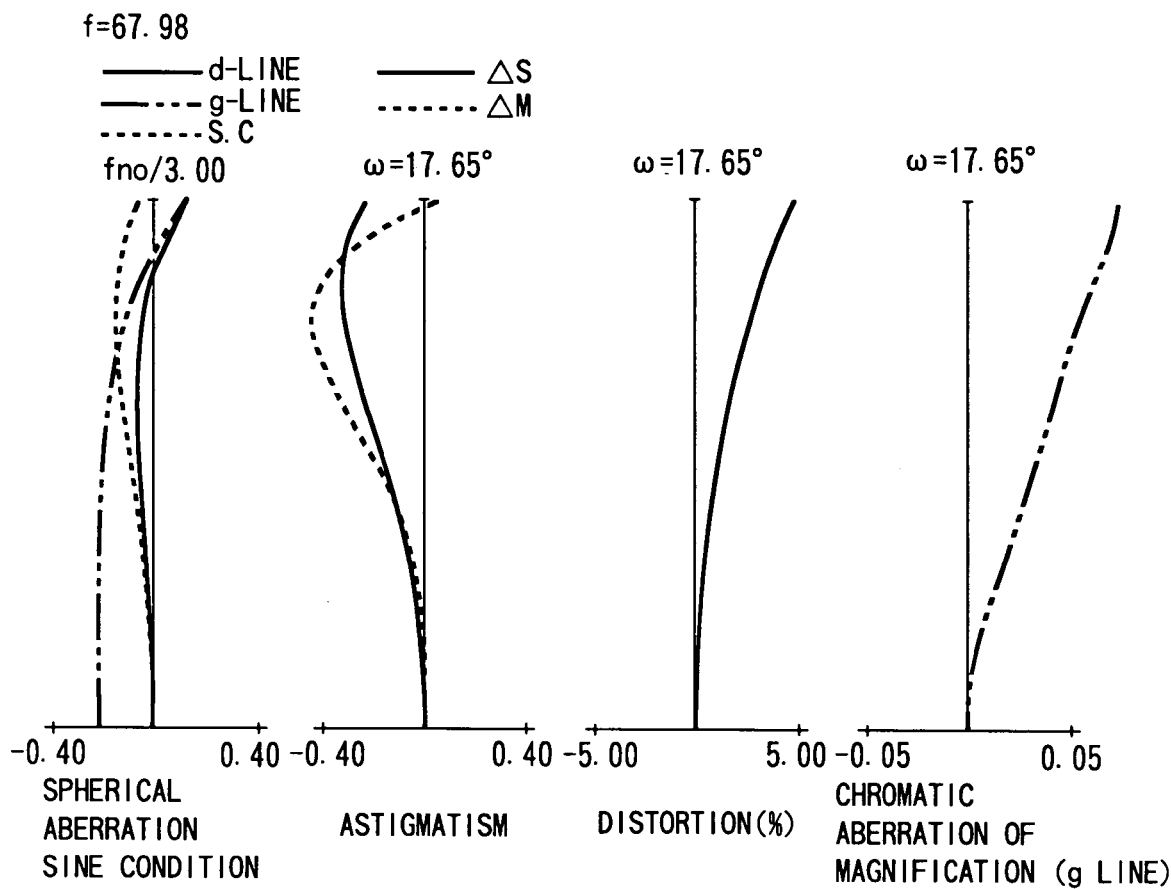
FIG. 7 is aberration diagrams of the zoom lens system of Embodiment 1 when set at the telephoto end and focused on an object at 500 mm (from the image plane).

FIG. 1 is a sectional view of a zoom lens of Embodiment 1. FIG. 2, FIG. 3, and FIG. 4 show aberration diagrams of the zoom lens of Embodiment 1 when focused on an infinity object while being set at the wide-angle end, an intermediate zoom position, and the telephoto end, respectively. FIG. 5, FIG. 6, and FIG. 7 show aberration diagrams of the zoom lens of Embodiment 1 when focused on an object at a distance (distance from an image plane) of 500 mm while being set at the wide-angle end, the intermediate zoom position, and the telephoto end, respectively, with the numerical values of numerical examples to be described below being expressed in units of mm.

Figure 8:
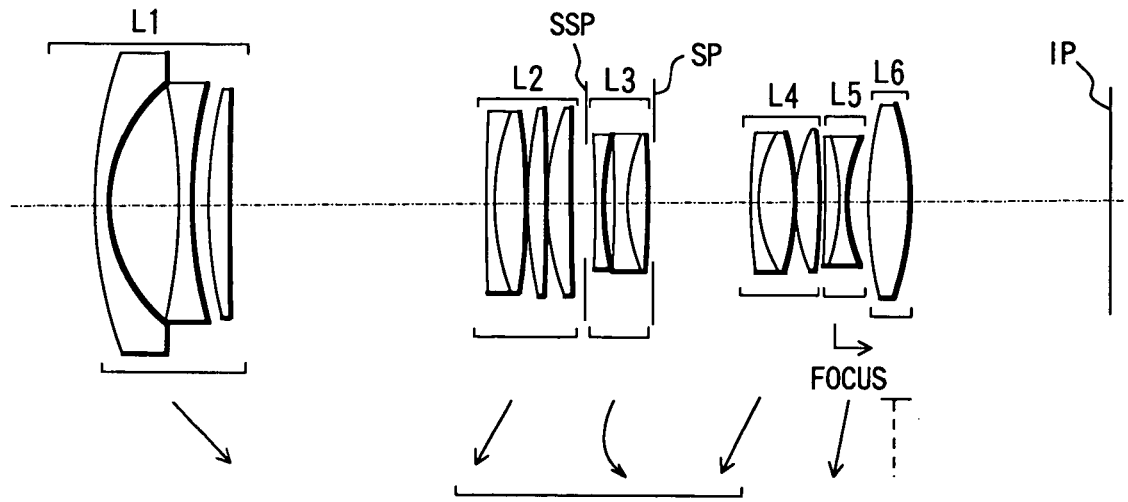
FIG. 8 is a sectional view of a zoom lens system of Embodiment 2.
Figure 9:
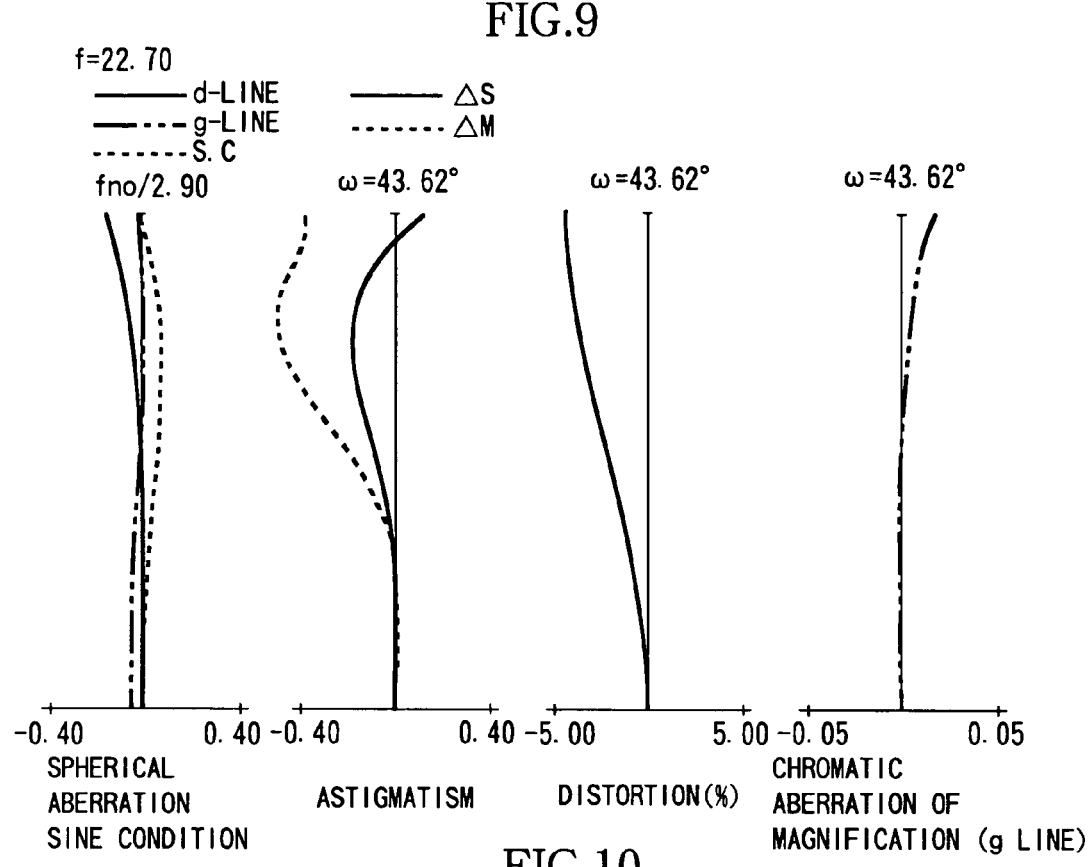
FIG. 9 is aberration diagrams of the zoom lens system of Embodiment 2 when set at the wide-angle end and focused on an infinity object.
Figure 10:
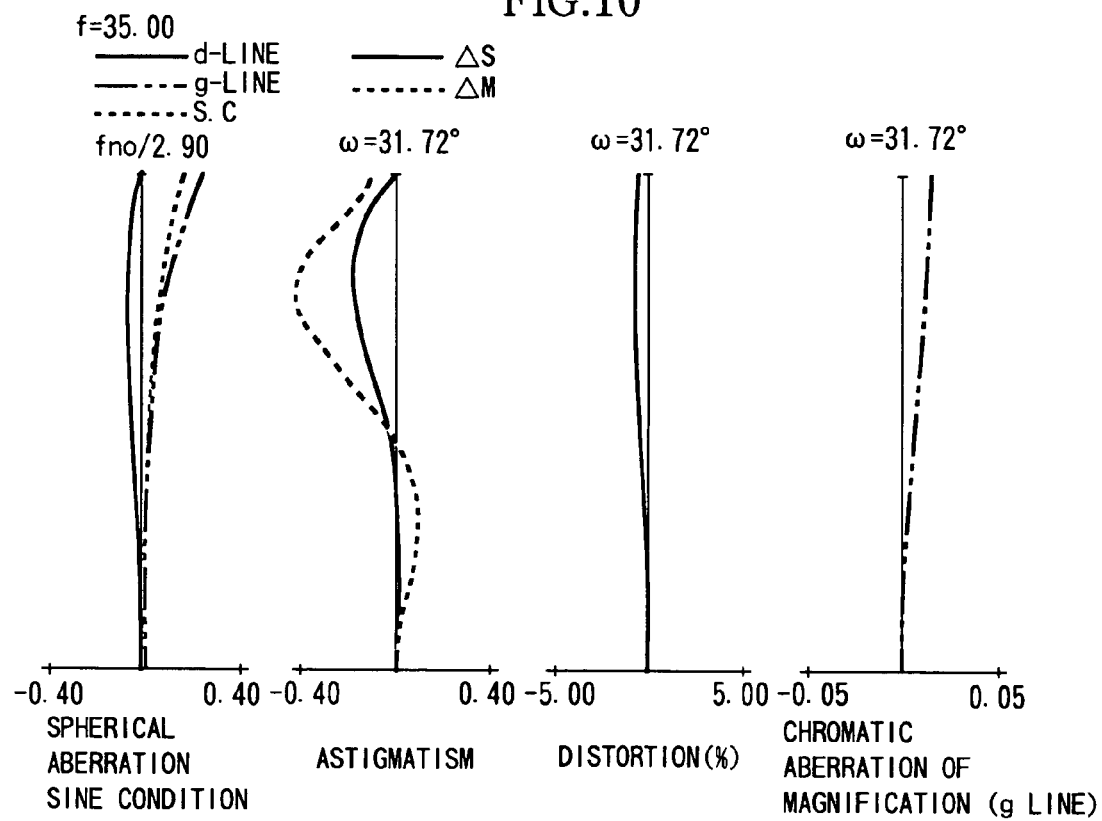
FIG. 10 is aberration diagrams of the zoom lens system of Embodiment 2 when set at an intermediate zoom position and focused on an infinity object.
Figure 11:
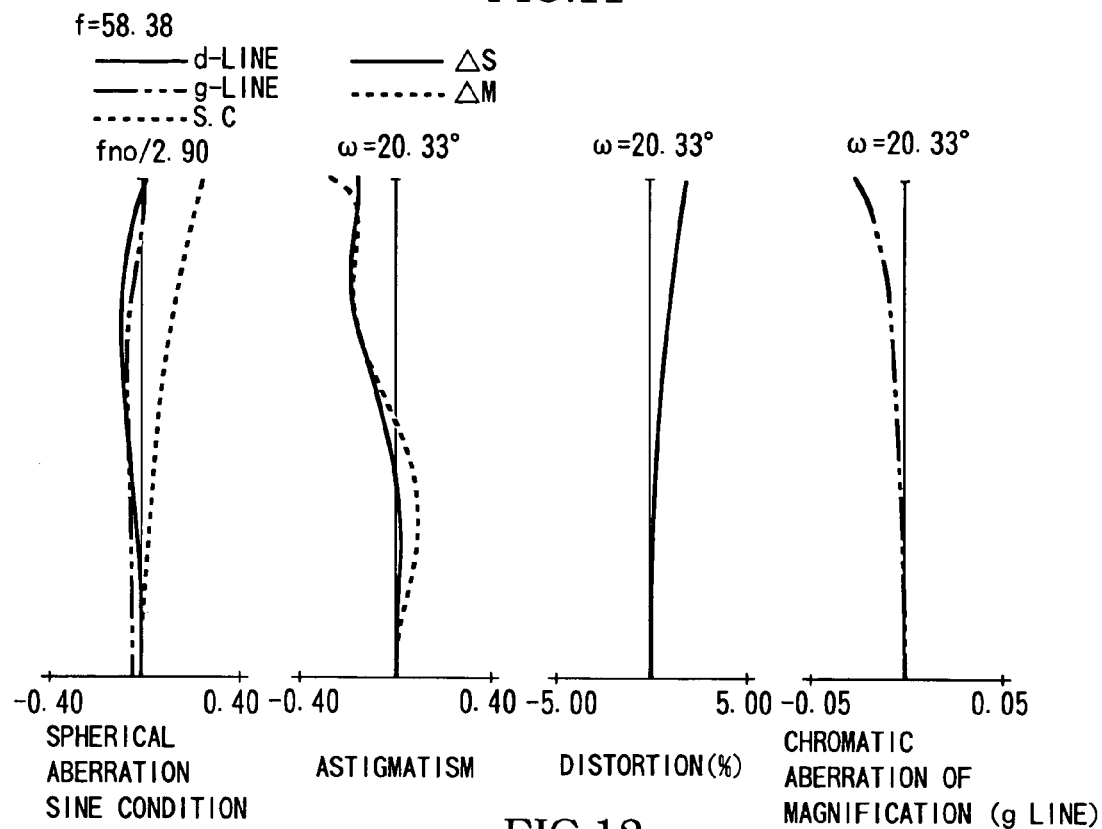
FIG. 11 is aberration diagrams of the zoom lens system of Embodiment 2 when set at the telephoto end and focused on an infinity object.
Figure 12:
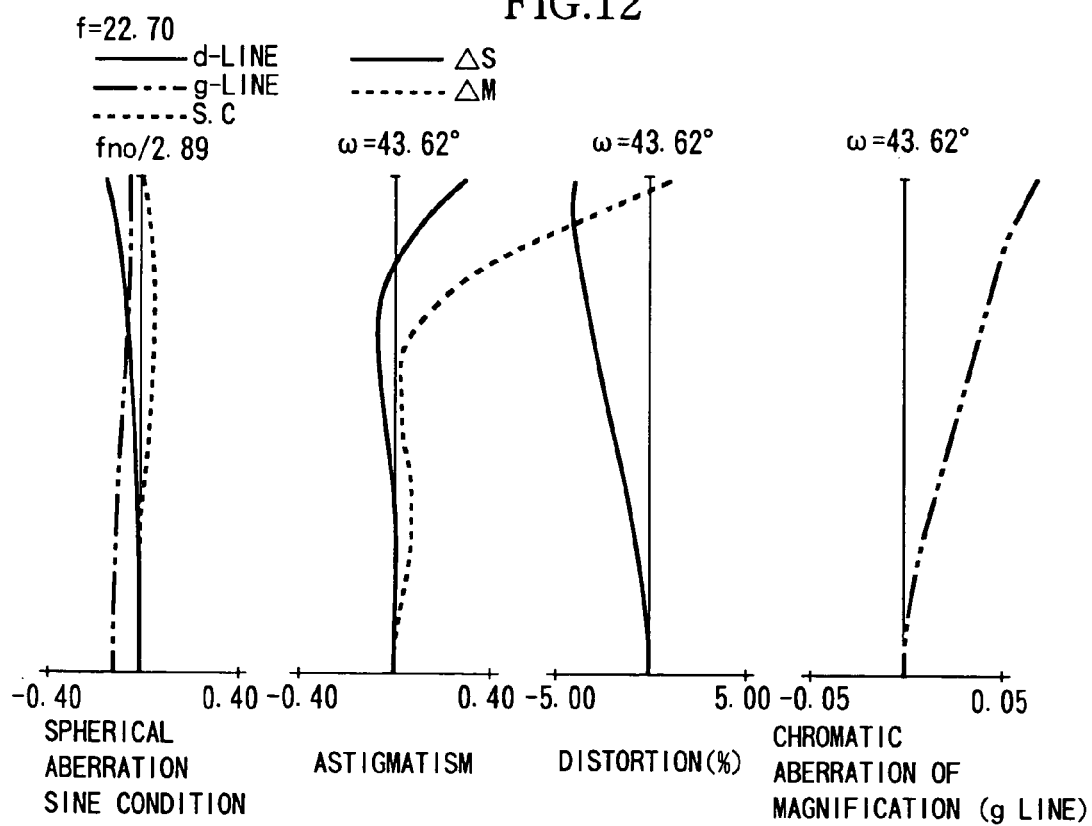
FIG. 12 is aberration diagrams of the zoom lens system of Embodiment 2 when set at the wide-angle end and focused on an object at 500 mm (from the image plane).
Figure 13:
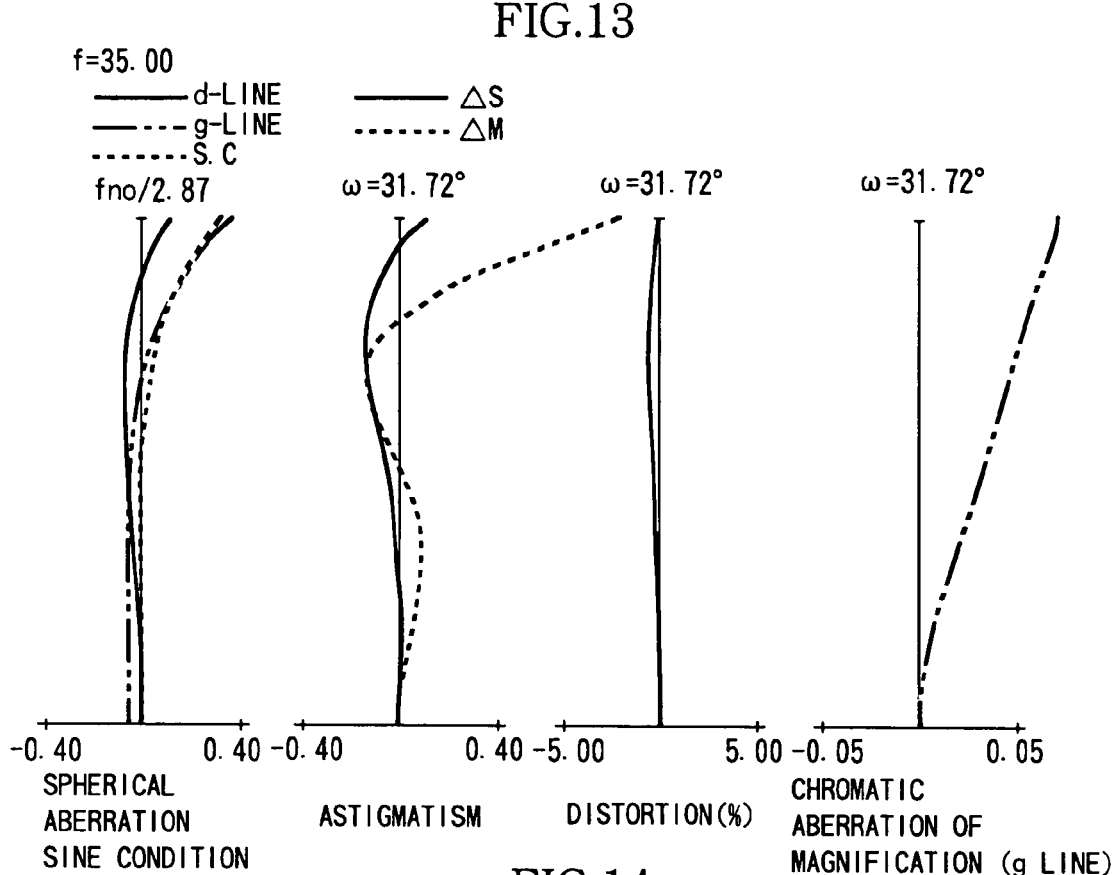
FIG. 13 is aberration diagrams of the zoom lens system of Embodiment 2 when set at the intermediate zoom position and focused on an object at 500 mm (from the image plane).
Figure 14:
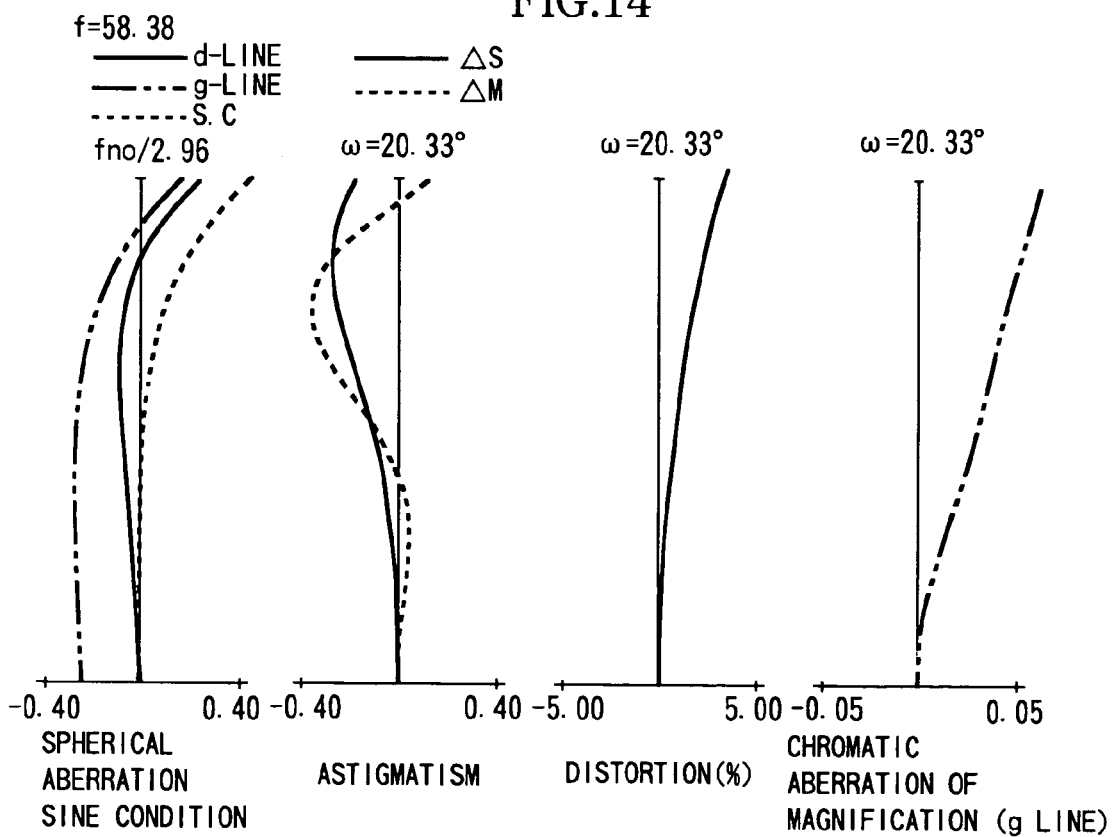
FIG. 14 is aberration diagrams of the zoom lens system of Embodiment 2 when set at the telephoto end and focused on an object at 500 mm (from the image plane).

FIG. 8 is a sectional view of a zoom lens of Embodiment 2. FIG. 9, FIG. 10, and FIG. 11 show aberration diagrams of the zoom lens of Embodiment 2 when focused on an infinity object while being set at the wide-angle end, an intermediate zoom position, and the telephoto end, respectively. FIG. 12, FIG. 13, and FIG. 14 show aberration diagrams of the zoom lens of Embodiment 2 when focused on an object at a distance (distance from the image plane) of 500 mm while being set at the wide-angle end, the intermediate zoom position, and the telephoto end, respectively, with the numerical values of numerical examples to be described below being expressed in units of mm.

Figure 15:
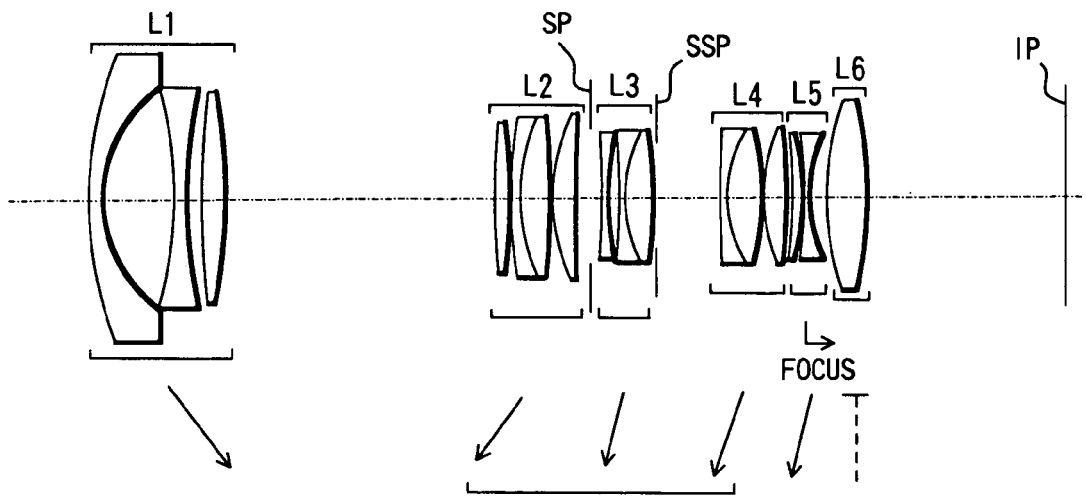
FIG. 15 is a sectional view of a zoom lens system of Embodiment 3.
Figure 16:
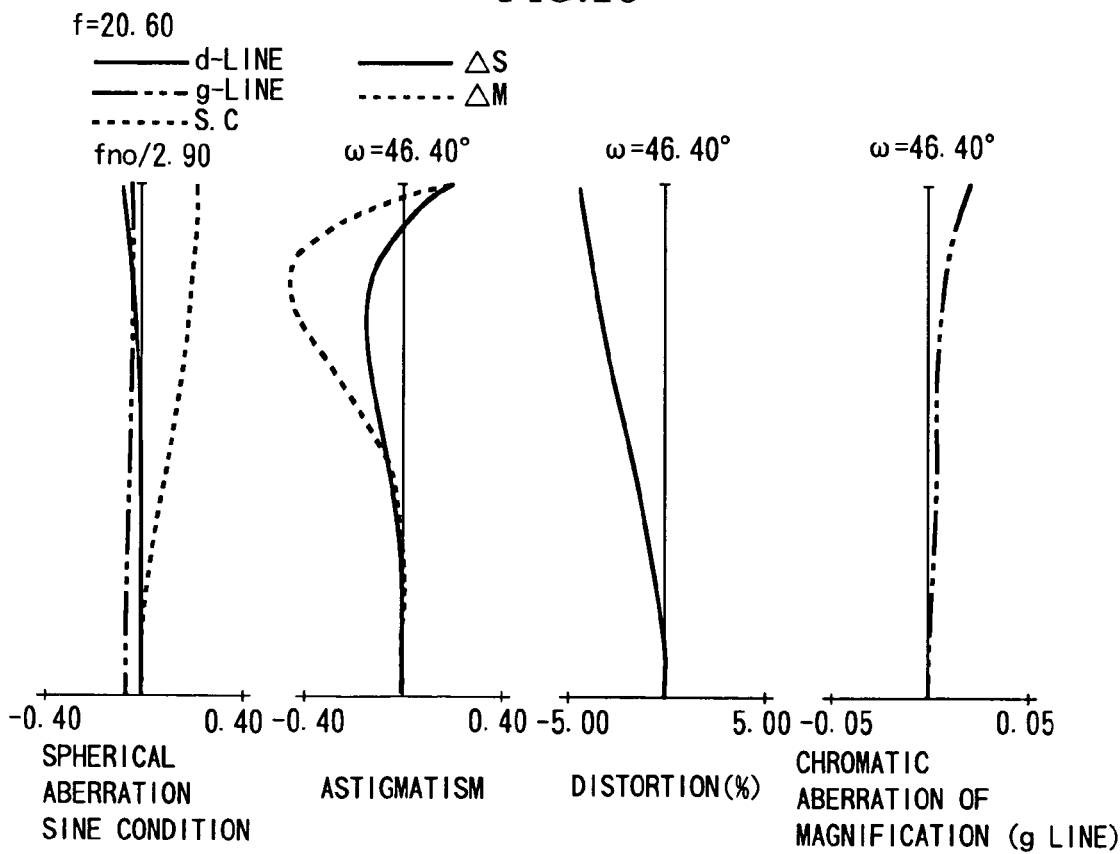
FIG. 16 is aberration diagrams of the zoom lens system of Embodiment 3 when set at the wide-angle end and focused on an infinity object.
Figure 17:
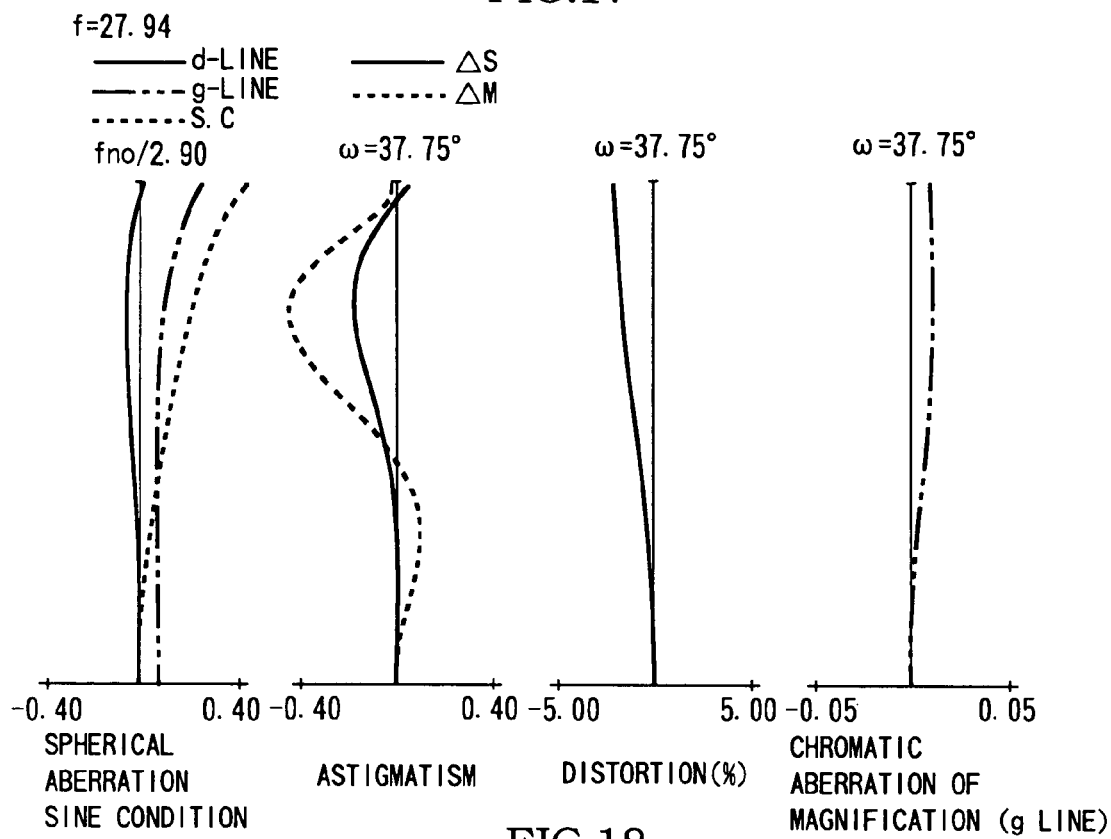
FIG. 17 is aberration diagrams of the zoom lens system of Embodiment 3 when set at an intermediate zoom position and focused on an infinity object.
Figure 18:
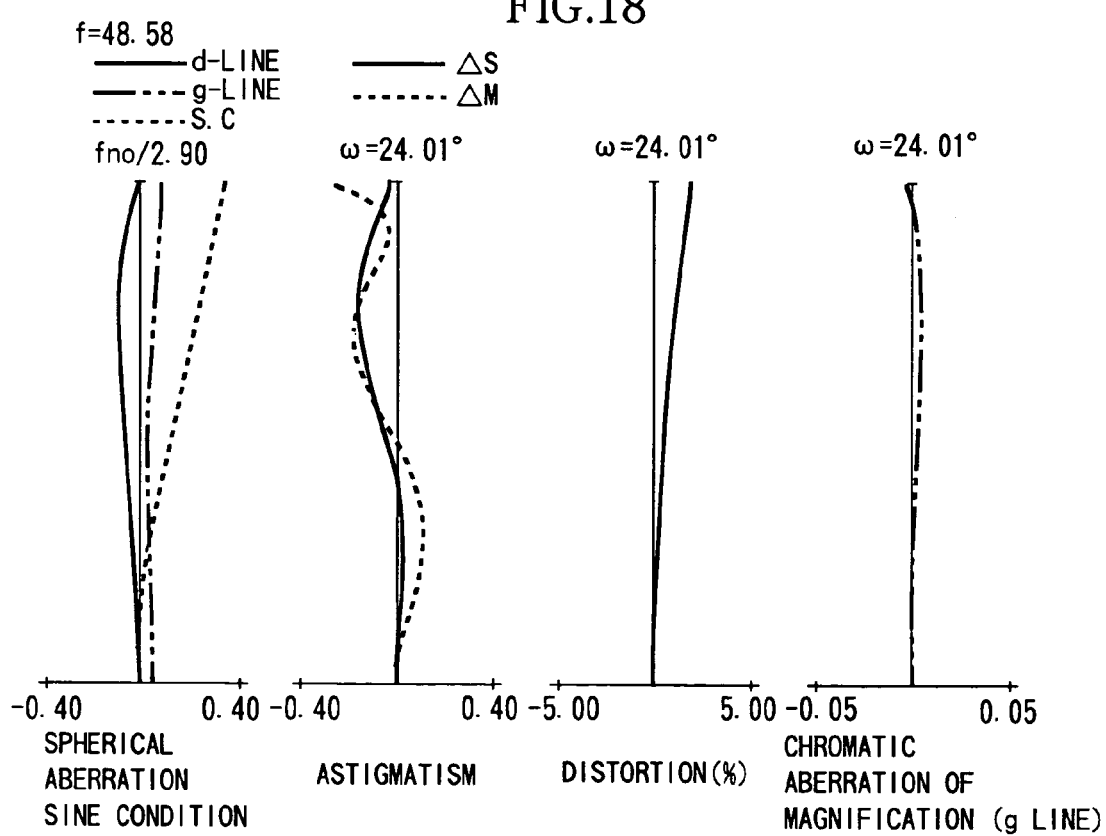
FIG. 18 is aberration diagrams of the zoom lens system of Embodiment 3 when set at the telephoto end and focused on an infinity object.
Figure 21:
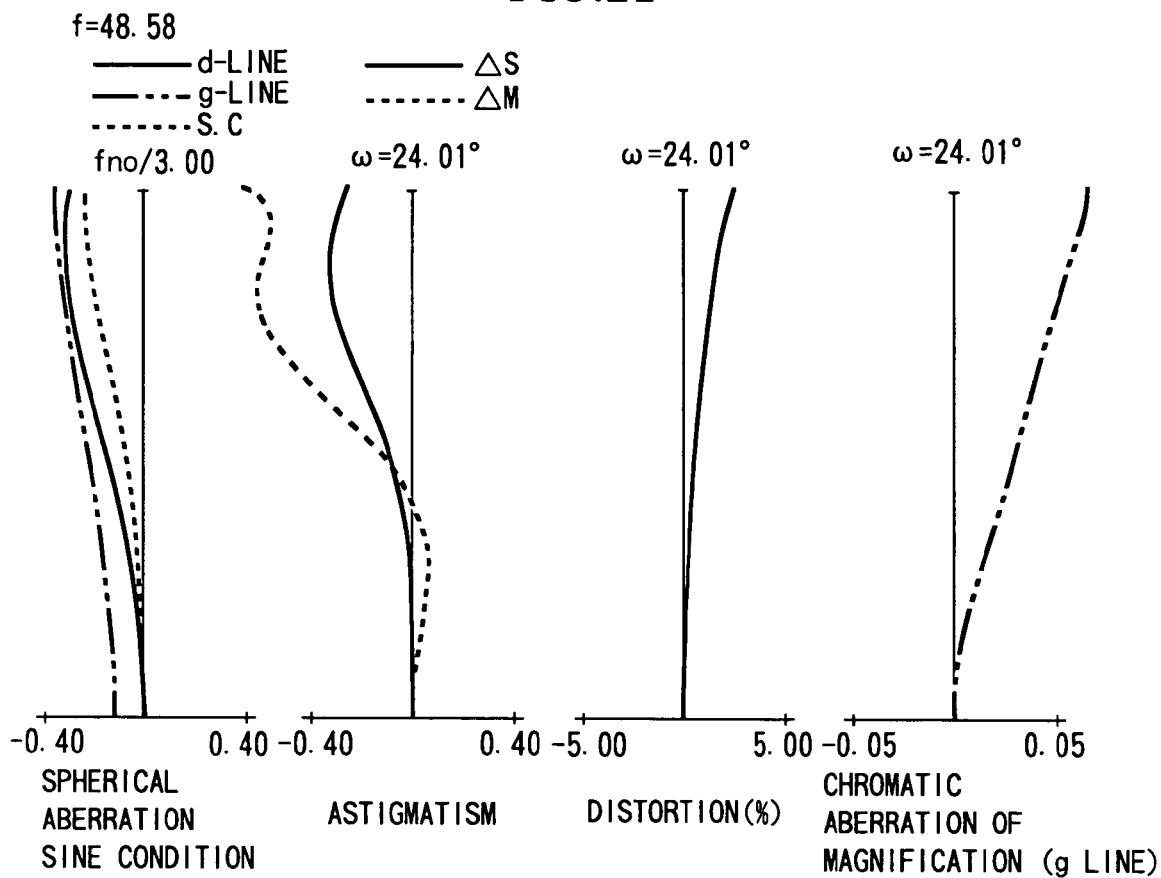
FIG. 21 is aberration diagrams of the zoom lens system of Embodiment 3 when set at the telephoto end and focused on an object at 500 mm (from the image plane).

FIG. 15 is a sectional view of a zoom lens of Embodiment 3. FIG. 16, FIG. 17, and FIG. 18 show aberration diagrams of the zoom lens of Embodiment 3 when focused on an infinity object while being set at the wide-angle end, an intermediate zoom position, and the telephoto end, respectively. FIG. 19, FIG. 20, and FIG. 21 show aberration diagrams of the zoom lens of Embodiment 3 when focused on an object at a distance (distance from the image plane) of 500 mm while being set at the wide-angle end, the intermediate zoom position, and the telephoto end, respectively, with the numerical values of numerical examples to be described below being expressed in units of mm.

Figure 22:
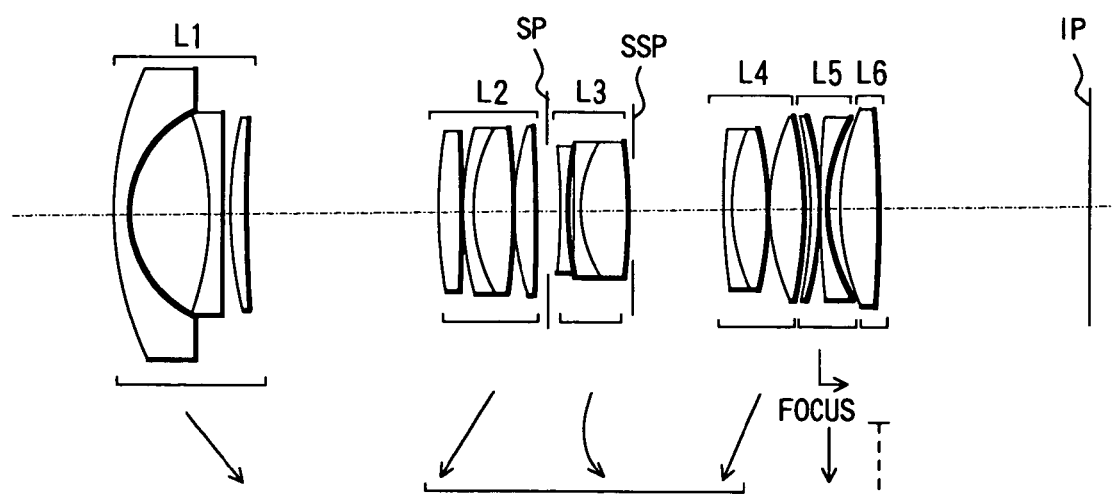
FIG. 22 is a sectional view of a zoom lens system of Embodiment 4.
Figure 23:
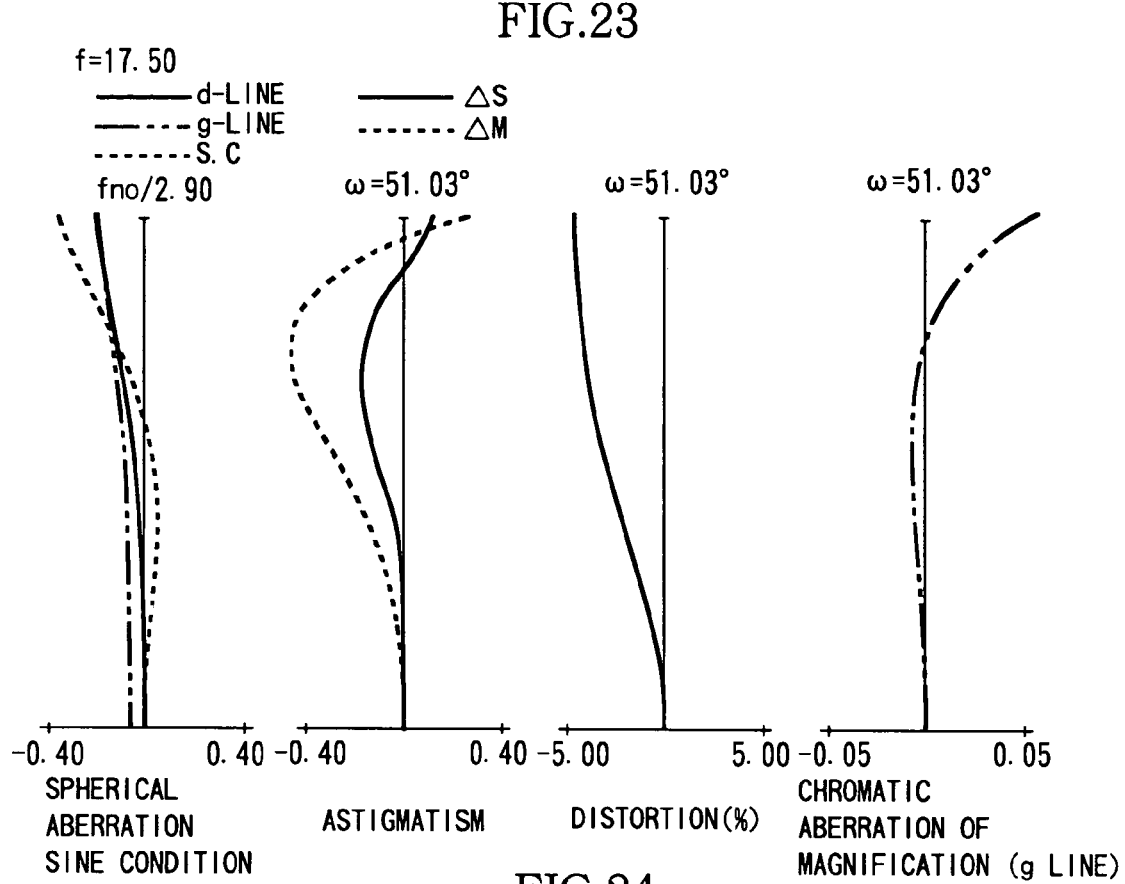
FIG. 23 is aberration diagrams of the zoom lens system of Embodiment 4 when set at the wide-angle end and focused on an infinity object.
Figure 24:
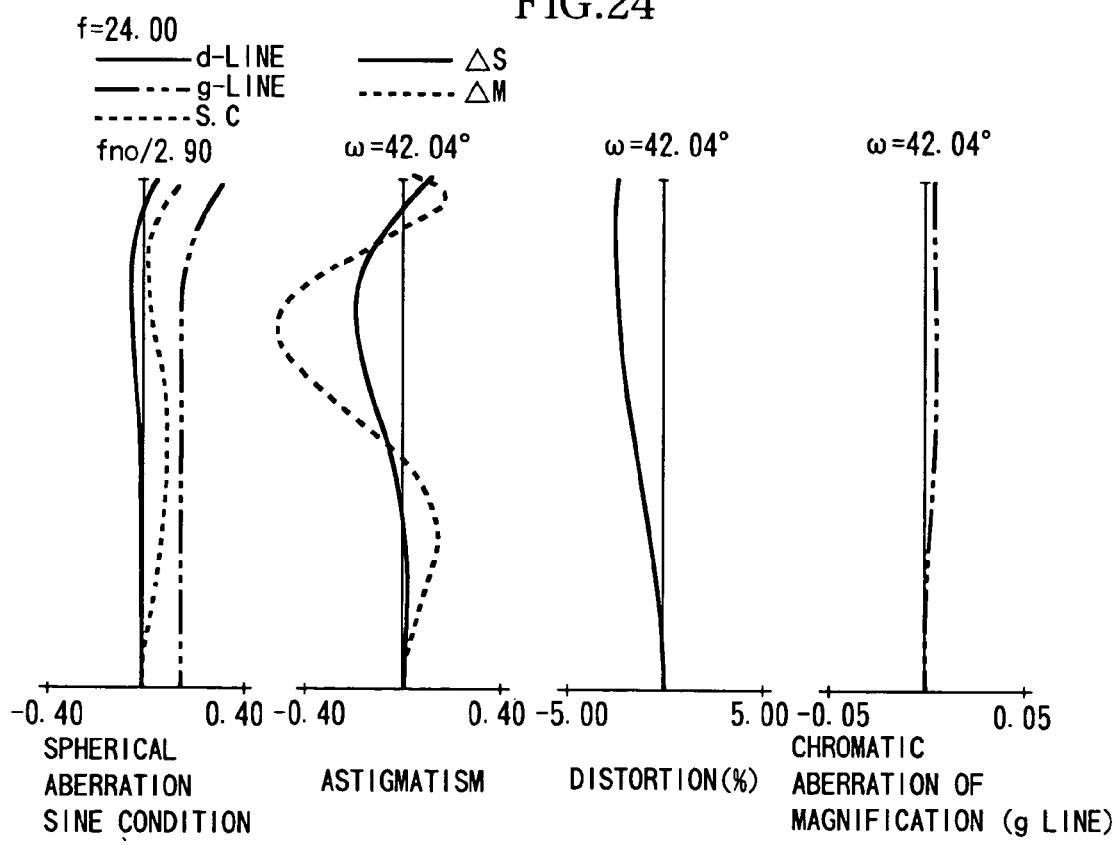
FIG. 24 is aberration diagrams of the zoom lens system of Embodiment 4 when set at an intermediate zoom position and focused on an infinity object.
Figure 27:
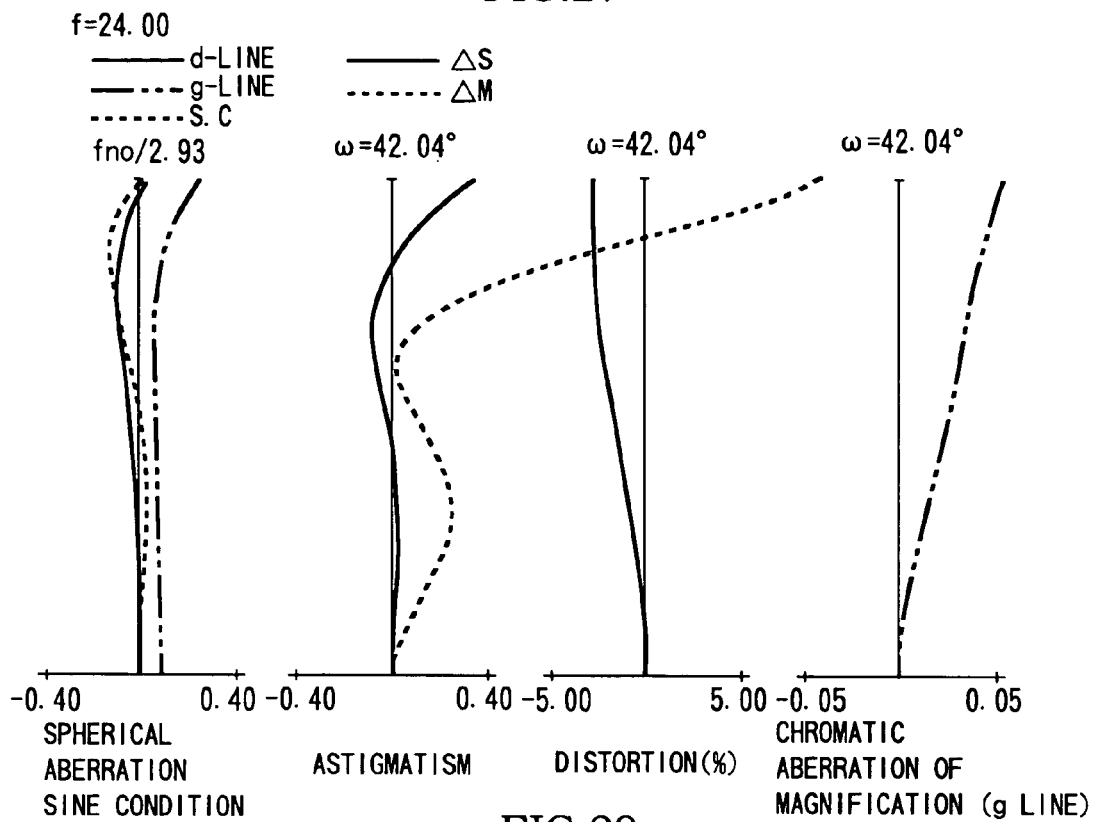
FIG. 27 is aberration diagrams of the zoom lens system of Embodiment 4 when set at the intermediate zoom position and focused on an object at 500 mm (from the image plane).
Figure 28:
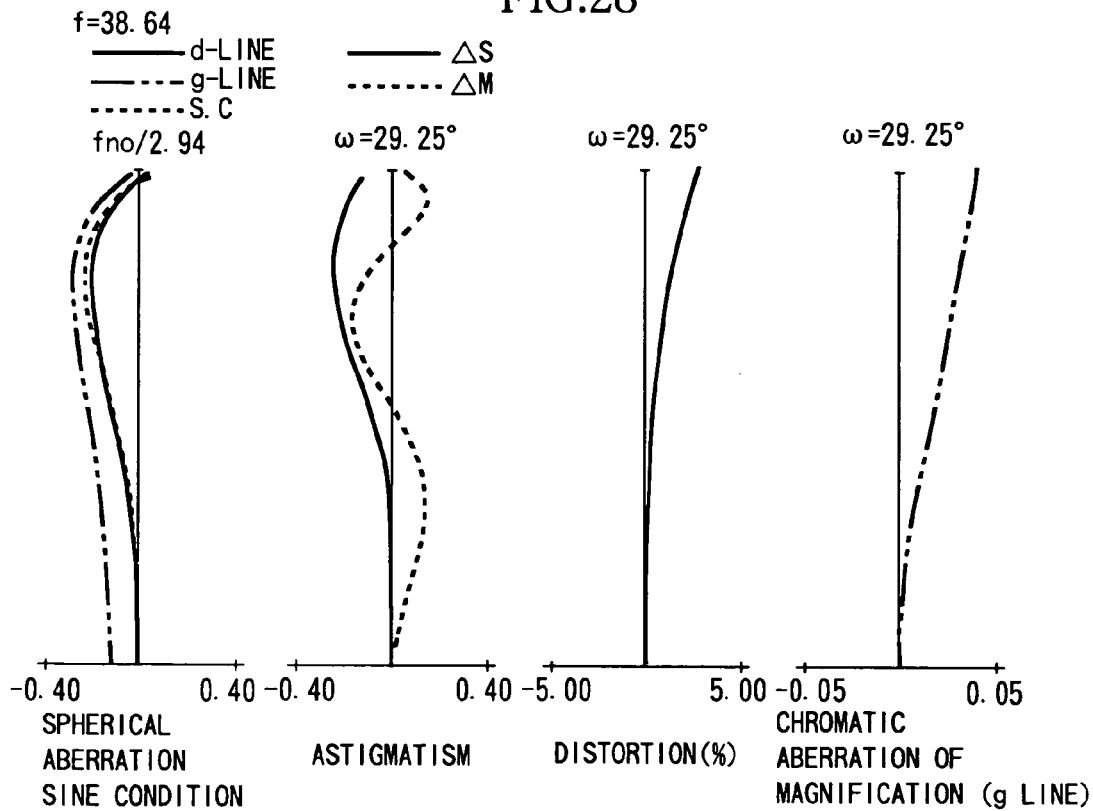
FIG. 28 is aberration diagrams of the zoom lens system of Embodiment 4 when set at the telephoto end and focused on an object at 500 mm (from the image plane).

FIG. 22 is a sectional view of a zoom lens of Embodiment 4. FIG. 23, FIG. 24, and FIG. 25 show aberration diagrams of the zoom lens of Embodiment 4 when focused on an infinity object while being set at the wide-angle end, an intermediate zoom position, and the telephoto end, respectively. FIG. 26, FIG. 27, and FIG. 28 show aberration diagrams of the zoom lens of Embodiment 4 when focused on an object at a distance (distance from the image plane) of 500 mm while being set at the wide-angle end, the intermediate zoom position, and the telephoto end, respectively, with the numerical values of numerical examples to be described below being expressed in units of mm.

Figure 29:
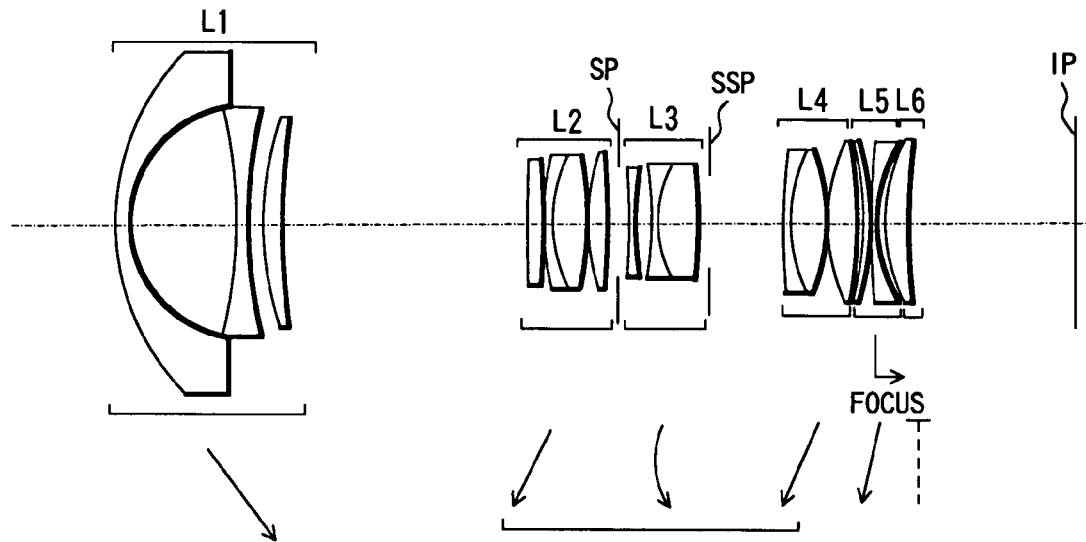
FIG. 29 is a sectional view of a zoom lens system of Embodiment 5.
Figure 30:
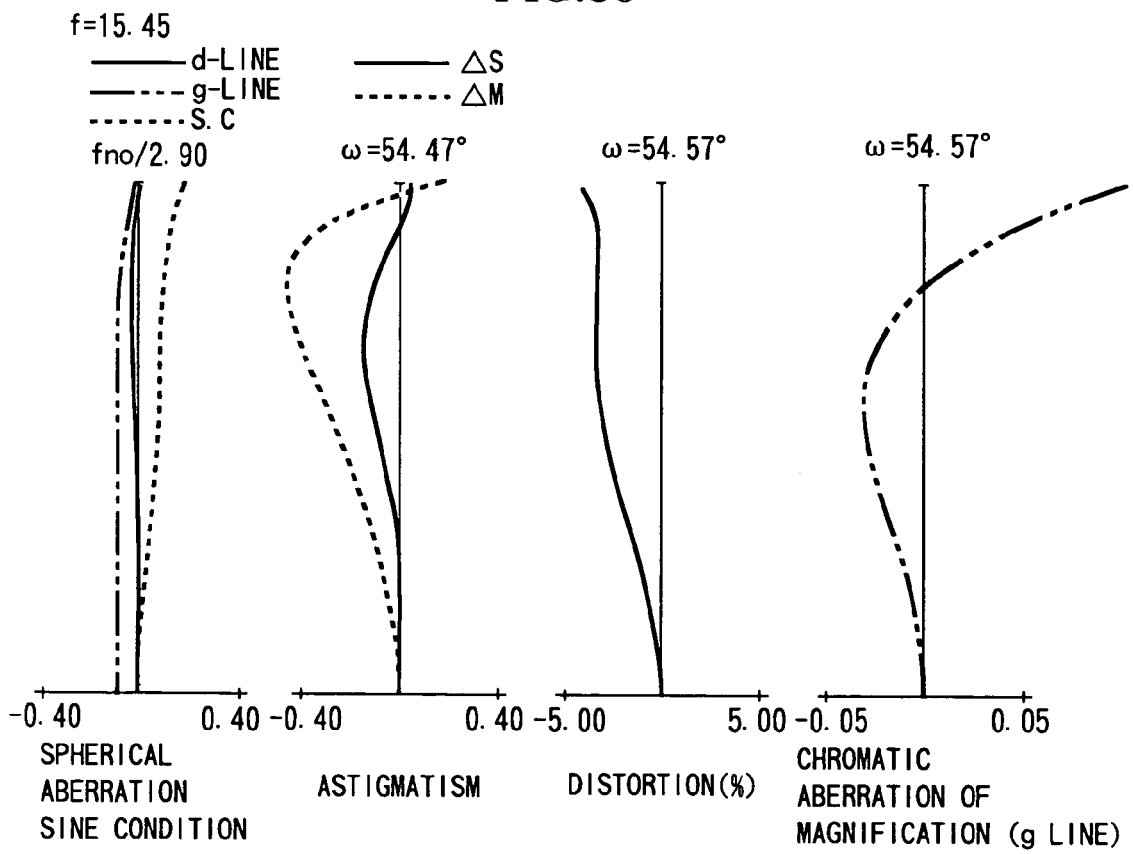
FIG. 30 is aberration diagrams of the zoom lens system of Embodiment 5 when set at the wide-angle end and focused on an infinity object.
Figure 33:
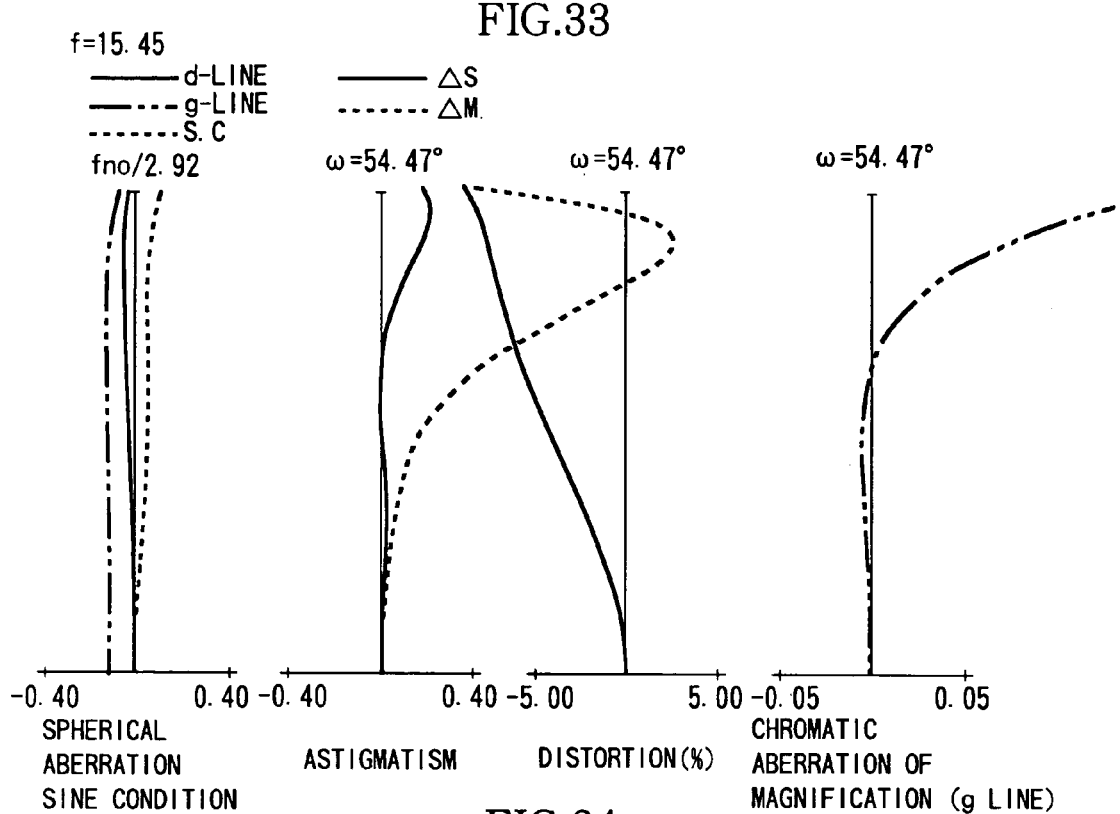
FIG. 33 is aberration diagrams of the zoom lens system of Embodiment 5 when set at the wide-angle end and focused on an object at 500 mm (from the image plane).
Figure 34:
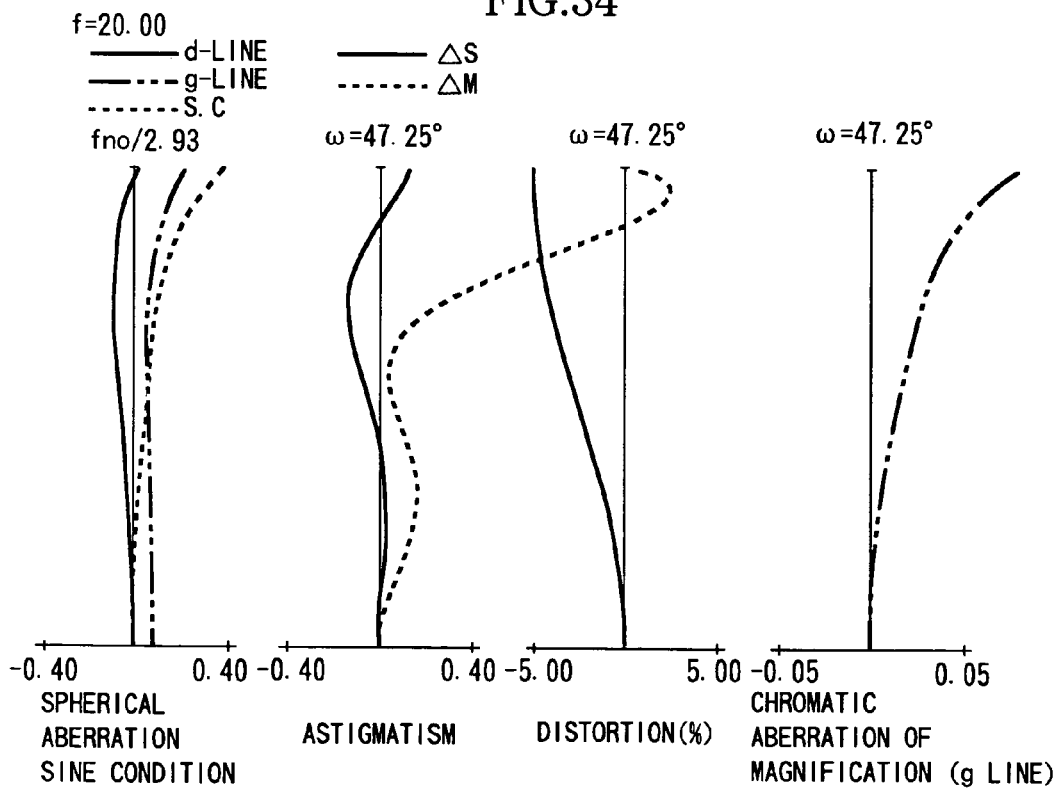
FIG. 34 is aberration diagrams of the zoom lens system of Embodiment 5 when set at the intermediate zoom position and focused on an object at 500 mm (from the image plane).
Figure 35:
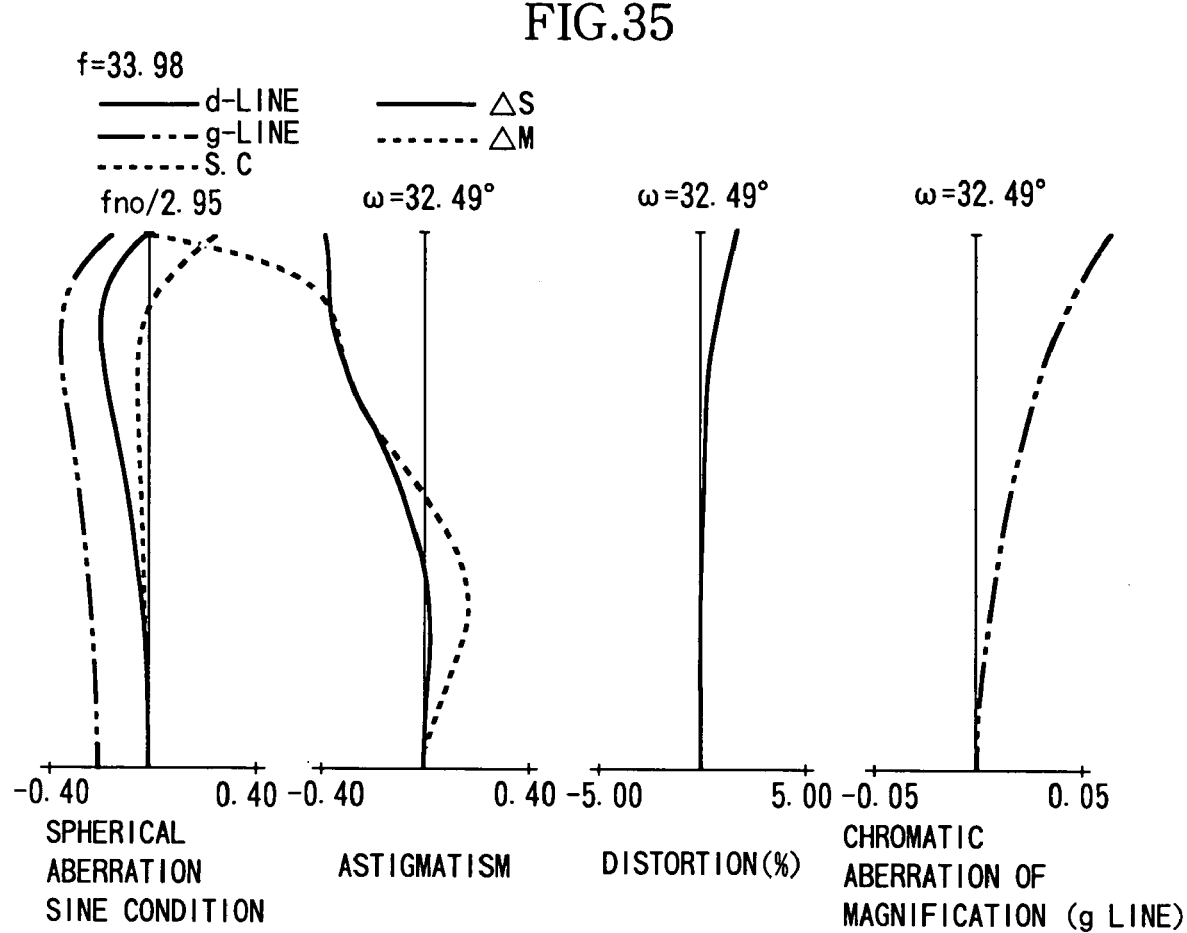
FIG. 35 is aberration diagrams of the zoom lens system of Embodiment 5 when set at the telephoto end and focused on an object at 500 mm (from the image plane).

FIG. 29 is a sectional view of a zoom lens of Embodiment 5. FIG. 30, FIG. 31, and FIG. 32 show aberration diagrams of the zoom lens of Embodiment 5 when focused on an infinity object while being set at the wide-angle end, an intermediate zoom position, and the telephoto end, respectively. FIG. 33, FIG. 34, and FIG. 35 show aberration diagrams of the zoom lens of Embodiment 5 when focused on an object at a distance (distance from the image plane) of 500 mm while being set at the wide-angle end, the intermediate zoom position, and the telephoto end, respectively, with the numerical values of numerical examples to be described below being expressed in units of mm.

Figure 36:
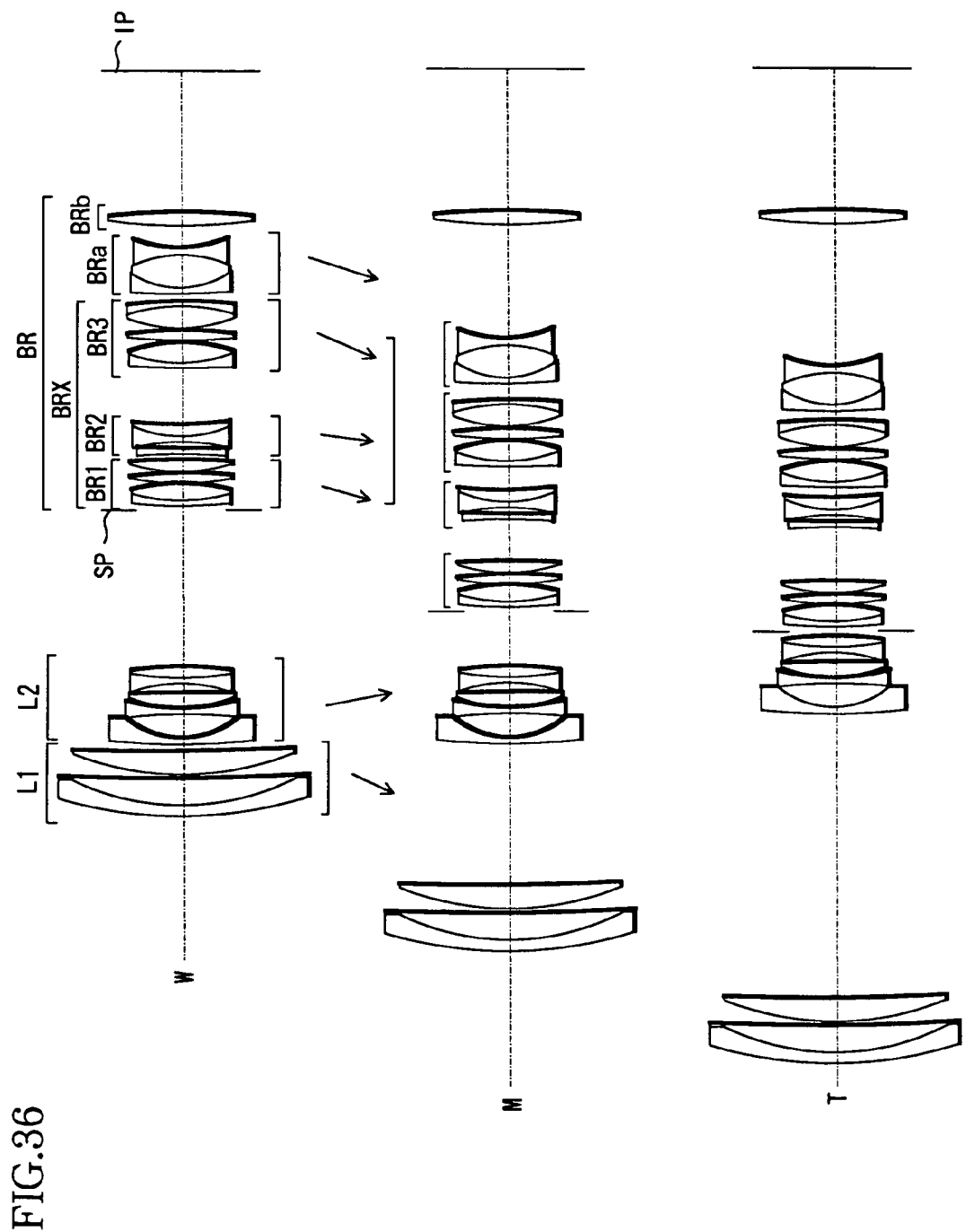
FIG. 36 is sectional views of a zoom lens system of Embodiment 6.

FIG. 36 shows sectional views of a zoom lens of Embodiment 6, with (W) being the sectional view for the wide-angle end, (M) being that for an intermediate zoom position, and (T) being that for the telephoto end. FIG. 37, FIG. 38, and FIG. 39 show aberration diagrams of the zoom lens of Embodiment 6 when focused on an infinity object while being set at the wide-angle end, an intermediate zoom position, and the telephoto end, respectively. FIG. 40, FIG. 41, and FIG. 42 show aberration diagrams of the zoom lens of Embodiment 6 when focused on an object at a distance (distance from the image plane) of 500 mm while being set at the wide-angle end, the intermediate zoom position, and the telephoto end, respectively, with the numerical values of numerical examples to be described below being expressed in units of mm.

Figure 43:
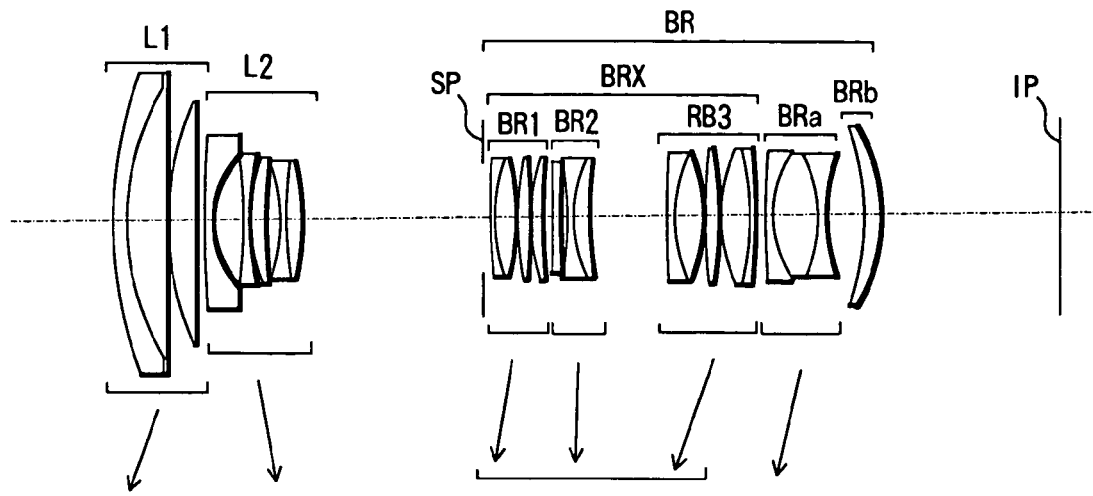
FIG. 43 is a sectional view of a zoom lens system of Embodiment 7.
Figure 44:
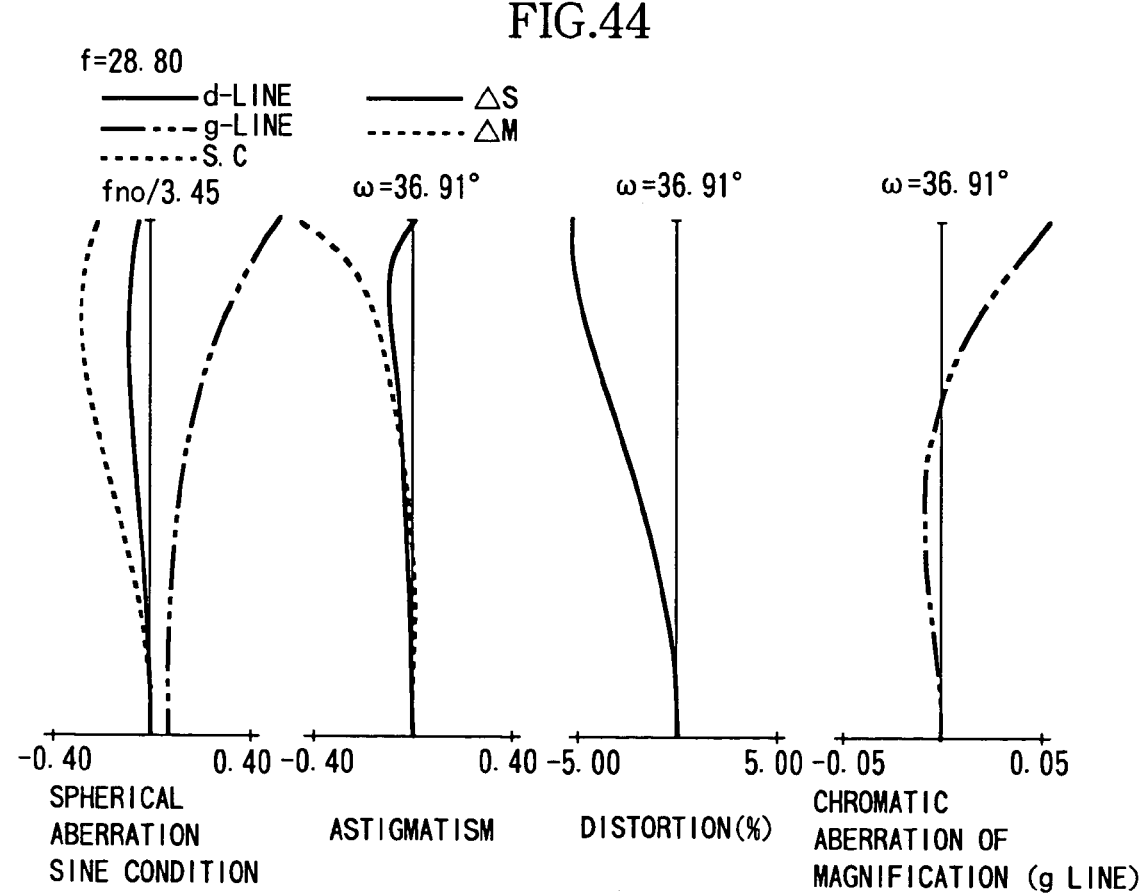
FIG. 44 is aberration diagrams of the zoom lens system of Embodiment 7 when set at the wide-angle end and focused on an infinity object.
Figure 45:
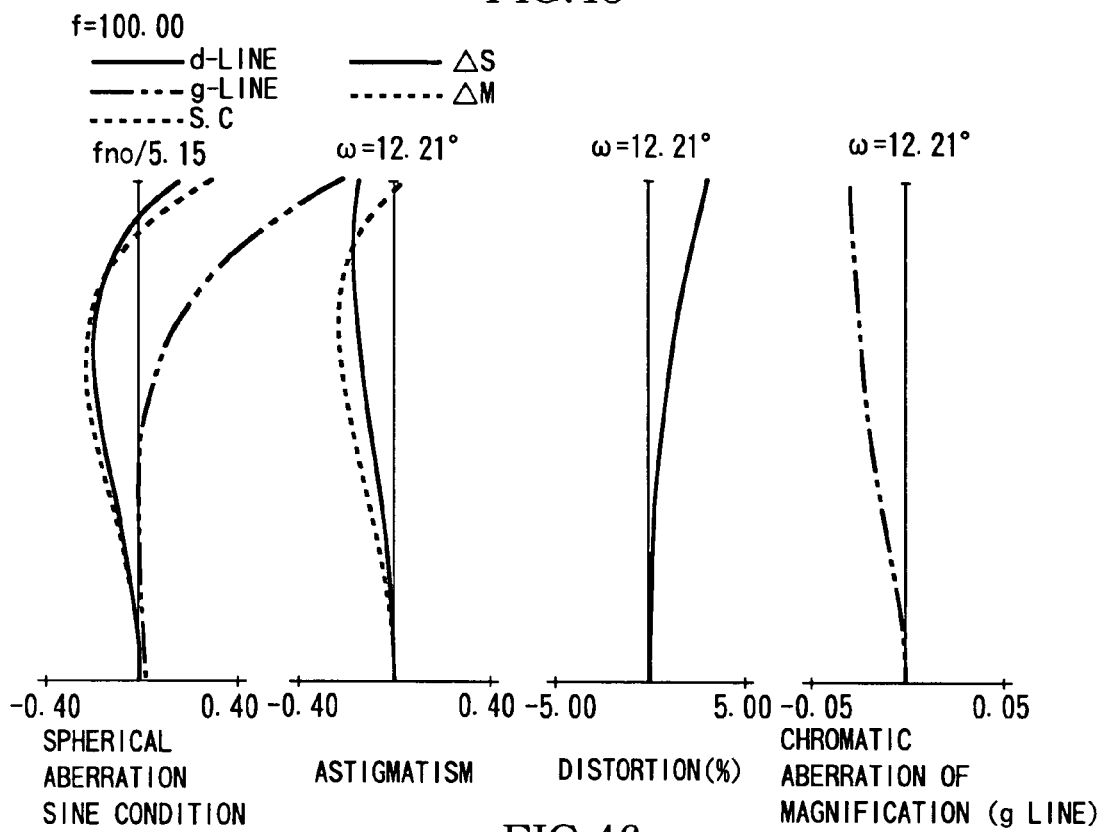
FIG. 45 is aberration diagrams of the zoom lens system of Embodiment 7 when set at an intermediate zoom position and focused on an infinity object.
Figure 46:
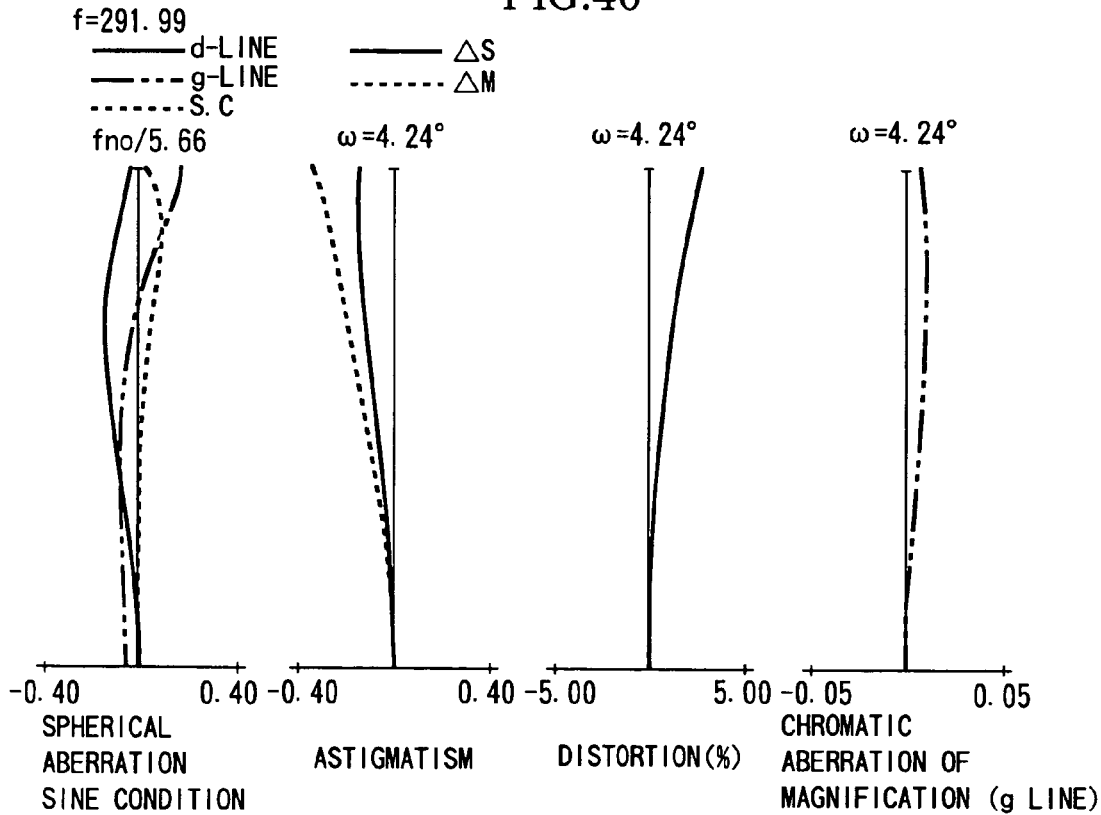
FIG. 46 is aberration diagrams of the zoom lens system of Embodiment 7 when set at the telephoto end and focused on an infinity object.
Figure 49:
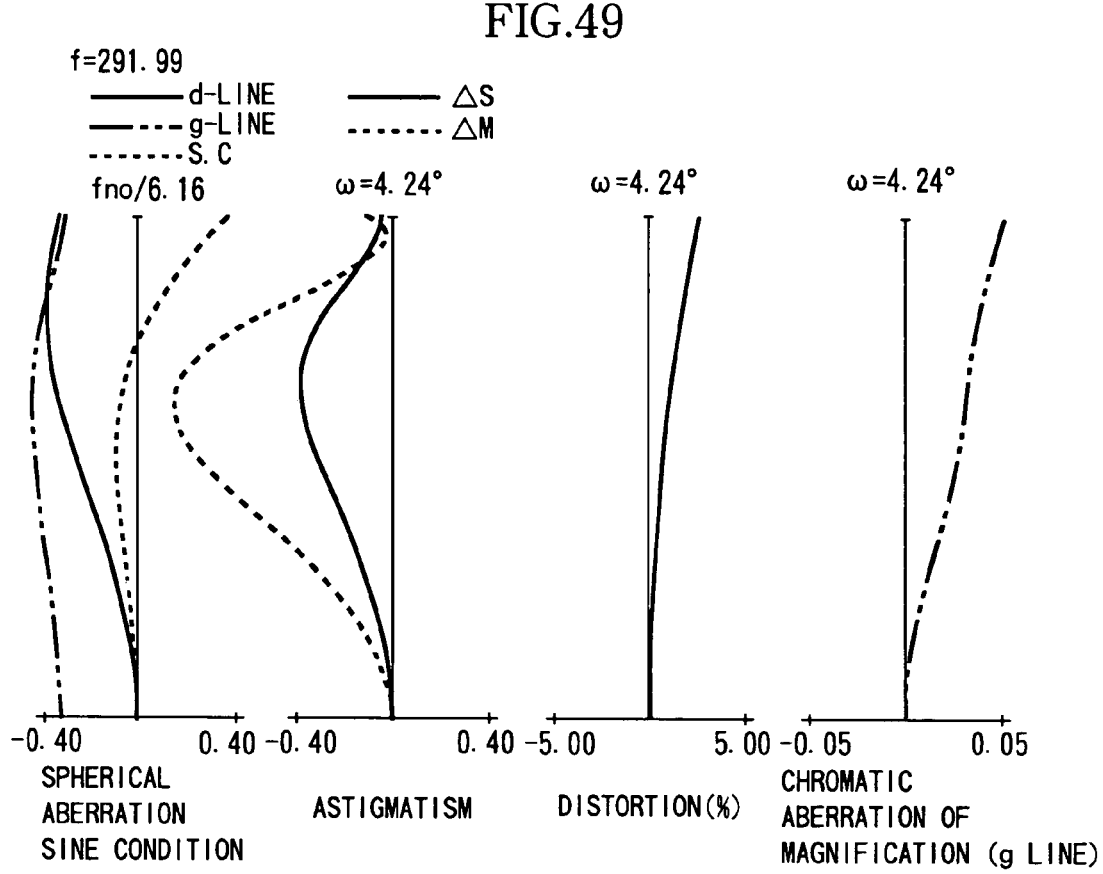
FIG. 49 is aberration diagrams of the zoom lens system of Embodiment 7 when set at the telephoto end and focused on an object at 500 mm (from the image plane).

FIG. 43 is a sectional view of a zoom lens of Embodiment 7. FIG. 44, FIG. 45, and FIG. 46 show aberration diagrams of the zoom lens of Embodiment 7 when focused on an infinity object while being set at the wide-angle end, an intermediate zoom position, and the telephoto end, respectively. FIG. 47, FIG. 48, and FIG. 49 show aberration diagrams of the zoom lens of Embodiment 7 when focused on an object at a distance (distance from the image plane) of 500 mm while being set at the wide-angle end, the intermediate zoom position, and the telephoto end, respectively, with the numerical values of numerical examples to be described below being expressed in units of mm.

Figure 50:
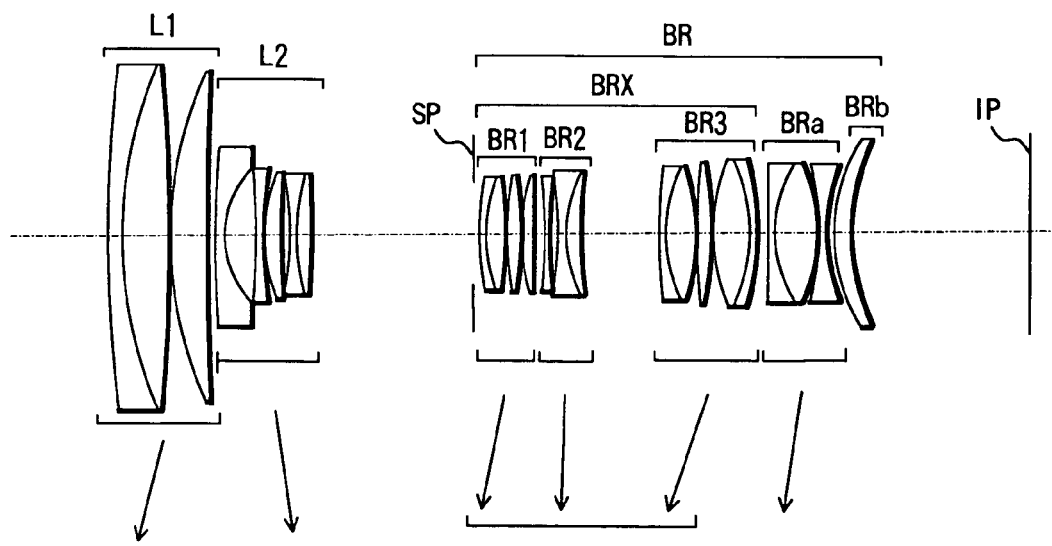
FIG. 50 is a sectional view of a zoom lens system of Embodiment 8.
Figure 51:
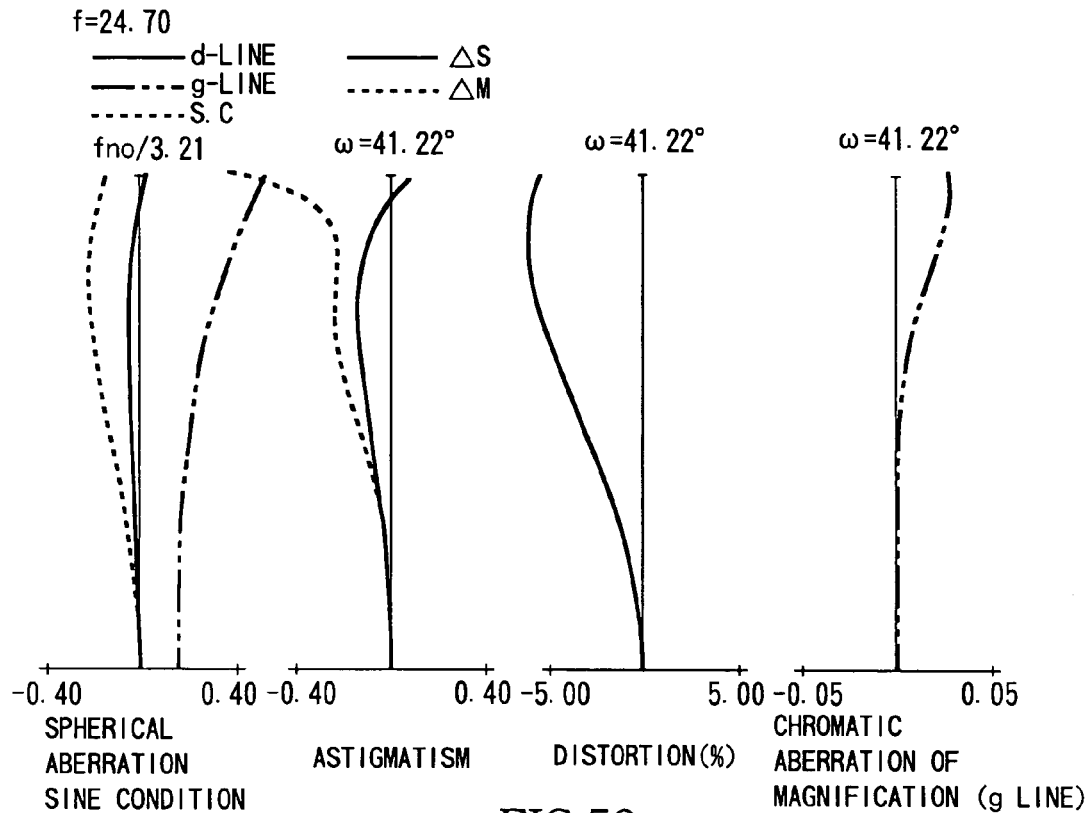
FIG. 51 is aberration diagrams of the zoom lens system of Embodiment 8 when set at the wide-angle end and focused on an infinity object.
Figure 52:
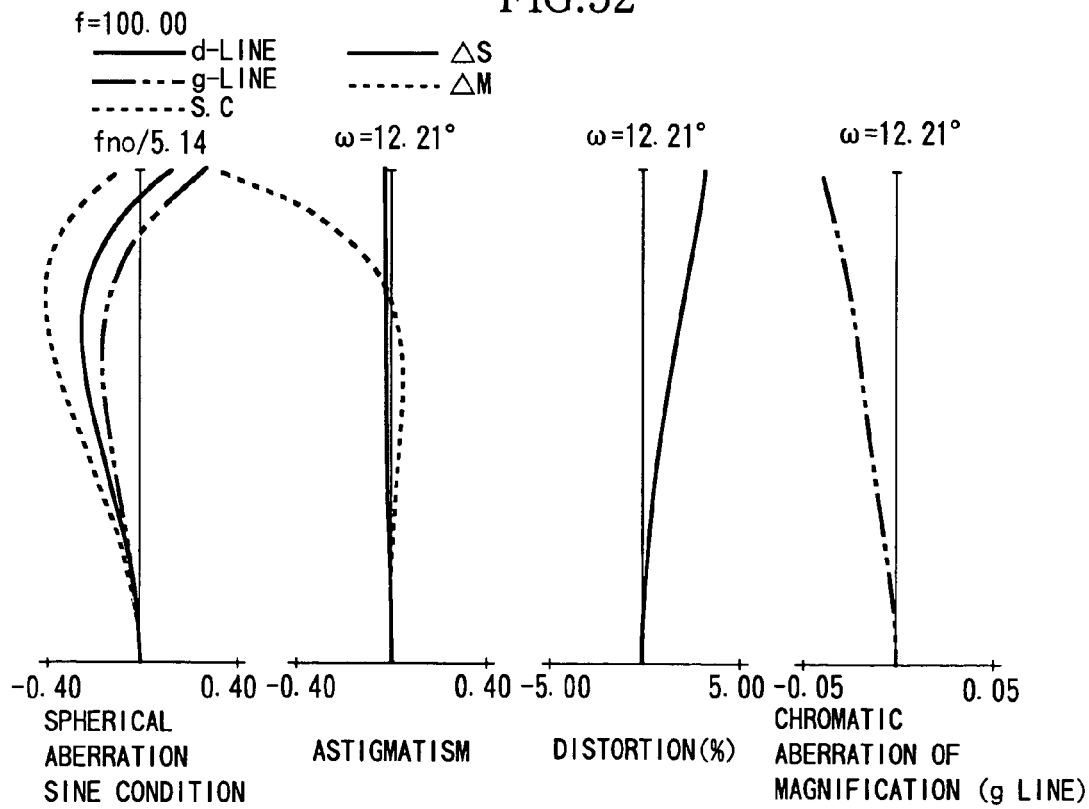
FIG. 52 is aberration diagrams of the zoom lens system of Embodiment 8 when set at an intermediate zoom position and focused on an infinity object.
Figure 53:
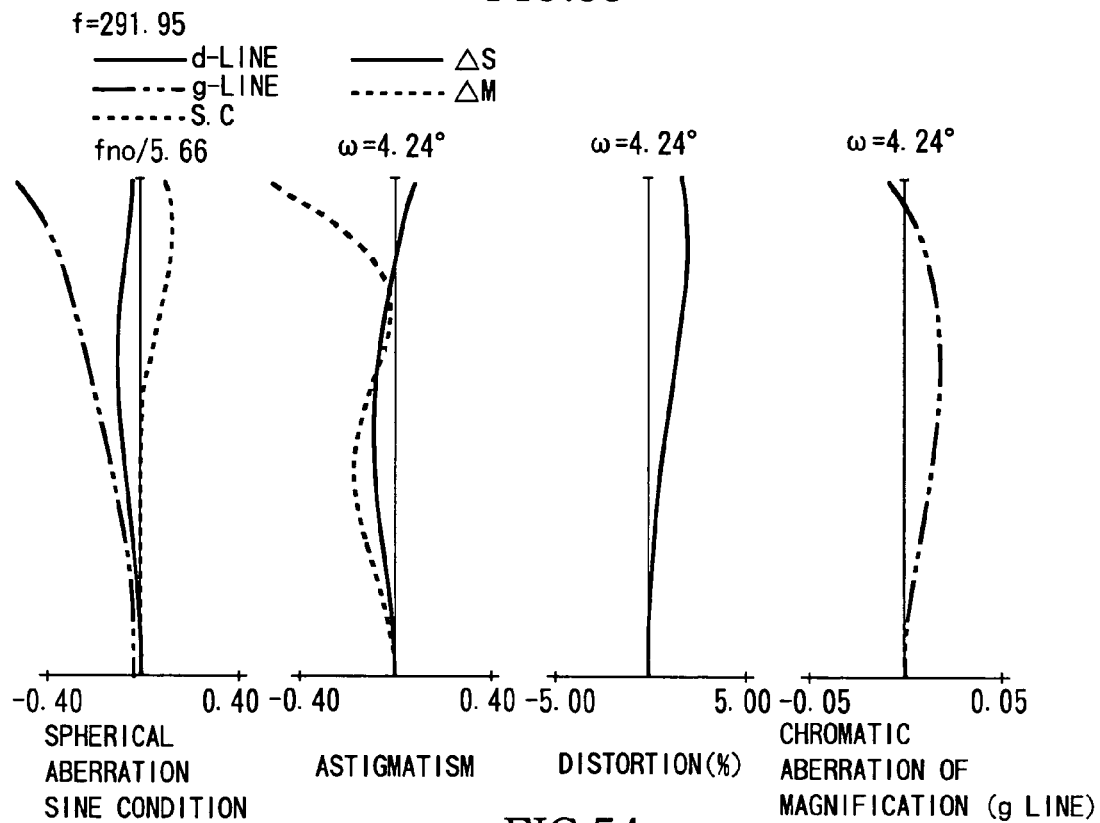
FIG. 53 is aberration diagrams of the zoom lens system of Embodiment 8 when set at the telephoto end and focused on an infinity object.
Figure 54:
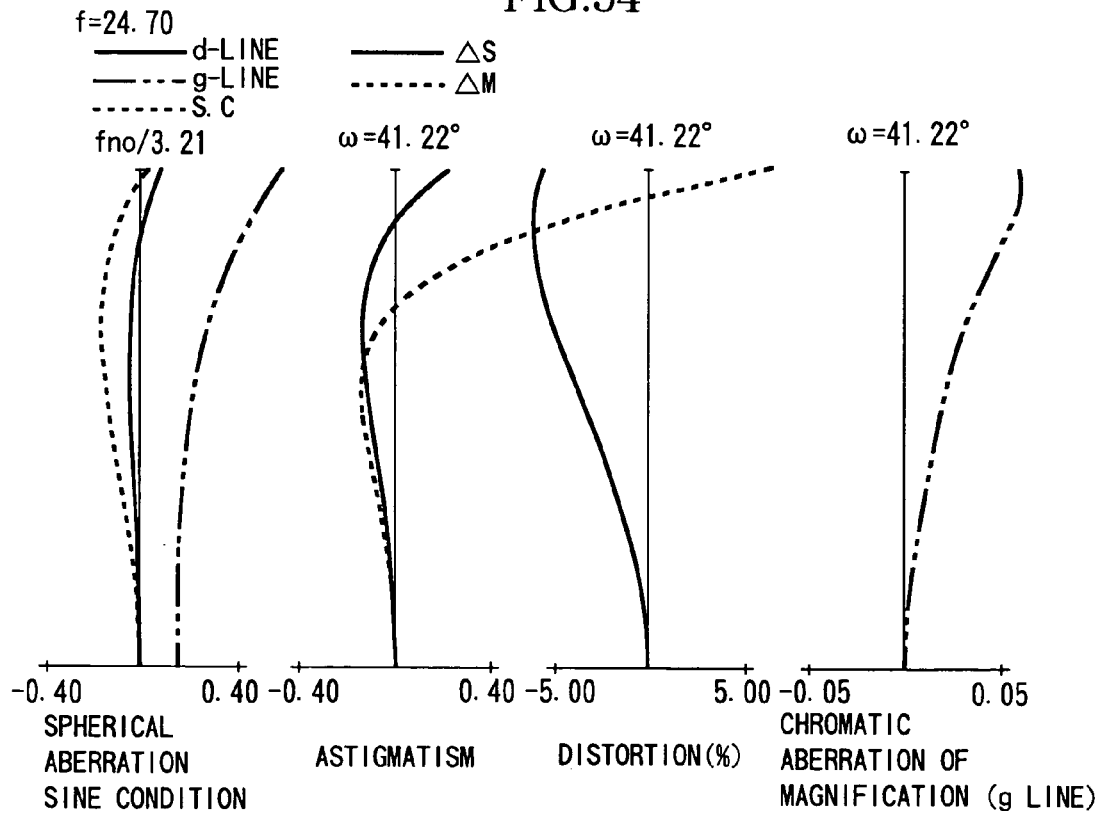
FIG. 54 is aberration diagrams of the zoom lens system of Embodiment 8 when set at the wide-angle end and focused on an object at 500 mm (from the image plane).
Figure 55:
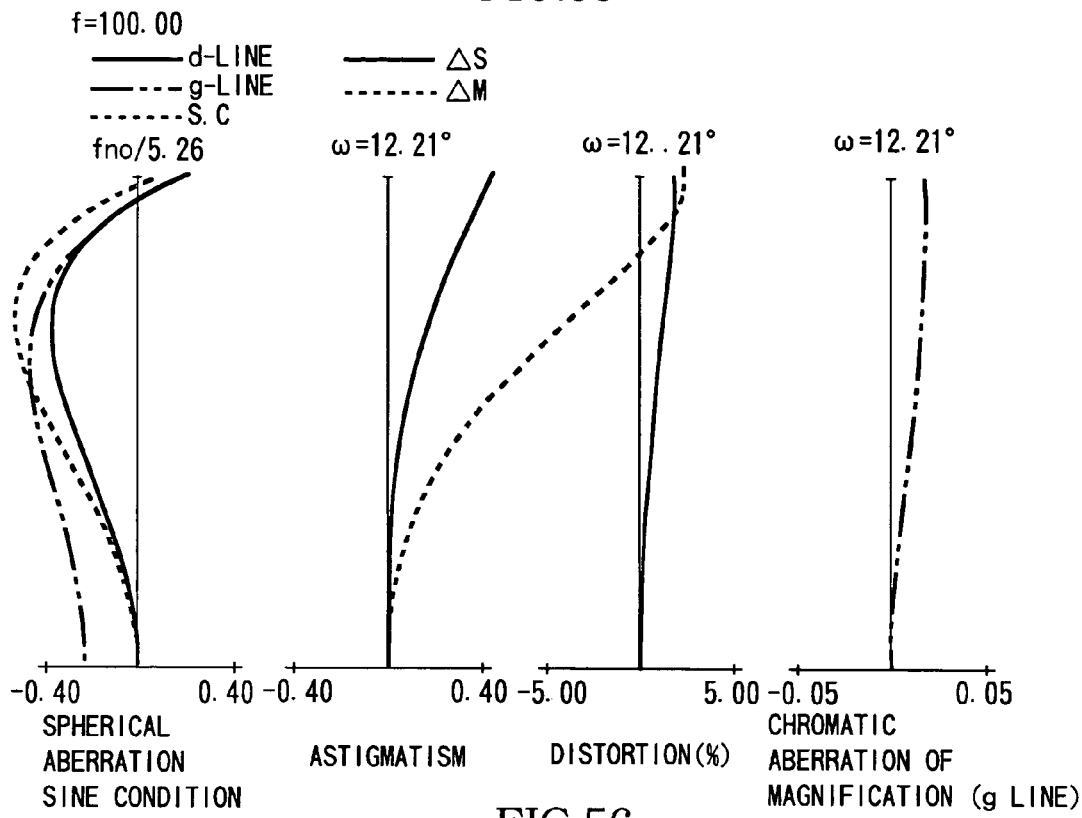
FIG. 55 is aberration diagrams of the zoom lens system of Embodiment 8 when set at the intermediate zoom position and focused on an object at 500 mm (from the image plane).
Figure 56:
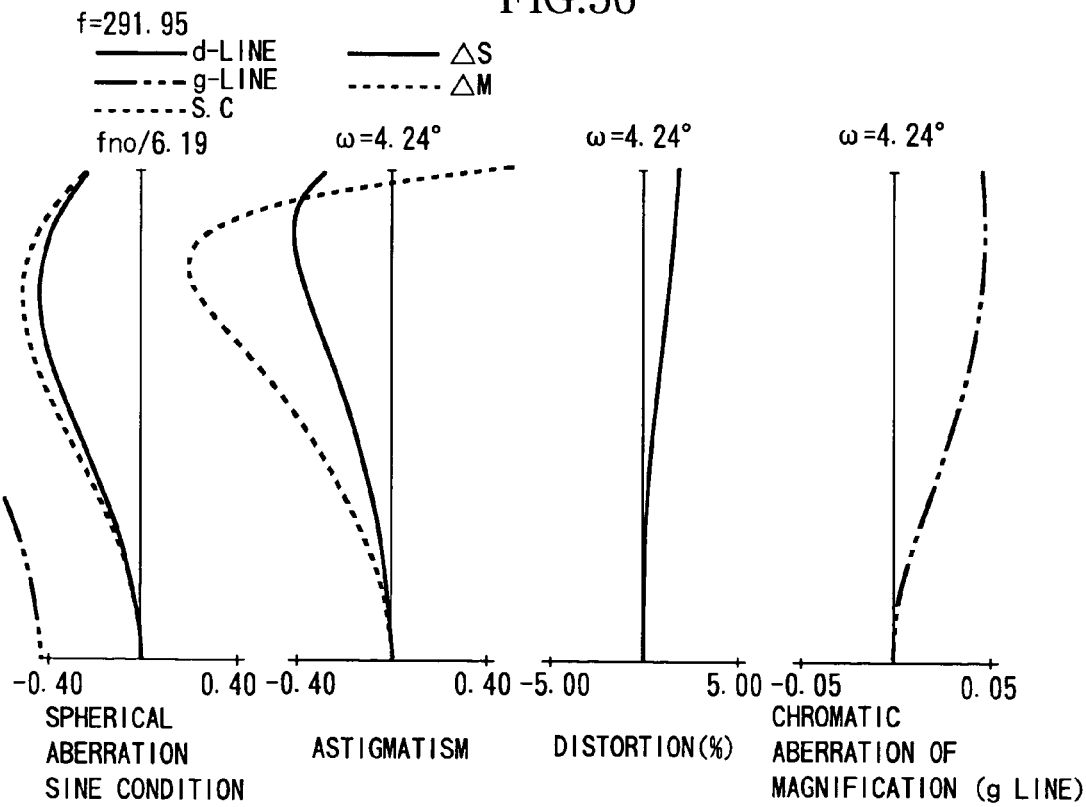
FIG. 56 is aberration diagrams of the zoom lens system of Embodiment 8 when set at the telephoto end and focused on an object at 500 mm (from the image plane).

FIG. 50 is a sectional view of a zoom lens of Embodiment 8. FIG. 51, FIG. 52, and FIG. 53 show aberration diagrams of the zoom lens of Embodiment 8 when focused on an infinity object while being set at the wide-angle end, an intermediate zoom position, and the telephoto end, respectively. FIG. 54, FIG. 55, and FIG. 56 show aberration diagrams of the zoom lens of Embodiment 8 when focused on an object at a distance (distance from the image plane) of 500 mm while being set at the wide-angle end, the intermediate zoom position, and the telephoto end, respectively, with the numerical values of numerical examples to be described below being expressed in units of mm.

Figure 57:
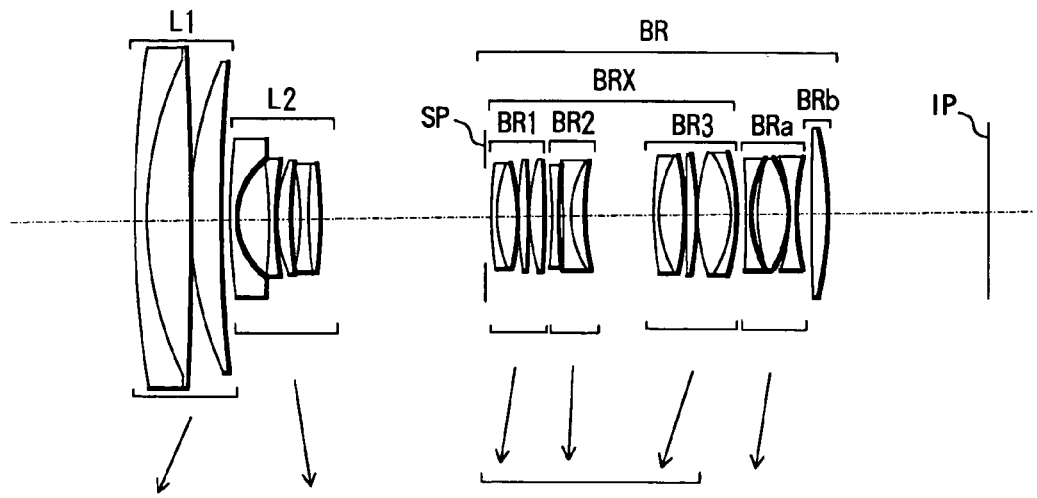
FIG. 57 is a sectional view of a zoom lens system of Embodiment 9.
Figure 58:
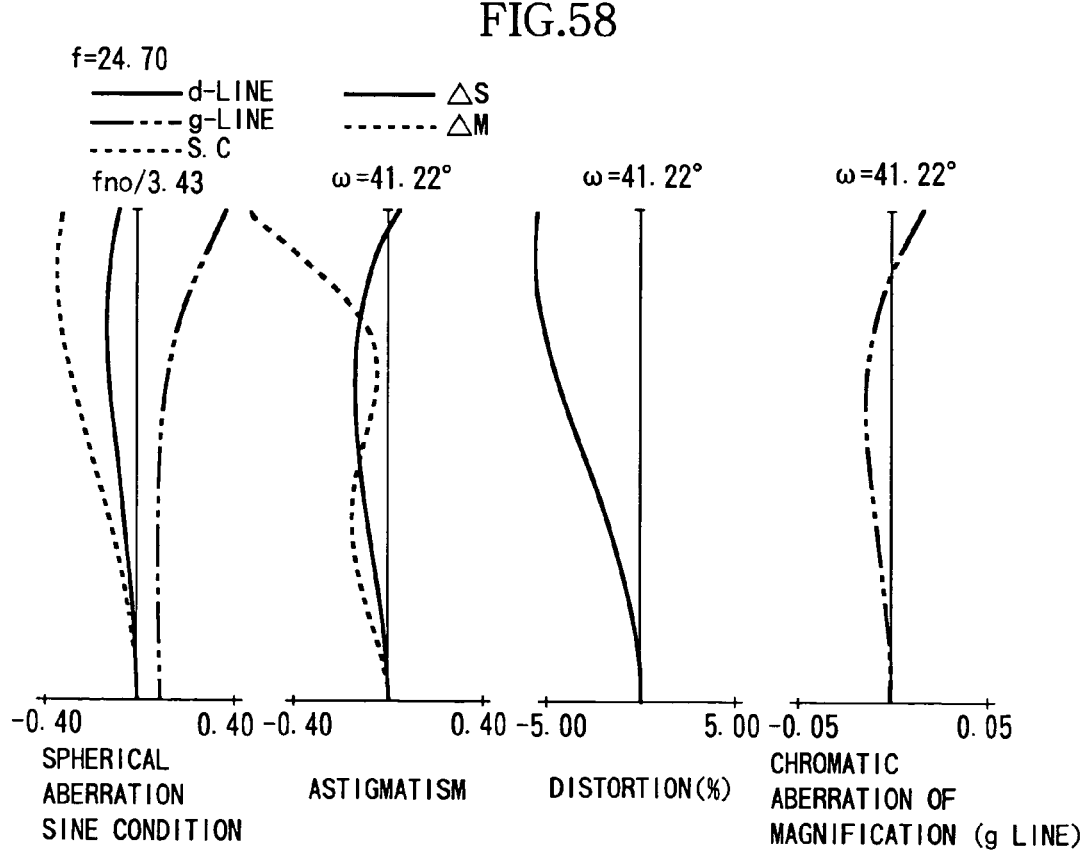
FIG. 58 is aberration diagrams of the zoom lens system of Embodiment 9 when set at the wide-angle end and focused on an infinity object.
Figure 59:
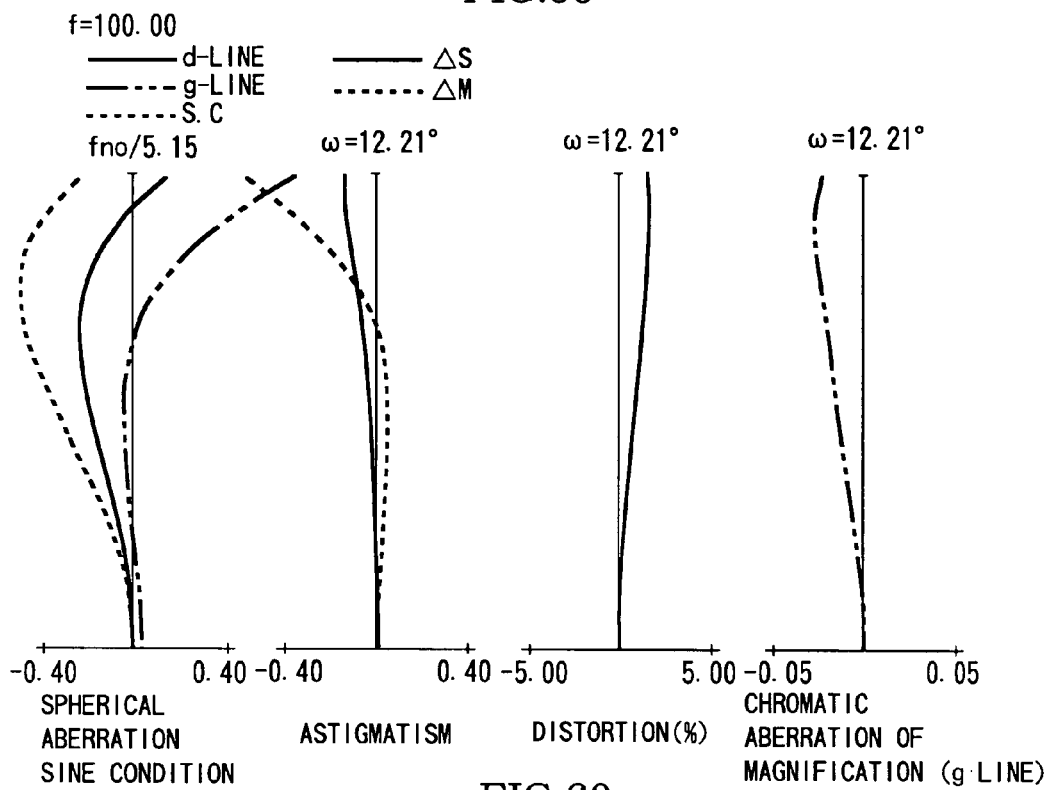
FIG. 59 is aberration diagrams of the zoom lens system of Embodiment 9 when set at an intermediate zoom position and focused on an infinity object.
Figure 60:
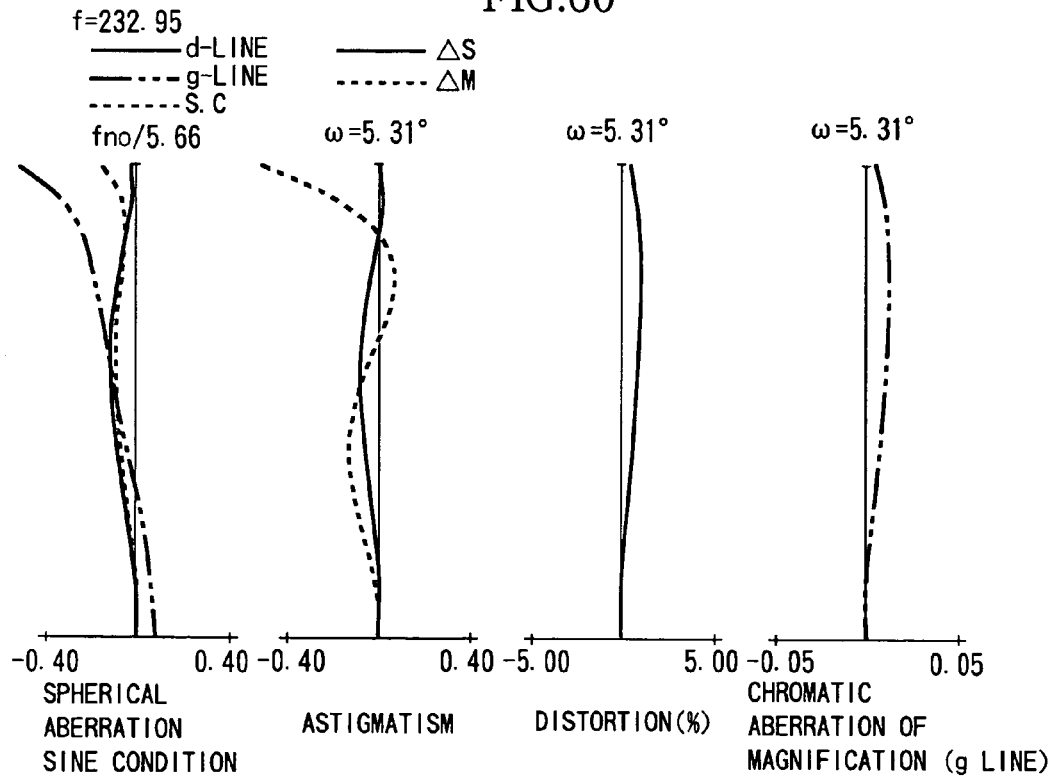
FIG. 60 is aberration diagrams of the zoom lens system of Embodiment 9 when set at the telephoto end and focused on an infinity object.
Figure 61:
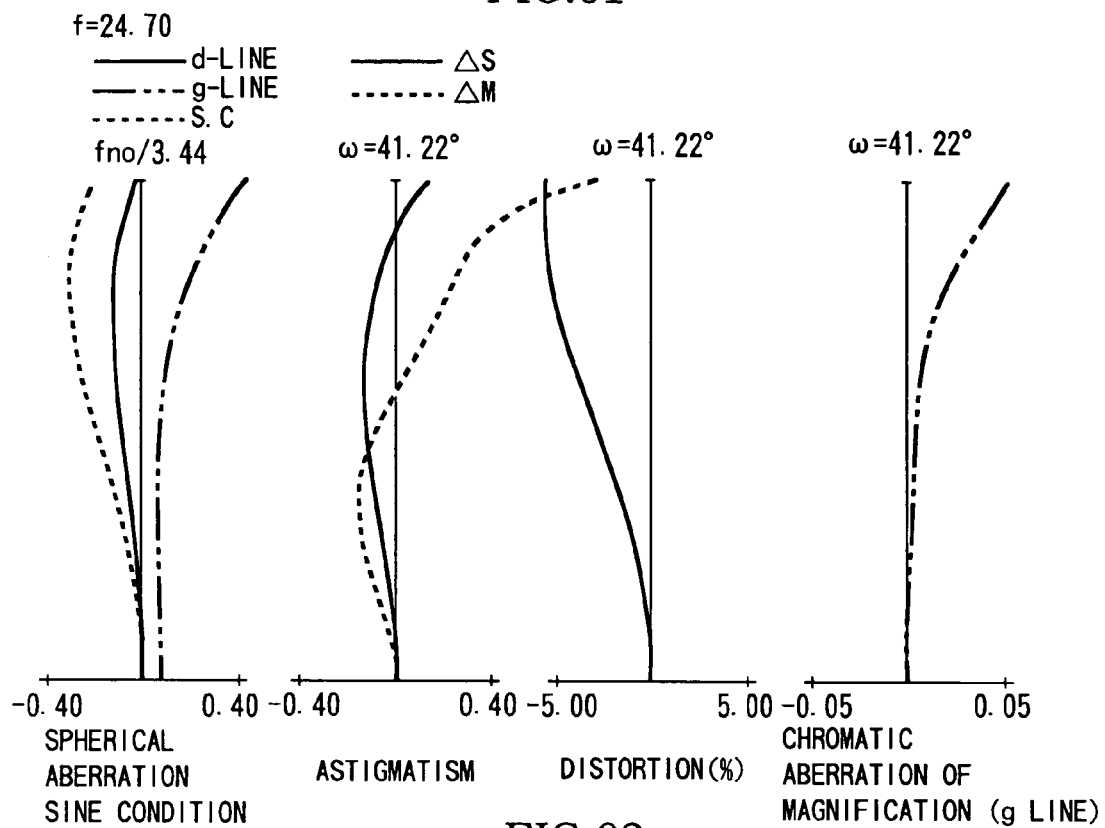
FIG. 61 is aberration diagrams of the zoom lens system of Embodiment 9 when set at the wide-angle end and focused on an object at 500 mm (from the image plane).
Figure 62:
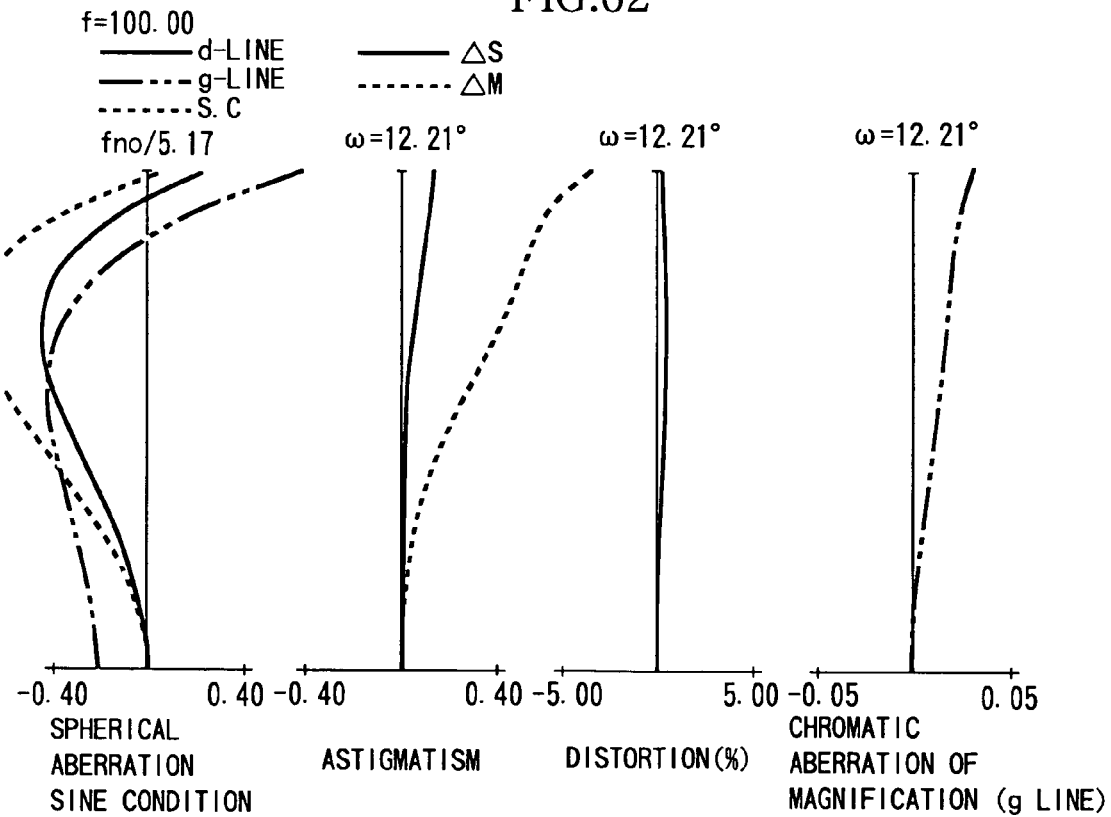
FIG. 62 is aberration diagrams of the zoom lens system of Embodiment 9 when set at the intermediate zoom position and focused on an object at 500 mm (from the image plane).
Figure 63:
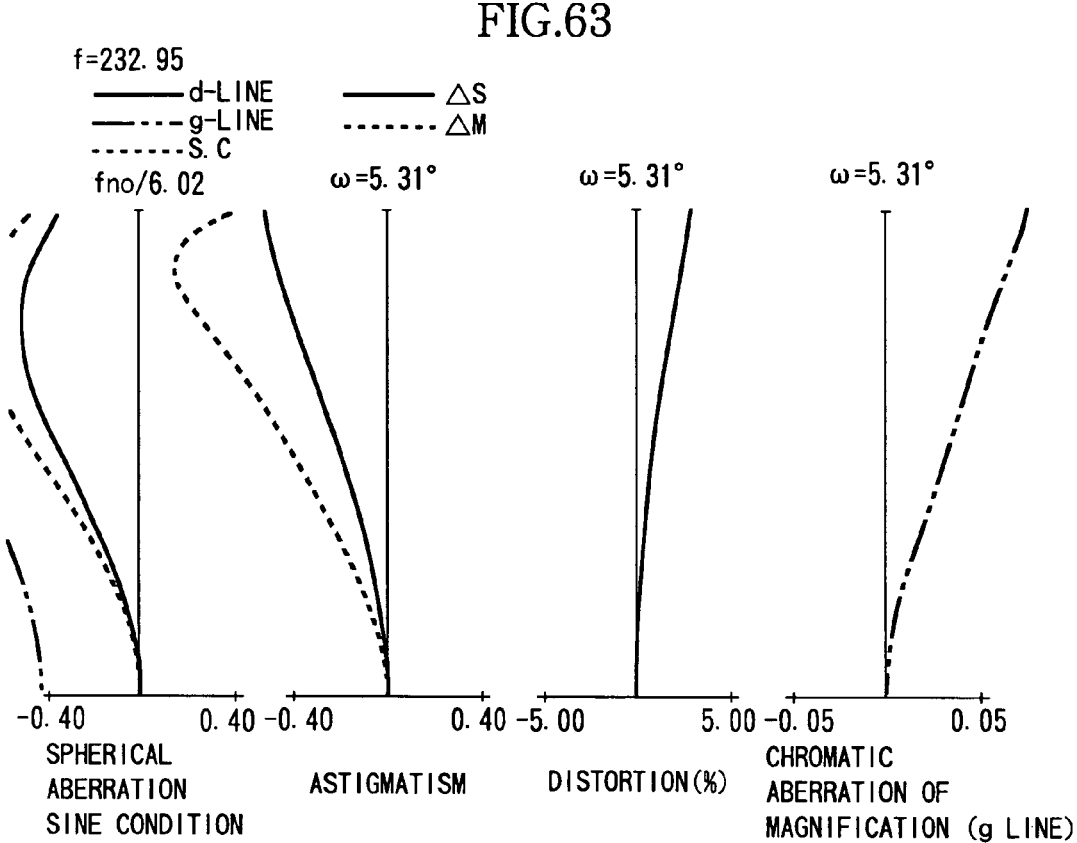
FIG. 63 is aberration diagrams of the zoom lens system of Embodiment 9 when set at the telephoto end and focused on an object at 500 mm (from the image plane).

FIG. 57 is a sectional view of a zoom lens of Embodiment 9. FIG. 58, FIG. 59, and FIG. 60 show aberration diagrams of the zoom lens of Embodiment 9 when focused on an infinity object while being set at the wide-angle end, an intermediate zoom position, and the telephoto end, respectively. FIG. 61, FIG. 62, and FIG. 63 show aberration diagrams of the zoom lens of Embodiment 9 when focused on an object at a distance (distance from the image plane) of 500 mm while being set at the wide-angle end, the intermediate zoom position, and the telephoto end, respectively, with the numerical values of numerical examples to be described below being expressed in units of mm.

Each of Embodiments 1 through 9 comprises, in order from an object side, a front lens group FL which includes a plurality of lens units that moves along an optical axis during zooming, a negative refractive power lens unit BN that moves along the optical axis, and a positive refractive power lens unit BP that is not moved for zooming, and focusing from an infinity object to a close-distance object is performed by moving the abovementioned lens unit BN towards an image side.

The Embodiments 1 through 5, the sections of which are shown in FIG. 1, FIG. 8, FIG. 15, FIG. 22, and FIG. 29 shall be described first.

In each of FIG. 1, FIG. 8, FIG. 15, FIG. 22, and FIG. 29, L1 is a first lens unit with negative refractive power (optical power reciprocal of the focal length), L2 is a second lens unit with positive refractive power, L3 is a third lens unit with negative refractive power, L4 is a fourth lens unit with positive refractive power, L5 is a fifth lens unit with negative refractive power, and L6 is a sixth lens unit with positive refractive power. With each of the zoom lens systems of the Embodiments 1 through 5, the front lens group FL is formed from the first to fourth lens units L1 to L4, the lens unit BN is constructed from the fifth lens unit L5, and the lens unit BP is constructed from the sixth lens unit L6.

SP is an aperture stop and SSP is an open F-number stop. IP is an image plane at which a photosensitive plane of an image pickup means (a solid-state image pickup element (photoelectric conversion element)), such as a CCD sensor, CMOS sensor, etc., or a silver halide film) is positioned. The aperture stop SP and the open F-number stop SSP move integrally with the third lens unit L3. The arrows in the figures indicate the movement loci of the lens units in zooming from the wide-angle end to the telephoto end. With each of Embodiments 1 through 5, the first to fifth lens units L1 to L5 are moved so that in comparison to the wide-angle end, the spacing between the first lens unit L1 and the second lens unit L2 becomes smaller, the spacing between the second lens unit L2 and the third lens unit L3 becomes larger, the spacing between the third lens unit L3 and the fourth lens unit L4 becomes smaller, the spacing between the fourth lens unit L4 and the fifth lens unit L5 becomes larger, and the spacing between the fifth lens unit L5 and the sixth lens unit L6 becomes larger at the telephoto end. The sixth lens unit L6 is fixed with respect to the image plane IP.

Specifically, with each of the Embodiment 1, Embodiment 2, Embodiment 4, and Embodiment 5 of FIG. 1, FIG. 8, FIG. 22, and FIG. 29, in zooming from the wide-angle end to the telephoto end, the first lens unit L1 is moved towards the image side, the second lens unit L2 is moved towards the object side, the third lens unit L3 is moved along a part of a locus that is convex towards the object side, the fourth lens unit L4 is moved integrally with the second lens unit L2 towards the object side, and the fifth lens unit L5 is moved towards the object side.

With the Embodiment 3 of FIG. 15, the first lens unit L1 is moved towards the image side, the second lens unit L2 is moved towards the object side, the third lens unit L3 is moved towards the object side, the fourth lens unit L4 is moved integrally with the second lens unit L2 towards the object side, and the fifth lens unit L5 is moved towards the object side.

In each of Embodiments 1 through 5, the fifth lens unit L5 is moved towards the image side to perform focusing from an infinity object to a close-distance object. The wide-angle end and the telephoto end refer to zoom positions at which the lens units for zooming are positioned at the respective mechanical ends of the range in which the lens units are movable along the optical axis.

With each of the zoom lenses of the Embodiments 1 through 5, at the wide-angle end, the first lens unit L1 with negative refractive power becomes a front component with negative refractive power, and the second lens unit L2 and rearwards become a rear component with positive refractive power, thus providing a retro-focus type power configuration that is favorable for a wide angle lens.

Also at the telephoto end, the first lens unit L1 with negative refractive power and the second lens unit L2 with positive refractive power become a front component with positive refractive power as a whole and the third lens unit L3 and rearwards become a rear component with negative refractive power, thus providing a telephoto type power configuration that is favorable for a telescopic lens. Good optical performance can thus be provided readily from the wide-angle end to the telephoto end zoom positions and brightness (small F number) can be secured readily especially at the telephoto side.

Also by making the spacing between the fourth lens unit L4 and the fifth lens unit L5 become larger in zooming from the wide-angle end to the telephoto end, the variation of an image plane that accompanies the zooming can be corrected more readily, and by making the spacing between the fifth lens unit L5 and the sixth lens unit L6 become larger, the distance from the optical axis to the off-axial rays that are made incident on the sixth lens unit L6 is made greater to enable the positive distortion that occurs at the second lens unit L2 to be corrected more readily.

Generally with a lens unit that makes up an optical system, in the case where the effective ray diameter is determined by the off-axial rays, the greater the angle (with the positive direction being the counterclockwise direction from the optical axis) formed by the optical axis and the off-axial rays that are made incident onto the lens unit, the greater the variation of the effective ray diameter that occurs when the aperture and the distance change. With each of Embodiments 1 through 5, since the off-axial rays that are made incident on the fifth lens unit L5 is refracted by the fourth lens unit L4 with positive refractive power so that the angle formed by the optical axis and the off-axial rays will be small, the variation of the effective ray diameter that accompanies the movement is small. Thus the fifth lens unit L5 is used as a focusing lens unit and reduction of the lens diameter is achieved.

The fifth lens unit L5 for focusing comprises a positive lens and a negative lens. The aberration variations that occur during focusing are thereby made small. Also, the sixth lens unit L6, which is unmoved for zooming, comprises a single positive lens.

By making the second lens unit L2 move towards the object side in zooming from the wide-angle end to the telephoto end, the realization of a telephoto type power configuration at the telephoto end is facilitated, the setting of an appropriate telephoto ratio at the telephoto end is facilitated, and the correction of the spherical aberration and the curvature of field at the telephoto end is facilitated in particular. Also by making the fourth lens unit L4 move towards the object side, the positioning of the fifth lens unit L5 and the sixth lens unit L6 at positions away from the image plane at the telephoto end is facilitated and consequently, the securing of back focal distance at the telephoto end is facilitated.

The second lens unit L2 and the fourth lens unit L4 are moved integrally in zooming, thereby enabling simplification of the lens barrel structure.

By moving the fifth lens unit L5 towards the object side in zooming from the wide-angle end to the telephoto end, the positioning of the sixth lens unit L6 at a position away from the image plane at the telephoto end is facilitated and consequently, the securing of back focal distance at the telephoto end is facilitated.

With each of Embodiments 1 through 5:

The second lens unit L2 preferably comprises at least one negative lens and at least one positive lens. The correction of axial chromatic aberration at the telephoto end is thereby facilitated.

The sixth lens unit L6 preferably has an aspherical surface of a shape with which a positive refractive power increases from the optical axis towards the lens periphery. The correction of positive distortion at the telephoto end is thereby facilitated.

The fifth lens unit L5 preferably comprises at least one negative lens and at least one positive lens. The variation of the chromatic aberration of magnification that accompanies zooming can thereby be restrained readily.

With each of Embodiments 1 through 5, in a case where a lens surface is to be made an aspherical surface, an aspherical surface layer of resin, etc. may be formed on the surface of a spherical lens as long as the aspherical surface is positioned at a part besides the surface at the most object side and the surface at the most image side of the lens system.

With each of Embodiments 1 through 5, when $\beta5t$ is the lateral magnification at the telephoto end of the fifth lens unit L5, $\beta rt$ is the lateral magnification at the telephoto end of the lens unit positioned to the image side of the fifth lens unit L5, fi is the focal length of the abovementioned i-th lens unit, fw is the focal length of the overall optical system at the wide-angle end, and ft is the focal length of the overall optical system at the telephoto end, one or more the following Conditional Expressions is or are satisfied.

$$1.1 < |(1-\beta 5t^2) \times \beta rt^2| \quad (1)$$

$$0.2 < |f5/\sqrt{fw \times ft}| < 4.0 \quad (2)$$

$$0.5 < |f6/\sqrt{fw \times ft}| < 10.0 \quad (3)$$

$$0.8 < |f1/fw| < 2.3 \quad (4)$$

$$0.1 < |f2/ft| < 2.0 \quad (5)$$

$$0.5 < |f3/fw| < 4.5 \quad (6)$$

$$0.3 < |f4/ft| < 2.0 \quad (7)$$

$$0.2 < |f5/ft| < 1.9 \quad (8)$$

$$1.0 < |f6/fw| < 8.0 \quad (9)$$

Each of Embodiments 1 through 5 do not have to satisfy all of the Conditional Expressions (1) to (9) at the same time necessarily and may satisfy one or more of the Conditional Expressions and each effect that is in accordance with the satisfied Conditional Expression is thereby obtained.

The technical significance of the abovementioned Conditional Expressions (1) through (9) shall now be described.

The Conditional Expression (1) is for making the fifth lens unit L5 favorable as a focusing lens unit. By satisfying this Conditional Expression (1), an adequate focus sensitivity (focal point movement amount per movement amount of the focusing lens unit) can be secured for the fifth lens unit L5 at the telephoto end, thus enabling the focusing movement amount of the fifth lens unit L5 to be made small and thereby enabling the entire optical system to be made compact.

The Conditional Expression (2) is for setting the focal length of the fifth lens unit L5 appropriately.

By setting within the upper limit of the Conditional Expression (2), the canceling out of the negative distortion that occurs at the first lens unit L1 with negative refractive power at the wide-angle end is facilitated in particular, and by setting within the lower limit of the Conditional Expression (2), the distance from the optical axis of the off-axial rays that are made incident on the sixth lens unit L6 at the telephoto end can be made small, thereby enabling the effective lens diameter of the sixth lens unit L6 to be made small appropriately.

The Conditional Expression (3) is for setting the focal length of the sixth lens unit L6 appropriately.

By setting within the upper limit of the Conditional Expression (3), the securing of back focal distance at the wide-angle end is facilitated in particular and by setting within the lower limit of the Conditional Expression (3), the negative distortion at the wide-angle end can be corrected well readily.

The Conditional Expression (4) is for setting the focal length of the first lens unit L1 with negative refractive power appropriately. By satisfying the Conditional Expression (4), the correction of the negative distortion at the wide-angle end and the making of the front diameter small can be achieved readily at the same time.

The Conditional Expression (5) is for setting the focal length of the second lens unit L2 with positive refractive power appropriately. By satisfying the Conditional Expression (5), the correction of the spherical aberration and the securing of a bright F number at the telephoto end can be achieved readily at the same time.

The Conditional Expression (6) is for setting the focal length of the third lens unit L3 with negative refractive power appropriately. By satisfying the Conditional Expression (6), the securing of a bright F number at the telephoto end and the correction of the coma aberration and distortion of the entire focal length range can be achieved readily at the same time.

The Conditional Expression (7) is for setting the focal length of the fourth lens unit L4 with positive refractive power appropriately. By satisfying the Conditional Expression (7), the securing of the zoom ratio and the correction of the negative distortion at the wide-angle end can be achieved readily at the same time.

The Conditional Expression (8) is for setting the focal length of the fifth lens unit L5 with negative refractive power appropriately. By satisfying the Conditional Expression (8), the variation of distortion that accompanies zooming can be restrained readily.

The Conditional Expression (9) is for setting the focal length of the sixth lens unit L6 with positive refractive power appropriately. By satisfying the Conditional Expression (9), the securing of back focal distance at the wide-angle end and the making of the rear diameter small can be achieved readily at the same time.

With each of Embodiments 1 through 5, in order to maintain even better optical performance, the numerical ranges of the Conditional Expression (1) through (9) are preferably set as follows:

$$1.3 < |(1-\beta 5t^2) \times \beta rt^2| \quad (1a)$$

$$0.5 < |f5/\sqrt{fw \times ft}| < 3.0 \quad (2a)$$

$$1.0 < |f6/\sqrt{fw \times ft}| < 4.0 \quad (3a)$$

$$1.0 < |f1/fw| < 2.0 \quad (4a)$$

$$0.3 < f2/ft < 1.3 \quad (5a)$$

$$1.5 < |f3/fw| < 3.5 \quad (6a)$$

$$0.4 < f4/ft < 1.4 \quad (7a)$$

$$0.4 < |f5/ft| < 1.7 \quad (8a)$$

$$2.0 < f6/fw < 6.0 \quad (9a)$$

As has been described above, with each of Embodiments 1 through 5, a wide-angle zoom lens, which covers a wide-angle region, has a zoom ratio of 2 times or more, has a large aperture of an F number of approximately 2.8, and yet exhibits good optical performance, is realized.

Embodiments 6 through 9 of FIG. 36, FIG. 43, FIG. 50, and FIG. 57 shall now be described.

In each of the lens sections of Embodiments 6 through 9 shown in FIG. 36, FIG. 43, FIG. 50, and FIG. 57, L1 is a first lens unit with positive refractive power, L2 is a second lens unit with negative refractive power, and BR is a rear lens group with positive refractive power.

SP is an aperture stop and IP is an image plane at which a photosensitive plane of an image pickup means (a solid-state image pickup element or a silver halide film) is positioned. Rear lens group BR comprises, in order from an object side, one or more lens units BRX (third to fifth lens units), a lens unit BRa (sixth lens unit) with negative refractive power, and a lens unit BRb (seventh lens unit) with positive refractive power.

The lens units BRX comprises, in order from the object side, a lens unit BR1 (third lens unit) with positive refractive power, a lens unit BR2 (fourth lens unit) with negative refractive power, and a lens unit BR3 (fifth lens unit) with positive refractive power. The arrows in the figures indicate the movement loci of the lens units in zooming from the wide-angle end to the telephoto end. The first lens unit L1, the second lens unit L2, and the lens units BR1 to BR3 constitute a front lens group.

With Embodiments 6 through 9, zooming is performed by moving the lens units so that in comparison to the wide-angle end, the spacing between the first lens unit L1 and the second lens unit L2 becomes larger and the spacing between the second lens unit L2 and the rear lens group BR becomes smaller at the telephoto end.

More specifically, in zooming from the wide-angle end to the telephoto end, the first lens unit L1 is moved towards the object side, the second lens unit L2 is moved towards an image side, the lens unit BR1 (third lens unit) is moved towards the object side so that the spacing with respect to the second lens unit L2 becomes larger, the lens unit BR2 (fourth lens unit) is moved towards the object side so that spacing with respect to the lens unit BR1 (third lens unit) becomes smaller, the lens unit BR3 (fifth lens unit) is moved integrally with the lens unit BR1 (third lens unit) towards the object side so that the spacing with respect to the lens unit BR2 (fourth lens unit) becomes smaller, and the lens unit BRa (sixth lens unit) is moved towards the object side while changing in the spacing with respect to the lens unit BR3 (fifth lens unit).

For zooming, the lens unit BRb (seventh lens unit) is fixed with respect to the image plane IP. The aperture stop SP moves integrally with the lens unit BR1 during zooming. Also, focusing from an infinity object to a close-distance object is performed by moving the lens unit BRa towards the image side.

Generally when a lens unit with positive refractive power is positioned at the image side of an optical system, the position of the image-side principal point of the optical system moves towards the image side, thereby facilitating the securing of back focal distance. Oppositely, when a lens unit with negative refractive power is positioned at the image side of an optical system, the position of the image-side principal point of the optical system moves towards the object side and the back focal distance tends to be short.

With the focal distanceing lens unit BRa in each of the zoom lenses of Embodiments 6 through 9, even though the negative refractive power of the focusing lens unit is strengthened to make the focusing movement amount small, by positioning the lens unit BRb with positive refractive power at the image side, the securing of back focal distance is facilitated and an advantage is provided in realizing a wider view angle at the wide-angle end.

In particular, the focusing lens unit BRa comprises a negative lens, a positive lens, and a negative lens. The aberration variations that occur during focusing are thus lessened. Also, the lens unit BRb, which is unmoved for zooming, comprises a single positive lens.

Furthermore with each of Embodiments 6 through 9, in zooming from the wide-angle side to the telephoto side, the spacing between the lens unit RBa and the lens unit RBb is made larger to facilitate the securing of movement space for the focusing lens unit even at the telephoto side at which the amount of movement of the image plane in accompaniment with the variation of the object distance is large.

In particular, by moving the lens unit BRa to the object side in zooming from the wide-angle end to the telephoto end, the positioning of the lens unit BRb at a position away from the image plane at the telephoto end is facilitated and consequently, the securing of back focal distance at the telephoto end is facilitated.

Also, an aspherical surface is preferably used in order to maintain high optical performance. As an aspherical surface to be used here, an aspherical surface layer of resin, etc. may be formed on the surface of a spherical lens as long as the aspherical surface is positioned at a part besides the surface at the most object side and the surface at the most image side of the lens system.

With each of Embodiments 6 through 9, when $\beta BRat$ is the lateral magnification at the telephoto end of the lens unit BRa, $\beta BRbt$ is the lateral magnification at the telephoto end of the lens unit BRb, fBRa is the focal length of the lens unit BRa, fBRb is the focal length of the lens unit BRb, fw is the focal length of the overall optical system at the wide-angle end, ft is the focal length of the overall optical system at the telephoto end, fi is the focal length of the abovementioned i-th lens unit, fBRi is the focal length of the lens unitBRi, the lens unit BRa has at least one positive lens, and vp is the Abbe's number of the material of the positive lens inside the lens unit BRa (the average value in a case where there are a plurality of positive lenses), one or more the following Conditional Expressions is or are satisfied.

$$3.0 < |(1-\beta BRat^2) \times \beta BRbt^2| \quad (10)$$

$$0.1 < |fBRa/\sqrt{(fw \times ft)}| < 0.9 \quad (11)$$

$$1.0 < fBRb/\sqrt{(fw \times ft)} < 10.0 \quad (12)$$

$$vp < 45 \quad (13)$$

$$1.0 < f1/\sqrt{(fw \times ft)} < 3.0 \quad (14)$$

$$0.1 < |f2|/\sqrt{(fw \times ft)} < 0.5 \quad (15)$$

$$0.2 < fBR1/\sqrt{(fw \times ft)} < 0.8 \quad (16)$$

$$0.3 < |fBR2|/\sqrt{(fw \times ft)} < 1.0 \quad (17)$$

$$0.2 < fBR3/\sqrt{(fw \times ft)} < 1.0 \quad (18)$$

Each of Embodiments 6 through 9 do not have to satisfy all of the Conditional Expressions (10) to (18) at the same time necessarily and may satisfy one or more of the Conditional Expressions, and each effect that is in accordance with the satisfied Conditional Expression is thereby obtained.

The technical significance of the abovementioned Conditional Expressions (10) through (18) shall now be described.

The Conditional Expression (10) is for making the lens unit BRa favorable as a focusing lens unit. By satisfying this Conditional Expression (10), an adequate focus sensitivity (focal point movement amount per movement amount of the focusing lens unit) can be secured for the lens unit BRa at the telephoto end, thus enabling the focusing movement amount of the lens unit BRa to be made small and thereby enabling the entire optical system to be made compact.

The Conditional Expression (11) is for setting the focal length of the lens unit BRa appropriately.

By setting within the upper limit of the Conditional Expression (11), the canceling out of the negative distortion that occurs at the second lens unit L2 with negative refractive power at the wide-angle end is facilitated in particular, and by setting within the lower limit of the Conditional Expression (11), the distance from the optical axis of the off-axial rays that are made incident on the lens unit BRb at the telephoto end can be made small, thereby enabling the effective lens diameter of the lens unit BRb to be set appropriately.

The Conditional Expression (12) is for setting the focal length of the lens unit BRb.

By setting within the upper limit of the Conditional Expression (12), the securing of back focal distance at the wide-angle end is facilitated in particular and by setting within the lower limit of the Conditional Expression (12), the negative distortion at the wide-angle end can be corrected readily.

When the Conditional Expression (13) is satisfied, the variation of the chromatic aberration of magnification that accompanies zooming can be restrained more readily.

The Conditional Expression (14) is for setting the focal length of the first lens unit L1. When the upper limit of the Conditional Expression (14) is exceeded, an adequate telephoto type lens system cannot be realized at the telephoto side and the securing of a bright F number becomes difficult. Below the lower limit of the Conditional Expression (14), the front lens diameter will then to be large and unfavorable.

The Conditional Expression (15) is for setting the focal length of the second lens unit L2. Below the lower limit of the Conditional Expression (15), the correction of the negative distortion becomes difficult especially at the wide-angle side, and when the upper limit of the Conditional Expression (15) is exceeded, the securing of an adequate zoom ratio becomes difficult.

The Conditional Expression (16) is for setting the focal length of the lens unit BR1 appropriately. By satisfying the Conditional Expression (16), the aberrations that occur at the lens unit BR1 can be corrected readily in a well-balanced manner by the other lens units and a high zoom ratio can be realized readily.

The Conditional Expression (17) is for setting the focal length of the lens unit BR2 appropriately. By satisfying the Conditional Expression (17), the securing of the zoom ratio and the correction of the flare that is occurred by upper rays of the off-axial rays in the intermediate zoom region are facilitated further.

The Conditional Expression (18) is for setting the focal length of the lens unit BR3 appropriately. By satisfying the Conditional Expression (18), the securing of the zoom ratio and the correction of the negative distortion at the wide-angle end can be achieved readily at the same time.

With each of Embodiments 6 through 9, in order to maintain even better optical performance, the numerical ranges of the Conditional Expressions (10) through (18) are preferably set as follows:

$$5.0 < |(1-\beta BRat^2) \times \beta BRbt^2| \quad (10a)$$

$$0.25 < |fBRa|/\sqrt{(fw \times ft)}| < 0.7 \quad (11a)$$

$$2.0 < fBRb/\sqrt{(fw \times ft)} < 7.0 \quad (12a)$$

$$vp < 40 \quad (13a)$$

$$1.15 < f1/\sqrt{fw \times ft} < 2.5 \quad (14a)$$

$$0.15 < |f2|/\sqrt{(fw \times ft)} < 0.3 \quad (15a)$$

$$0.3 < fBR1/\sqrt{(fw \times ft)} < 0.6 \quad (16a)$$

$$0.4 < |fBR2|/\sqrt{(fw \times ft)} < 0.75 \quad (17a)$$

$$0.3 < fBR3/\sqrt{(fw \times ft)} < 0.6 \quad (18a)$$

As has been described above, with Embodiments 6 through 9, a focusing system and a zoom lens employing the same, which cover a wide-angle region, have a zoom ratio of approximately 10 times, and enable the shortening of the close-distance image taking distance without degradation of good optical performance, can be realized readily.

Figure 64:
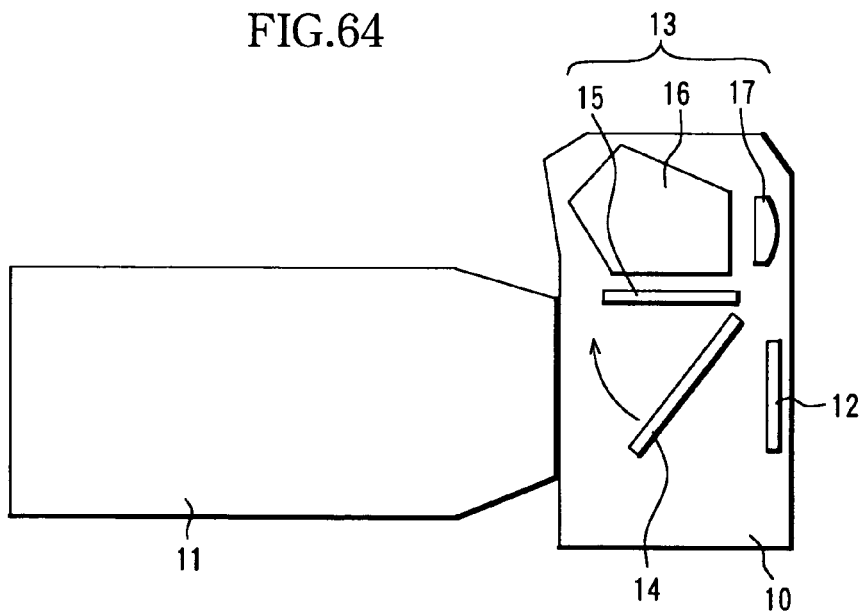
FIG. 64 is a schematic view of the principal parts of a single-lens reflex camera.

An embodiment of a single-lens reflex camera that employs a zoom lens according to one of Embodiments 1 to 9 shall now be described with reference to FIG. 64. In FIG. 64, Reference numeral 10 shows a main single-lens reflex camera body, 11 shows an interchangeable lens incorporating a zoom lens according to one of Embodiments 1 to 9. Reference numeral 12 shows a photosensitive plane of a silver halide film, a solid-state image pickup element (photoelectric conversion element), or the like for recording an object image obtained through the interchangeable lens 11. Reference numeral 13 shows a viewfinder optical system for observing the object image from the interchangeable lens 11, and 14 shows a quick-return mirror that rotates to transmit the object image from the interchangeable lens 11 interchangingly to the photosensitive plane 12 and the viewfinder optical system 13. For observation of the object image via the viewfinder, the object image that is formed on a focus plate 15 via the quick-return mirror 14 is made an erect image by a pentaprism 16 and thereafter observed upon magnification by an ocular optical system 17. For image taking, the quick-return mirror 14 is rotated in the direction of the arrow and the object image is formed on the photosensitive plane 12 and recorded.

By thus applying the zoom lens according to Embodiments to an optical apparatus, such as an interchangeable lens for single-lens reflex camera, an optical apparatus of high optical performance can be realized.

The present invention can also be applied to a single-lens reflex camera without a quick-return mirror.

Numerical Examples 1 to 9, corresponding to Embodiment 1 to Embodiment 9, respectively, of the present invention shall now be described. With Numerical Examples, i indicates the order of a surface from the object side, Ri indicates the radius of curvature of each surface, Di indicates the thickness or air spacing between the i-th and (i+1)-th optical members, and Ni and vi are the refractive index and Abbe's number for d-line, respectively, of the i-th optical member.

Also, with R being the radius of curvature of the central part of a surface, X being the displacement in the optical axis direction (traveling direction of light) at a position of height Y from the optical axis and with the surface apex being the reference point, and A, B, C, D, E, and F being aspherical coefficients, each aspherical surface is expressed by:

$$X = \frac{(1/R)Y^2}{1+\sqrt{1-(Y/R)^2}} + AY^2 + BY^4 + CY^6 + DY^8 + EY^{10} + FY^{12}$$

[e–x] expresses [x 10$^{-x}$]. Also, the relationships between a part of the respective Conditional Expressions given above and the various numerical values of Numerical Examples are shown Tables 1 and 2.

Numerical example 1
f = 24.70 ~ 67.98  Fno = 2.92 ~ 3.25  2ω = 82.4 ~ 35.3

| | | | |
|---|---|---|---|
| # R1 = 161.044 | D1 = 2.50 | N1 = 1.772499 | v1 = 49.6 |
| R2 = 34.883 | D2 = 12.15 | | |
| R3 = −164.700 | D3 = 2.30 | N2 = 1.772499 | v2 = 49.6 |
| R4 = 67.311 | D4 = 0.15 | | |
| R5 = 63.340 | D5 = 5.04 | N3 = 1.805181 | v3 = 25.4 |
| R6 = 182.601 | D6 = Variable | | |
| R7 = 685.874 | D7 = 1.90 | N4 = 1.805181 | v4 = 25.4 |
| R8 = 51.916 | D8 = 6.23 | N5 = 1.772499 | v5 = 49.6 |
| R9 = −127.867 | D9 = 0.15 | | |
| R10 = 91.053 | D10 = 3.83 | N6 = 1.834807 | v6 = 42.7 |
| R11 = −666.456 | D11 = 0.15 | | |
| R12 = 44.736 | D12 = 4.99 | N7 = 1.696197 | v7 = 55.5 |
| R13 = 580.418 | D13 = Variable | | |
| R14 = Stop | D14 = 2.21 | | |
| R15 = −127.874 | D15 = 1.30 | N8 = 1.882997 | v8 = 40.8 |
| R16 = 44.148 | D16 = 2.56 | | |
| R17 = −104.764 | D17 = 1.30 | N9 = 1.719995 | v9 = 50.2 |
| R18 = 33.858 | D18 = 4.94 | N10 = 1.805181 | v10 = 25.4 |
| R19 = −110.923 | D19 = 0.69 | | |
| R20 = Stop | D20 = Variable | | |
| R21 = 122.859 | D21 = 1.30 | N11 = 1.846660 | v11 = 23.9 |
| R22 = 26.169 | D22 = 6.42 | N12 = 1.496999 | v12 = 81.5 |
| R23 = −52.096 | D23 = 0.15 | | |
| R24 = 34.003 | D24 = 4.55 | N13 = 1.651597 | v13 = 58.5 |
| R25 = −138.004 | D25 = Variable | | |
| R26 = 326.115 | D26 = 3.09 | N14 = 1.846660 | v14 = 23.9 |
| R27 = −47.848 | D27 = 0.15 | | |
| R28 = −51.140 | D28 = 1.20 | N15 = 1.834000 | v15 = 37.2 |
| R29 = 26.665 | D29 = Variable | | |
| R30 = 63.856 | D30 = 7.59 | N16 = 1.583126 | v16 = 59.4 |
| # R31 = −98.162 | | | |

| | Focal length | | |
|---|---|---|---|
| Variable spacing | 24.70 | 35.00 | 67.38 |
| D6 | 65.58 | 31.43 | 3.13 |
| D13 | 2.90 | 6.40 | 19.82 |
| D20 | 18.67 | 15.17 | 1.74 |
| D25 | 1.19 | 3.49 | 10.67 |
| D29 | 4.82 | 10.93 | 15.06 |

Aspheric coefficient

| | | | |
|---|---|---|---|
| Surface 1: | A = 0.00000e+00 | B = 1.19663e−06 | C = 4.70286e−10 |
| | D = −1.28360e−12 | E = 1.21542e−15 | F = −4.19913e−19 |
| Surface 31: | A = −0.00000e+00 | B = −1.86742e−07 | C = −9.96565e−09 |
| | D = 6.00710e−11 | E = −1.90097e−13 | F = 2.27739e−15 |

Numerical example 2
f = 22.70 ~ 58.38  Fno = 8.90 ~ 3.20  2ω = 87.3 ~ 40.7

| | | | |
|---|---|---|---|
| # R1 = 123.605 | D1 = 2.50 | N1 = 1.772499 | v1 = 49.6 |
| R2 = 29.825 | D2 = 13.13 | | |
| R3 = −106.694 | D3 = 2.30 | N2 = 1.772499 | v2 = 49.6 |
| R4 = 82.370 | D4 = 3.00 | | |

-continued

Numerical example 2
f = 22.70 ~ 58.38 Fno = 8.90 ~ 3.20 2ω = 87.3 ~ 40.7

| | | | |
|---|---|---|---|
| R5 = 92.868 | D5 = 4.00 | N3 = 1.805181 | ν3 = 25.4 |
| R6 = 437.552 | D6 = Variable | | |
| R7 = 410.770 | D7 = 1.90 | N4 = 1.805181 | ν4 = 25.4 |
| R8 = 52.876 | D8 = 6.03 | N5 = 1.717004 | ν5 = 47.9 |
| R9 = −119.460 | D9 = 0.15 | | |
| R10 = 86.807 | D10 = 3.57 | N6 = 1.834807 | ν6 = 42.7 |
| R11 = −647.303 | D11 = 0.15 | | |
| R12 = 47.266 | D12 = 4.61 | N7 = 1.696797 | ν7 = 55.5 |
| R13 = 505.161 | D13 = Variable | | |
| R14 = Stop | D14 = 2.13 | | |
| R15 = −151.295 | D15 = 1.30 | N8 = 1.882997 | ν8 = 40.8 |
| R16 = 49.052 | D16 = 1.95 | | |
| R17 = −303.974 | D17 = 2.72 | N9 = 1.799516 | ν9 = 42.2 |
| R18 = 37.202 | D18 = 3.91 | N10 = 1.846660 | ν10 = 23.9 |
| R19 = −187.667 | D19 = 0.98 | | |
| R20 = Stop | D20 = Variable | | |
| R21 = 126.439 | D21 = 1.30 | N11 = 1.846660 | ν11 = 23.9 |
| R22 = 25.548 | D22 = 6.83 | N12 = 1.496999 | ν12 = 81.5 |
| R23 = −51.005 | D23 = 0.15 | | |
| R24 = 32.556 | D24 = 4.59 | N13 = 1.617722 | ν13 = 49.8 |
| R25 = −132.456 | D25 = Variable | | |
| R26 = −204.803 | D26 = 2.68 | N14 = 1.846660 | ν14 = 23.9 |
| R27 = −41.551 | D27 = 0.16 | | |
| R28 = −46.661 | D28 = 1.20 | N15 = 1.834000 | ν15 = 37.2 |
| R29 = 28.810 | D29 = Variable | | |
| R30 = 67.617 | D30 = 8.05 | N16 = 1.583126 | ν16 = 59.4 |
| # R31 = −68.737 | | | |

Focal length

| Variable spacing | 22.70 | 35.00 | 58.38 |
|---|---|---|---|
| D6 | 49.50 | 21.29 | 1.50 |
| D13 | 2.88 | 8.24 | 20.31 |
| D20 | 19.19 | 13.83 | 1.77 |
| D25 | 1.19 | 4.99 | 11.75 |
| D29 | 4.00 | 10.46 | 13.67 |

Aspheric coefficient

| Surface 1: | A = 0.00000e+00 | B = 2.04487e−06 | C = 6.89538e−10 |
|---|---|---|---|
| | D = −2.46407e−12 | E = 2.70925e−15 | F = −1.00883e−18 |
| Surface 31: | A = −0.00000e+00 | B = 1.9079e−06 | C = −1.94774e−08 |
| | D = 1.12725e−10 | E = −3.19694e−13 | F = 3.51352e−16 |

Numerical example 3
f = 20.60 ~ 48.58 Fno = 2.90 ~ 3.35 2ω = 92.8 ~ 48.0

| | | | |
|---|---|---|---|
| # R1 = 134.542 | D1 = 2.50 | N1 = 1.772499 | ν1 = 49.6 |
| R2 = 27.188 | D2 = 13.78 | | |
| R3 = −78.185 | D3 = 2.30 | N2 = 1.834807 | ν2 = 42.7 |
| R4 = 97.239 | D4 = 3.00 | | |
| R5 = 229.018 | D5 = 4.62 | N3 = 1.805181 | ν3 = 25.4 |
| R6 = −119.495 | D6 = Variable | | |
| R7 = 274.749 | D7 = 2.80 | N4 = 1.516330 | ν4 = 64.1 |
| R8 = −122.916 | D8 = 0.15 | | |
| R9 = 108.113 | D9 = 1.90 | N5 = 1.761821 | ν5 = 26.5 |
| R10 = 37.302 | D10 = 6.06 | N6 = 1.517417 | ν6 = 52.4 |
| R11 = −153.717 | D11 = 0.15 | | |
| R12 = 37.916 | D12 = 4.88 | N7 = 1.834807 | ν7 = 42.7 |
| R13 = 827.789 | D13 = Variable | | |
| R14 = Stop | D14 = 2.15 | | |
| R15 = −150.776 | D15 = 1.30 | N8 = 1.882997 | ν8 = 40.8 |
| R16 = 56.320 | D16 = 2.06 | | |
| R17 = −249.978 | D17 = 1.25 | N9 = 1.834807 | ν9 = 42.7 |
| R18 = 28.855 | D18 = 5.54 | N10 = 1.805181 | ν10 = 25.4 |
| R19 = −111.253 | D19 = 0.70 | | |
| R20 = Stop | D20 = Variable | | |
| R21 = 298.278 | D21 = 1.30 | N11 = 1.846660 | ν11 = 23.9 |
| R22 = 25.523 | D22 = 6.76 | N12 = 1.496999 | ν12 = 81.5 |
| R23 = −53.374 | D23 = 0.15 | | |

-continued

Numerical example 3
f = 20.60 ~ 48.58 Fno = 2.90 ~ 3.35 2ω = 92.8 ~ 48.0

| | | | |
|---|---|---|---|
| R24 = 36.174 | D24 = 4.63 | N13 = 1.712995 | ν13 = 53.9 |
| R25 = −106.296 | D25 = Variable | | |
| R26 = −70.596 | D26 = 1.84 | N14 = 1.846660 | ν14 = 23.9 |
| R27 = −46.779 | D27 = 0.15 | | |
| R28 = −87.418 | D28 = 1.20 | N15 = 1.834807 | ν15 = 42.7 |
| R29 = 29.748 | D29 = Variable | | |
| R30 = 56.914 | D30 = 8.04 | N16 = 1.583126 | ν16 = 59.4 |
| # R31 = −79.720 | | | |

Focal length

| Variable spacing | 20.60 | 27.94 | 48.58 |
|---|---|---|---|
| D6 | 51.99 | 28.30 | 1.50 |
| D13 | 2.74 | 4.33 | 12.95 |
| D20 | 12.34 | 10.75 | 2.13 |
| D25 | 1.19 | 4.88 | 12.68 |
| D29 | 3.15 | 8.17 | 12.97 |

Aspheric coefficient

| Surface 1: | A = 0.00000e+00 | B = 3.71994e−06 | C = −1.14725e−09 |
|---|---|---|---|
| | D = −2.53363e−13 | E = 1.29688e−15 | F = −6.25550e−19 |
| Surface 31: | A = −0.00000e+00 | B = 3.33792e−06 | C = −2.38616e−08 |
| | D = 1.41165e−10 | E = −3.97666e−13 | F = 4.30136e−16 |

Numerical example 4
f = 17.50 ~ 38.64 Fno = 2.90 ~ 3.47 2ω = 102.1 ~ 58.5

| | | | |
|---|---|---|---|
| # R1 = 170.715 | D1 = 2.50 | N1 = 1.772499 | ν1 = 49.6 |
| R2 = 20.601 | D2 = 14.51 | | |
| R3 = −53.500 | D3 = 2.30 | N2 = 1.804000 | ν2 = 46.6 |
| R4 = 607.412 | D4 = 1.67 | | |
| R5 = 81.370 | D5 = 2.82 | N3 = 1.805181 | ν3 = 25.4 |
| # R6 = 526.843 | D6 = Variable | | |
| R7 = 96.443 | D7 = 4.17 | N4 = 1.582673 | ν4 = 46.4 |
| R8 = −567.926 | D8 = 0.15 | | |
| R9 = 55.537 | D9 = 1.90 | N5 = 1.761821 | ν5 = 26.5 |
| R10 = 30.113 | D10 = 7.34 | N6 = 1.517417 | ν6 = 52.4 |
| R11 = −128.843 | D11 = 0.15 | | |
| R12 = 49.324 | D12 = 4.18 | N7 = 1.651597 | ν7 = 58.5 |
| R13 = −284.150 | D13 = Variable | | |
| R14 = Stop | D14 = 2.34 | | |
| R15 = −88.745 | D15 = 1.30 | N8 = 1.882997 | ν8 = 40.8 |
| R16 = 69.569 | D16 = 1.13 | | |
| R17 = −2084.655 | D17 = 1.25 | N9 = 1.882997 | ν9 = 40.8 |
| R18 = 23.480 | D18 = 8.64 | N10 = 1.805181 | ν10 = 25.4 |
| R19 = −155.701 | D19 = 0.95 | | |
| R20 = Stop | D20 = Variable | | |
| R21 = 141.268 | D21 = 1.30 | N11 = 1.846660 | ν11 = 23.9 |
| R22 = 29.443 | D22 = 6.93 | N12 = 1.495999 | ν12 = 81.5 |
| R23 = −58.983 | D23 = 0.15 | | |
| R24 = 39.554 | D24 = 6.32 | N13 = 1.589130 | ν13 = 61.1 |
| R25 = −85.186 | D25 = Variable | | |
| R26 = −73.538 | D26 = 1.85 | N14 = 1.846660 | ν14 = 23.9 |
| R27 = −56.343 | D27 = 0.15 | | |
| R28 = 214.109 | D28 = 1.20 | N15 = 1.834807 | ν15 = 42.7 |
| # R29 = 32.563 | D29 = Variable | | |
| R30 = 46.730 | D30 = 7.13 | N16 = 1.487490 | ν16 = 70.2 |
| R31 = −196.608 | | | |

Focal length

| Variable spacing | 17.50 | 24.00 | 38.64 |
|---|---|---|---|
| D6 | 35.21 | 19.54 | 5.00 |
| D13 | 2.21 | 5.64 | 17.21 |
| D20 | 16.94 | 13.51 | 1.94 |
| D25 | 1.18 | 5.61 | 14.79 |
| D29 | 2.27 | 8.77 | 9.63 |

-continued

Numerical example 4
f = 17.50 ~ 38.64 Fno = 2.90 ~ 3.47 2ω = 102.1 ~ 58.5

Aspheric coefficient

| | | | |
|---|---|---|---|
| Surface 1: | A = 0.00000e+00 | B = 1.05853e−05 | C = −3.31049e−09 |
| | D = 5.72891e−12 | E = −1.84565e−17 | F = −7.13953e−19 |
| Surface 6: | A = 0.00000e+00 | B = 3.13215e−06 | C = −2.14047e−09 |
| | D = −1.36230e−11 | E = 4.18879e−14 | F = −3.14497e−17 |
| Surface 29: | A = 0.00000e+00 | B = 3.14396e−06 | C = −1.97029e−08 |
| | D = 1.89008e−10 | E = −7.33403e−13 | F = 1.08139e−15 |

Numerical example 5
f = 15.45 ~ 33.98 Fno = 2.90 ~ 3.33 2ω = 108.9 ~ 65.0

| | | | | |
|---|---|---|---|---|
| # | R1 = 92.533 | D1 = 2.50 | N1 = 1.772499 | ν1 = 49.6 |
| | R2 = 23.411 | D2 = 21.77 | | |
| | R3 = −95.356 | D3 = 2.30 | N2 = 1.804000 | ν2 = 46.6 |
| | R4 = 93.439 | D4 = 3.00 | | |
| | R5 = 69.502 | D5 = 3.73 | N3 = 1.846660 | ν3 = 23.9 |
| # | R6 = 160.973 | D6 = Variable | | |
| | R7 = −397.286 | D7 = 3.20 | N4 = 1.617722 | ν4 = 49.8 |
| | R8 = −198.878 | D8 = 0.15 | | |
| | R9 = 62.345 | D9 = 1.90 | N5 = 1.761821 | ν5 = 25.5 |
| | R10 = 30.395 | D10 = 6.94 | N6 = 1.517417 | ν6 = 52.4 |
| | R11 = −83.804 | D11 = 0.15 | | |
| | R12 = 43.966 | D12 = 4.05 | N7 = 1.677900 | ν7 = 55.3 |
| | R13 = −216.458 | D13 = Variable | | |
| | R14 = Stop | D14 = 2.21 | | |
| | R15 = −164.995 | D15 = 1.30 | N8 = 1.882997 | ν8 = 40.8 |
| | R16 = 88.797 | D16 = 3.36 | | |
| | R17 = −72.757 | D17 = 1.25 | N9 = 1.882997 | ν9 = 40.8 |
| | R18 = 22.678 | D18 = 8.60 | N10 = 1.805181 | ν10 = 25.4 |
| | R19 = −96.860 | D19 = 2.30 | | |
| | R20 = Stop | D20 = Variable | | |
| | R21 = 120.585 | D21 = 1.30 | N11 = 1.846660 | ν11 = 23.9 |
| | R22 = 31.305 | D22 = 7.48 | N12 = 1.496999 | ν12 = 81.5 |
| | R23 = −42.078 | D23 = 0.15 | | |
| | R24 = 38.952 | D24 = 5.95 | N13 = 1.516330 | ν13 = 64.1 |
| # | R25 = −110.475 | D25 = Variable | | |
| | R26 = −59.043 | D26 = 1.44 | N14 = 1.846660 | ν14 = 23.9 |
| | R27 = −55.437 | D27 = 0.15 | | |
| | R28 = 238.252 | D28 = 1.20 | N15 = 1.834807 | ν15 = 42.7 |
| # | R29 = 30.403 | D29 = Variable | | |
| | R30 = 36.986 | D30 = 4.95 | N16 = 1.583126 | ν16 = 59.4 |
| # | R31 = 552.279 | | | |

Focal length

| Variable spacing | 15.45 | 20.00 | 33.98 |
|---|---|---|---|
| D6 | 50.29 | 25.99 | 5.03 |
| D13 | 2.30 | 1.80 | 12.99 |
| D20 | 15.01 | 15.50 | 4.32 |
| D25 | 1.50 | 7.83 | 13.86 |
| D29 | 1.50 | 2.81 | 4.52 |

Aspheric coefficient

| | | | |
|---|---|---|---|
| Surface 1: | A = 0.00000e+00 | B = 4.67142e−06 | C = −1.41100e−09 |
| | D = 8.75148e−13 | E = 1.60528e−16 | F = 2.51806e−20 |
| Surface 6: | A = 0.00000e+00 | B = 1.49606e−06 | C = −6.31446e−09 |
| | D = 2.34297e−11 | E = −4.91178e−14 | F = 3.59501e−17 |
| Surface 25: | A = 0.00000e+00 | B = −7.73118e−07 | C = 7.26783e−11 |
| | D = −2.27820e−11 | E = 8.09270e−14 | F = −9.97880e−19 |
| Surface 29: | A = 0.00000e+00 | B = −1.24689e−06 | C = −4.82541e−09 |
| | D = 3.51094e−11 | E = −2.69044e−14 | F = −1.50164e−16 |
| Surface 31: | A = −0.00000e+00 | B = 5.84931e−06 | C = −3.10476e−08 |
| | D = 2.52403e−10 | E = −9.53206e−13 | F = 1.38118e−15 |

Numerical example 6
f = 28.80 ~ 339.99 Fno = 3.59 ~ 5.66 2ω = 73.8 ~ 7.3

| | | | | |
|---|---|---|---|---|
| | R1 = 119.245 | D1 = 3.00 | N1 = 1.834000 | ν1 = 37.2 |
| | R2 = 69.427 | D2 = 8.31 | N2 = 1.496999 | ν2 = 81.6 |
| | R3 = 2874.028 | D3 = 0.15 | | |
| | R4 = 81.906 | D4 = 6.94 | N3 = 1.496999 | ν3 = 81.6 |
| | R5 = 1860.891 | D5 = Variable | | |
| | R6 = 197.630 | D6 = 1.90 | N4 = 1.772499 | ν4 = 49.6 |
| | R7 = 22.885 | D7 = 6.75 | | |
| | R8 = −142.776 | D8 = 1.60 | N5 = 1.834807 | ν5 = 42.7 |
| | R9 = 48.995 | D9 = 0.15 | | |
| | R10 = 36.010 | D10 = 4.52 | N6 = 1.698947 | ν6 = 30.1 |
| | R11 = −364.028 | D11 = 2.34 | | |
| | R12 = −38.722 | D12 = 1.40 | N7 = 1.834807 | ν7 = 42.7 |
| | R13 = 63.605 | D13 = 3.40 | N8 = 1.846660 | ν8 = 23.9 |
| | R14 = −115.913 | D14 = Variable | | |
| | R15 = Stop | D15 = 1.40 | | |
| | R16 = 151.712 | D16 = 1.50 | N9 = 1.805181 | ν9 = 25.4 |
| | R17 = 49.354 | D17 = 4.73 | N10 = 1.487490 | ν10 = 70.2 |
| | R18 = −58.993 | D18 = 0.15 | | |
| | R19 = 86.284 | D19 = 2.99 | N11 = 1.487490 | ν11 = 70.2 |
| | R20 = −132.595 | D20 = 0.15 | | |
| | R21 = 46.167 | D21 = 3.35 | N12 = 1.572501 | ν12 = 57.7 |
| | R22 = −923.062 | D22 = Variable | | |
| | R23 = −145.199 | D23 = 1.50 | N13 = 1.651597 | ν13 = 58.5 |
| | R24 = 143.348 | D24 = 1.71 | | |
| | R25 = −68.339 | D25 = 1.50 | N14 = 1.622992 | ν14 = 58.2 |
| | R26 = 30.247 | D26 = 3.60 | N15 = 1.805181 | ν15 = 25.4 |
| | R27 = 147.328 | D27 = Variable | | |
| | R28 = 281.611 | D28 = 1.50 | N16 = 1.846660 | ν16 = 23.9 |
| | R29 = 35.008 | D29 = 6.33 | N17 = 1.487490 | ν17 = 70.2 |
| | R30 = −42.191 | D30 = 0.15 | | |
| | R31 = 122.418 | D31 = 3.25 | N18 = 1.517417 | ν18 = 52.4 |
| | R32 = −104.441 | D32 = 0.15 | | |
| | R33 = 38.319 | D33 = 6.60 | N19 = 1.496999 | ν19 = 81.5 |
| | R34 = −45.455 | D34 = 1.50 | N20 = 1.806098 | ν20 = 41.0 |
| | R35 = −109.278 | D35 = Variable | | |
| | R36 = 116.121 | D36 = 1.50 | N21 = 1.834807 | ν21 = 42.7 |
| | R37 = 20.308 | D37 = 0.54 | | |
| | R38 = 21.236 | D38 = 9.37 | N22 = 1.620041 | ν22 = 36.3 |
| | R39 = −29.161 | D39 = 0.15 | | |
| | R40 = −31.343 | D40 = 1.80 | N23 = 1.712995 | ν23 = 53.9 |
| | R41 = 31.521 | D41 = Variable | | |
| # | R42 = 201.994 | D42 = 4.00 | N24 = 1.487490 | ν24 = 70.2 |
| | R43 = −248.556 | | | |

Focal length

| Variable spacing | 28.80 | 100.00 | 339.99 |
|---|---|---|---|
| D5 | 1.80 | 38.63 | 78.19 |
| D14 | 43.28 | 15.09 | 1.00 |
| D22 | 1.90 | 11.43 | 15.13 |
| D27 | 15.72 | 6.19 | 2.50 |
| D35 | 1.10 | 3.99 | 2.00 |
| D41 | 6.06 | 31.50 | 39.41 |

Aspheric coefficient

| | | | |
|---|---|---|---|
| Surface 42: | A = 0.00000e+00 | B = 2.56098e−06 | C = 1.61592e−09 |
| | D = −1.18901e−12 | E = 0.00000e+00 | F = 0.00000e+00 |

Numerical example 7
f = 28.80 ~ 291.99 Fno = 3.45 ~ 5.66 2ω = 73.8 ~ 8.5

| | | | |
|---|---|---|---|
| R1 = 98.551 | D1 = 3.00 | N1 = 1.834000 | ν1 = 37.2 |
| R2 = 59.470 | D2 = 8.70 | N2 = 1.496999 | ν2 = 81.6 |
| R3 = 1004.462 | D3 = 0.15 | | |
| R4 = 68.082 | D4 = 6.31 | N3 = 1.496999 | ν3 = 81.6 |
| R5 = 830.984 | D5 = Variable | | |
| R6 = 282.673 | D6 = 1.90 | N4 = 1.772499 | ν4 = 49.6 |
| R7 = 21.675 | D7 = 6.52 | | |

-continued

Numerical example 7
f = 28.80 ~ 291.99 Fno = 3.45 ~ 5.66 2ω = 73.8 ~ 8.5

| | | | |
|---|---|---|---|
| R8 = −153.161 | D8 = 1.60 | N5 = 1.834807 | ν5 = 42.7 |
| R9 = 53.032 | D9 = 0.15 | | |
| R10 = 35.160 | D10 = 3.49 | N6 = 1.698947 | ν6 = 30.1 |
| R11 = 134.601 | D11 = 3.08 | | |
| R12 = −37.255 | D12 = 1.40 | N7 = 1.834807 | ν7 = 42.7 |
| R13 = 119.074 | D13 = 3.40 | N8 = 1.846660 | ν8 = 23.9 |
| R14 = −62.450 | D14 = Variable | | |
| R15 = Stop | D15 = 1.40 | | |
| R16 = 133.785 | D16 = 1.50 | N9 = 1.805181 | ν9 = 25.4 |
| R17 = 54.930 | D17 = 4.41 | N10 = 1.487490 | ν10 = 70.2 |
| R18 = −58.595 | D18 = 0.15 | | |
| R19 = 77.676 | D19 = 2.84 | N11 = 1.487490 | ν11 = 70.2 |
| R20 = −177.325 | D20 = 0.15 | | |
| R21 = 44.747 | D21 = 2.94 | N12 = 1.572501 | ν12 = 57.7 |
| R22 = 304.019 | D22 = Variable | | |
| R23 = −123.489 | D23 = 1.50 | N13 = 1.651597 | ν13 = 58.5 |
| R24 = 183.723 | D24 = 1.46 | | |
| R25 = −78.748 | D25 = 1.50 | N14 = 1.622992 | ν14 = 58.2 |
| R26 = 30.113 | D26 = 3.60 | N15 = 1.805181 | ν15 = 25.4 |
| R27 = 113.618 | D27 = Variable | | |
| R28 = 446.193 | D28 = 1.50 | N16 = 1.846660 | ν16 = 23.9 |
| R29 = 36.578 | D29 = 6.64 | N17 = 1.487490 | ν17 = 70.2 |
| R30 = −39.083 | D30 = 0.15 | | |
| R31 = 171.593 | D31 = 3.26 | N18 = 1.517417 | ν18 = 52.4 |
| R32 = −89.047 | D32 = 0.15 | | |
| R33 = 36.619 | D33 = 6.41 | N19 = 1.496999 | ν19 = 81.5 |
| R34 = −61.736 | D34 = 1.50 | N20 = 1.806098 | ν20 = 41.0 |
| R35 = −142.697 | D35 = Variable | | |
| R36 = 234.444 | D36 = 1.50 | N21 = 1.834807 | ν21 = 42.7 |
| R37 = 23.318 | D37 = 0.48 | | |
| R38 = 24.136 | D38 = 9.74 | N22 = 1.620041 | ν22 = 36.3 |
| R39 = −29.954 | D39 = 0.15 | | |
| R40 = −31.189 | D40 = 1.80 | N23 = 1.712995 | ν23 = 53.9 |
| R41 = 42.831 | D41 = Variable | | |
| R42 = −60.465 | D42 = 4.00 | N24 = 1.487490 | ν24 = 70.2 |
| R43 = −39.054 | | | |

| | Focal length | | |
|---|---|---|---|
| Variable spacing | 28.80 | 100.00 | 291.99 |
| D5 | 1.80 | 28.59 | 62.92 |
| D14 | 39.69 | 9.69 | 1.00 |
| D22 | 2.34 | 13.21 | 16.29 |
| D27 | 16.95 | 6.08 | 3.00 |
| D35 | 1.99 | 7.40 | 2.03 |
| D41 | 8.18 | 34.52 | 43.72 |

Numerical example 8
f = 24.70 ~ 291.95 Fno = 3.21 ~ 5.66 2ω = 82.4 ~ 8.5

| | | | |
|---|---|---|---|
| R1 = 311.656 | D1 = 3.00 | N1 = 1.834000 | ν1 = 37.2 |
| R2 = 92.339 | D2 = 10.34 | N2 = 1.496999 | ν2 = 81.6 |
| R3 = −374.337 | D3 = 0.15 | | |
| R4 = 89.364 | D4 = 7.95 | N3 = 1.551597 | ν3 = 58.5 |
| R5 = 777.330 | D5 = Variable | | |
| # R6 = 490.643 | D6 = 1.90 | N4 = 1.772499 | ν4 = 49.6 |
| R7 = 20.909 | D7 = 6.80 | | |
| R8 = −133.118 | D8 = 1.60 | N5 = 1.834807 | ν5 = 42.7 |
| R9 = 73.437 | D9 = 0.16 | | |
| R10 = 26.131 | D10 = 3.69 | N6 = 1.698947 | ν6 = 30.1 |
| R11 = 246.684 | D11 = 1.88 | | |
| R12 = 62.097 | D12 = 1.40 | N7 = 1.834807 | ν7 = 42.7 |
| R13 = 50.441 | D13 = 3.40 | N8 = 1.846660 | ν8 = 23.9 |
| R14 = −274.434 | D14 = Variable | | |
| R15 = Stop | D15 = 1.40 | | |
| R16 = 81.940 | D16 = 1.50 | N9 = 1.805181 | ν9 = 25.4 |
| R17 = 38.005 | D17 = 4.52 | N10 = 1.487490 | ν10 = 70.2 |
| R18 = −67.414 | D18 = 0.15 | | |
| R19 = 103.688 | D19 = 2.70 | N11 = 1.487490 | ν11 = 70.2 |
| R20 = −106.172 | D20 = 0.15 | | |

-continued

Numerical example 8
f = 24.70 ~ 291.95 Fno = 3.21 ~ 5.66 2ω = 82.4 ~ 8.5

| | | | |
|---|---|---|---|
| R21 = 45.087 | D21 = 2.96 | N12 = 1.572501 | ν12 = 57.7 |
| R22 = −242787.481 | D22 = Variable | | |
| R23 = −104.599 | D23 = 1.60 | N13 = 1.651597 | ν13 = 58.5 |
| R24 = 127.364 | D24 = 1.78 | | |
| R25 = −63.678 | D25 = 1.50 | N14 = 1.622992 | ν14 = 58.2 |
| R26 = 26.147 | D26 = 3.60 | N15 = 1.805181 | ν15 = 25.4 |
| R27 = 116.134 | D27 = Variable | | |
| R28 = 151.298 | D28 = 1.50 | N16 = 1.846660 | ν16 = 23.9 |
| R29 = 32.559 | D29 = 6.70 | N17 = 1.487490 | ν18 = 70.2 |
| R30 = −46.548 | D30 = 0.15 | | |
| R31 = 205.161 | D31 = 3.36 | N18 = 1.517417 | ν18 = 52.4 |
| R32 = −81.934 | D32 = 0.15 | | |
| R33 = 41.236 | D33 = 8.29 | N19 = 1.496999 | ν19 = 81.5 |
| R34 = −33.528 | D34 = 1.50 | N20 = 1.806098 | ν20 = 41.0 |
| R35 = −62.853 | D35 = Variable | | |
| R36 = 656.920 | D36 = 1.50 | N21 = 1.834807 | ν21 = 42.7 |
| R37 = 28.282 | D37 = 0.50 | | |
| R38 = 29.549 | D38 = 9.27 | N22 = 1.620041 | ν22 = 36.3 |
| R39 = −35.906 | D39 = 0.15 | | |
| R40 = −51.261 | D40 = 1.80 | N23 = 1.712995 | ν23 = 53.9 |
| # R41 = 40.999 | D41 = Variable | | |
| # R42 = 39.548 | D42 = 4.00 | N24 = 1.487490 | ν24 = 70.2 |
| R43 = 44.825 | | | |

| | Focal length | | |
|---|---|---|---|
| Variable spacing | 24.70 | 100.00 | 291.95 |
| D5 | 1.80 | 43.74 | 91.52 |
| D14 | 35.54 | 6.13 | 0.99 |
| D22 | 2.08 | 15.31 | 17.30 |
| D27 | 17.72 | 4.49 | 2.50 |
| D35 | 1.97 | 8.85 | 1.99 |
| D41 | 1.39 | 27.19 | 39.14 |

Aspheric coefficient

| | | | |
|---|---|---|---|
| Surface 6: | A = 0.00000e+00 | B = 1.13756e−06 | C = −5.21654e−10 |
| | D = −6.26234e−13 | E = 0.00000e+00 | F = 0.00000e+00 |
| Surface 41: | A = 0.00000e+00 | B = 4.50346e−06 | C = 1.06751e−08 |
| | D = −1.81650e−12 | E = 0.00000e+00 | F = 0.00000e+00 |
| Surface 42: | A = 0.00000e+00 | B = 5.40151e−07 | C = 4.63968e−09 |
| | D = −1.88842e−12 | E = 0.00000e+00 | F = 0.00000e+00 |

Numerical example 9
f = 24.70 ~ 232.95 Fno = 3.43 ~ 5.68 2ω = 82.4 ~ 10.6

| | | | |
|---|---|---|---|
| R1 = 274.104 | D1 = 3.00 | N1 = 1.834000 | ν1 = 37.2 |
| R2 = 92.370 | D2 = 10.16 | N2 = 1.496999 | ν2 = 81.6 |
| R3 = −1606.814 | D3 = 0.15 | | |
| R4 = 91.730 | D4 = 8.06 | N3 = 1.696797 | ν3 = 55.5 |
| R5 = 466.203 | D5 = Variable | | |
| R6 = 189.867 | D6 = 1.90 | N4 = 1.772499 | ν4 = 49.6 |
| R7 = 18.885 | D7 = 7.57 | | |
| R8 = −126.823 | D8 = 1.60 | N5 = 1.834807 | ν5 = 42.7 |
| R9 = 82.344 | D9 = 0.15 | | |
| R10 = 34.221 | D10 = 3.47 | N6 = 1.698947 | ν6 = 30.1 |
| R11 = 116.347 | D11 = 2.61 | | |
| R12 = −49.558 | D12 = 1.40 | N7 = 1.834807 | ν7 = 42.7 |
| R13 = 92.243 | D13 = 3.40 | N8 = 1.846660 | ν8 = 23.9 |
| R14 = −97.348 | D14 = Variable | | |
| R15 = Stop | D15 = 1.40 | | |
| R16 = 104.602 | D16 = 1.50 | N9 = 1.805181 | ν9 = 25.4 |
| R17 = 40.060 | D17 = 4.98 | N10 = 1.487490 | ν10 = 70.2 |
| R18 = −55.542 | D18 = 0.15 | | |
| R19 = 92.515 | D19 = 2.73 | N11 = 1.487490 | ν11 = 70.2 |
| R20 = −156.976 | D20 = 0.15 | | |
| R21 = 47.122 | D21 = 3.69 | N12 = 1.572501 | ν12 = 57.7 |
| R22 = −150.170 | D22 = Variable | | |
| R23 = −84.011 | D23 = 1.50 | N13 = 1.651597 | ν13 = 58.5 |
| R24 = 94.241 | D24 = 1.43 | | |

-continued

Numerical example 9
f = 24.70 ~ 232.95 Fno = 3.43 ~ 5.68 2ω = 82.4 ~ 10.6

| | | | |
|---|---|---|---|
| R25 = −159.388 | D25 = 1.50 | N14 = 1.622992 | ν14 = 58.2 |
| R26 = 25.292 | D26 = 3.60 | N15 = 1.805181 | ν15 = 25.4 |
| R27 = 84.890 | D27 = Variable | | |
| R28 = 78.893 | D28 = 1.50 | N16 = 1.846660 | ν16 = 23.9 |
| R29 = 29.483 | D29 = 6.69 | N17 = 1.487490 | ν17 = 70.2 |
| R30 = −52.333 | D30 = 0.15 | | |
| R31 = −593.362 | D31 = 2.35 | N18 = 1.517417 | ν18 = 52.4 |
| R32 = −98.643 | D32 = 0.15 | | |
| R33 = 43.094 | D33 = 8.38 | N19 = 1.496999 | ν19 = 81.5 |
| R34 = −27.135 | D34 = 1.50 | N20 = 1.806098 | ν20 = 41.0 |
| R35 = −52.462 | D35 = Variable | | |
| R36 = −373.303 | D36 = 1.50 | N21 = 1.834807 | ν21 = 42.7 |
| R37 = 28.764 | D37 = 1.29 | | |
| R38 = 41.301 | D38 = 7.86 | N22 = 1.620041 | ν22 = 36.3 |
| R39 = −37.599 | D39 = 0.15 | | |
| R40 = −37.647 | D40 = 1.80 | N23 = 1.712995 | ν23 = 53.9 |
| R41 = 67.177 | D41 = Variable | | |
| R42 = −748.920 | D42 = 4.00 | N24 = 1.487490 | ν24 = 70.2 |
| R43 = −93.833 | | | |

Focal length

| Variable spacing | 24.70 | 100.0 | 232.95 |
|---|---|---|---|
| D5 | 1.80 | 62.65 | 98.97 |
| D14 | 40.15 | 11.63 | 1.30 |
| D22 | 1.83 | 12.07 | 15.82 |
| D27 | 16.48 | 6.24 | 2.49 |
| D35 | 2.00 | 4.01 | 7.92 |
| D41 | 3.59 | 31.71 | 34.99 |

Aspheric coefficient

| Surface 6: | A = 0.00000e+00 | B = 1.71252e−06 | C = −7.05369e−10 |
|---|---|---|---|
| | D = −8.10676e−13 | E = 0.00000e+00 | F = 0.00000e+00 |
| Surface 41: | A = 0.00000e+00 | B = 4.02700e−06 | C = 1.76183e−08 |
| | D = −6.14451e−11 | E = 0.00000e+00 | F = 0.00000e+00 |
| Surface 42: | A = 0.00000e+00 | B = 1.55052e−06 | C = 8.22956e−09 |
| | D = −7.23876e−12 | E = 0.00000e+00 | F = 0.00000e+00 |

TABLE 1

| Conditional expression | | Numerical example 1 | Numerical example 2 | Numerical example 3 | Numerical example 4 | Numerical example 5 |
|---|---|---|---|---|---|---|
| 1a | $1.1 < |(1 − \beta 5t^2) \times \beta rt^2|$ | 2.66 | 2.89 | 2.97 | 1.53 | 1.78 |
| 2a | $|f5/\sqrt{fw \times ft}|$ | 0.91 | 0.90 | 1.00 | 2.12 | 1.90 |
| 3a | $f6/\sqrt{fw \times ft}$ | 1.65 | 1.64 | 1.84 | 3.01 | 2.86 |
| 4a | $|f1/fw|$ | 1.50 | 1.42 | 1.52 | 1.32 | 1.66 |
| 5a | $f2/ft$ | 0.48 | 0.57 | 0.69 | 0.86 | 1.00 |
| 6a | $|f3/fw|$ | 1.76 | 2.19 | 2.71 | 2.78 | 2.99 |
| 7a | $f4/ft$ | 0.57 | 0.63 | 0.79 | 1.05 | 1.15 |
| 8a | $|f5/ft|$ | 0.55 | 0.56 | 0.65 | 1.43 | 1.28 |
| 9a | $f6/fw$ | 2.73 | 2.63 | 2.83 | 4.47 | 4.38 |

TABLE 2

| Conditional expression | | Numerical example 6 | Numerical example 7 | Numerical example 8 | Numerical example 9 |
|---|---|---|---|---|---|
| 1b | $|(1 − \beta BRat^2) \times \beta BRbt^2|$ | 8.37 | 7.60 | 6.15 | 6.02 |
| 2b | $|fBRa/\sqrt{fw \times ft}|$ | 0.35 | 0.42 | 0.54 | 0.62 |
| 3b | $fBRb/\sqrt{fw \times ft}$ | 2.32 | 2.32 | 6.50 | 2.90 |
| 4b | $\nu p < 45$ | 36.26 | 36.26 | 36.26 | 36.26 |
| 5b | $f1/\sqrt{fw \times ft}$ | 1.31 | 1.22 | 1.71 | 2.25 |
| 6b | $|f2|/\sqrt{fw \times ft}$ | 0.20 | 0.21 | 0.23 | 0.26 |
| 7b | $fBR1/\sqrt{fw \times ft}$ | 0.35 | 0.39 | 0.39 | 0.41 |
| 8b | $|fBR2|/\sqrt{fw \times ft}$ | 0.56 | 0.60 | 0.55 | 0.62 |
| 9b | $fBR3/\sqrt{fw \times ft}$ | 0.37 | 0.39 | 0.40 | 0.41 |

What is claimed is:

1. A zoom lens system comprising, in order from an object side to an image side:

a first lens unit with negative refractive power;

a second lens unit with positive refractive power;

a third lens unit with negative refractive power;

a fourth lens unit with positive refractive power;

a fifth lens unit with negative refractive power; and a sixth lens unit with positive refractive power, wherein zooming is performed by varying the spacing between the respective lens units so that in comparison to the wide-angle end, the spacing between the first lens unit and the second lens unit becomes smaller, the spacing between the second lens unit and the third lens unit becomes larger, the spacing between the third lens unit and the fourth lens unit becomes smaller, the spacing between the fourth lens unit and the fifth lens unit becomes larger, and the spacing between the fifth lens unit and the sixth lens unit becomes larger at the telephoto end, the fifth lens unit is moved towards the image side in focusing from an infinity object to a close-distance object, and the following condition is satisfied:

$$1.1 < |(1 − \beta 5t^2) \times \beta rt^2|$$

where $\beta 5t$ is the lateral magnification at the telephoto end of the fifth lens unit and $\beta rt$ is the lateral magnification at the telephoto end of an optical part positioned closer to the image side than the fifth lens unit, the optical part including the sixth lens unit.

2. The zoom lens system according to claim 1, wherein the following conditions are satisfied:

$$0.2 < |f5/\sqrt{fw \times ft}| < 4.0$$

$$0.5 < f6/\sqrt{fw \times ft} < 10.0$$

where fi is the focal length of the i-th lens unit, fw is the focal length of the overall optical system at the wide-angle end, and ft is the focal length of the overall optical system at the telephoto end.

3. The zoom lens system according to claim 1, wherein the second lens unit and the fourth lens unit move towards the object side in zooming from the wide-angle end to the telephoto end.

4. The zoom lens system according to claim 1, wherein the fifth lens unit moves towards the object side in zooming from the wide-angle end to the telephoto end.

5. The zoom lens system according to claim 1, wherein the following conditions are satisfied:

$0.2 < |f5/ft| < 1.9$ $1.0 < |f6/fw| < 8.0$ where fi is the focal length of the i-th lens unit, fw is the focal length of the overall optical system at the wide-angle end, and ft is the focal length of the overall optical system at the telephoto end.

6. The zoom lens system according to claim 1, wherein the following conditions are satisfied:

$0.8 < |f1/fw| < 2.3$ $0.1 < f2/ft < 2.0$ $0.5 < |f3/fw| < 4.5$ $0.3 < f4/ft < 2.0$ where fi is the focal length of the i-th lens unit, fw is the focal length of the overall optical system at the wide-angle end, and ft is the focal length of the overall optical system at the telephoto end.

7. The zoom lens system according to claim 1, wherein the zoom lens system forms an image on a photoelectric conversion element.

8. A camera comprising:

the zoom lens system according to claim 1, and a photoelectric conversion element receiving an image formed by the zoom lens system.

* * * * *